US012812638B2

(12) United States Patent
Chen et al.

(10) Patent No.: US 12,812,638 B2
(45) Date of Patent: Nov. 24, 2026

(54) DYNAMIC SWITCHING BETWEEN COMMUNICATIONS SCHEMES FOR UPLINK COMMUNICATIONS

(71) Applicant: QUALCOMM INCORPORATED, San Diego, CA (US)

(72) Inventors: Yitao Chen, San Marcos, CA (US); Mostafa Khoshnevisan, San Diego, CA (US); Fang Yuan, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 317 days.

(21) Appl. No.: 18/689,779

(22) PCT Filed: Nov. 19, 2021

(86) PCT No.: PCT/CN2021/131654
§ 371 (c)(1),
(2) Date: Mar. 6, 2024

(87) PCT Pub. No.: WO2023/087238
PCT Pub. Date: May 25, 2023

(65) Prior Publication Data

US 2024/0389096 A1 Nov. 21, 2024

(51) Int. Cl.

| | |
|---|---|
| ***H04W 72/1268*** | (2023.01) |
| ***H04L 5/00*** | (2006.01) |
| ***H04W 72/231*** | (2023.01) |

(52) U.S. Cl.
CPC ....... *H04W 72/1268* (2013.01); *H04L 5/0023* (2013.01); *H04L 5/0051* (2013.01); *H04W 72/231* (2023.01)

(58) Field of Classification Search
CPC ............ H04W 12/1268; H04W 72/231; H04L 5/0023; H04L 5/0051
(Continued)

(56) References Cited

U.S. PATENT DOCUMENTS

2021/0281455 A1* 9/2021 Lee ........................... H04L 1/00
2024/0032034 A1* 1/2024 Zheng .................. H04L 5/0094
(Continued)

FOREIGN PATENT DOCUMENTS

CN 111096036 A 5/2020
CN 112088514 A 12/2020

OTHER PUBLICATIONS

Fujitsu: "Prioritization and UE Autonomous Switching", 3GPP TSG-RAN WG2 Meeting #106, R2-1906254 (Resubmission of R2-1903788), Reno, USA, 3 Pages, May 13-May 17, 2019, the whole document.
(Continued)

*Primary Examiner* — Faisal Choudhury
(74) *Attorney, Agent, or Firm* — Holland & Hart LLP

(57) ABSTRACT

Methods, systems, and devices for wireless communication are described. In some systems, a user equipment (UE) may support multiple communications schemes, including a time division multiplexing (TDM) scheme, a frequency division multiplexing (FDM) scheme, a spatial division multiplexing (SDM) scheme, and a single transmission/reception point (sTRP) scheme. The UE may receive control signaling that indicates the multiple communications schemes and downlink control information (DCI) that schedules an uplink data message. The DCI may indicate one or more sounding reference signal (SRS) resource sets associated with the uplink data message. The UE may transmit the uplink data message in accordance with a switching arrangement for switching between the communications schemes. The switching arrangement may be indicated for the uplink data message by one or more of the control signaling, the DCI, or the one or more SRS resource sets.

25 Claims, 21 Drawing Sheets

(58) Field of Classification Search
USPC .......................................................... 370/329
See application file for complete search history.

(56) References Cited

U.S. PATENT DOCUMENTS

2024/0048346 A1* 2/2024 Zhang .................. H04L 5/0044
2025/0125927 A1* 4/2025 Nilsson ................ H04L 5/0094

OTHER PUBLICATIONS

International Search Report and Written Opinion—PCT/CN2021/131654—ISA/EPO—Apr. 26, 2022.

* cited by examiner

DYNAMIC SWITCHING BETWEEN COMMUNICATIONS SCHEMES FOR UPLINK COMMUNICATIONS

CROSS REFERENCE

The present application is a 371 national stage filing of International PCT Application No. PCT/CN2021/131654 by Chen et al. entitled "DYNAMIC SWITCHING BETWEEN COMMUNICATIONS SCHEMES FOR UPLINK COMMUNICATIONS," filed Nov. 19, 2021, which is assigned to the assignee hereof, and which is expressly incorporated by reference in its entirety herein.

FIELD OF TECHNOLOGY

The following relates to wireless communication, including dynamic switching between communications schemes for uplink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (FDMA), frequency division multiple access (FDMA), orthogonal FDMA (OFDMA), or discrete Fourier transform spread orthogonal FDM (DFT-S-OFDM). A wireless multiple-access communications system may include one or more base stations or one or more network access nodes, each simultaneously supporting communication for multiple communication devices, which may be otherwise known as user equipment (UE).

In some systems, a UE may support transmission of one or more uplink data messages according to any one of a time division multiplexing (TDM) scheme, a spatial division multiplexing (SDM) scheme, and an FDM scheme.

SUMMARY

The described techniques relate to improved methods, systems, devices, and apparatuses that support dynamic switching between communications schemes for uplink communications. Generally, the described techniques provide for a user equipment (UE) to switch between a set of multiple communications schemes for transmission of one or more uplink data messages. The UE may receive control signaling that indicates a configuration of the set of multiple communications schemes for uplink communications by the UE. The set of multiple communications schemes may include a time division multiplexing (TDM) scheme, a frequency division multiplexing (FDM) scheme, a spatial division multiplexing (SDM) scheme, a single transmission/reception point (sTRP) transmission scheme, or any combination thereof. The UE may receive, after receiving the control signaling, downlink control information (DCI) that schedules at least one uplink data message and indicates one or more sounding reference signal (SRS) resource sets associated with the uplink data message. A switching arrangement for switching between the multiple sets of communications schemes may be indicated by one or more of the control signaling, the DCI, or the one or more SRS resources sets. The UE may transmit the uplink data message in accordance with the switching arrangement. For example, the UE may transmit a portion of the uplink data message or one or more repetitions of the uplink data message using one of the communications schemes and based on the indicated switching arrangement.

A method for wireless communication at a UE is described. The method may include receiving control signaling that indicates a configuration of a set of multiple communications schemes for uplink communications by the UE, the set of multiple communications schemes including an FDM scheme, a TDM scheme, an SDM scheme, and an sTRP transmission scheme, receiving DCI that schedules an uplink data message and indicates one or more SRS resource sets associated with the uplink data message, where a switching arrangement between the set of multiple communications schemes is indicated for the uplink data message by one or more of the control signaling, the DCI, or the one or more SRS resource sets, and transmitting the uplink data message in accordance with the switching arrangement.

An apparatus for wireless communication at a UE is described. The apparatus may include a processor, memory coupled with the processor, and instructions stored in the memory. The instructions may be executable by the processor to cause the apparatus to receive control signaling that indicates a configuration of a set of multiple communications schemes for uplink communications by the UE, the set of multiple communications schemes including an FDM scheme, a TDM scheme, an SDM scheme, and an sTRP transmission scheme, receive DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets, and transmit the uplink data message in accordance with the switching arrangement.

Another apparatus for wireless communication at a UE is described. The apparatus may include means for receiving control signaling that indicates a configuration of a set of multiple communications schemes for uplink communications by the UE, the set of multiple communications schemes including an FDM scheme, a TDM scheme, an SDM scheme, and an sTRP transmission scheme, means for receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets, and means for transmitting the uplink data message in accordance with the switching arrangement.

A non-transitory computer-readable medium storing code for wireless communication at a UE is described. The code may include instructions executable by a processor to receive control signaling that indicates a configuration of a set of multiple communications schemes for uplink communications by the UE, the set of multiple communications schemes including an FDM scheme, a TDM scheme, an SDM scheme, and an sTRP transmission scheme, receive DCI that schedules an uplink data message and indicates one or more SRS resource sets associated with the uplink data message, where a switching arrangement between the set of multiple communications schemes is indicated for the uplink data message by one or more of the control signaling, the DCI, or the one or more SRS resource sets, and transmit the uplink data message in accordance with the switching arrangement.

In some examples of the method, apparatuses, and non-transitory computer-readable medium described herein, receiving the DCI may include operations, features, means, or instructions for receiving a switching indication field, where a value of the switching indication field indicates the switching arrangement between the set of multiple communications schemes for the uplink data message.

In some examples of the method, apparatuses, and non-transitory computer-readable medium described herein, the one or more SRS resource sets indicated via the DCI include a first SRS resource set and a second SRS resource set associated with the uplink data message and the switching arrangement indicates an arrangement for transmitting a first portion or a first repetition of the uplink data message in accordance with a first set of parameters associated with the first SRS resource set and for transmitting a second portion or a second repetition of the uplink data message in accordance with a second set of parameters associated with the second SRS resource set.

In some examples of the method, apparatuses, and non-transitory computer-readable medium described herein, receiving the control signaling may include operations, features, means, or instructions for receiving a radio resource control (RRC) message that indicates an uplink switching mode for the UE, the uplink switching mode associated with a switch between a subset of communications schemes of the set of multiple communications schemes and selected from one of a first uplink switching mode and a second uplink switching mode. In some examples, the first uplink switching mode may be associated with a first subset of communications schemes including the SDM scheme and the sTRP transmission scheme, and the second uplink switching mode may be associated with a second subset of communications schemes including the FDM scheme, the TDM scheme, and the sTRP transmission scheme.

Some examples of the method, apparatuses, and non-transitory computer-readable medium described herein may further include operations, features, means, or instructions for determining a communications scheme of the set of multiple communications schemes for transmitting the uplink data message based on the indicated uplink switching mode and the value of the switching indication field, where each value of the switching indication field indicates a respective communications scheme of the subset of communications schemes associated with the uplink switching mode.

In some examples of the method, apparatuses, and non-transitory computer-readable medium described herein, the uplink switching mode may be the first uplink switching mode and the method, apparatuses, and non-transitory computer-readable medium may include further operations, features, means, or instructions for determining whether a communications scheme of the set of multiple communications schemes for transmitting the uplink data message is the SDM scheme or the sTRP transmission scheme based on the value of the switching indication field. In some examples, a first set of values of the switching indication field indicates the sTRP transmission scheme and a second set of values of the switching indication field indicates the SDM scheme.

In some examples of the method, apparatuses, and non-transitory computer-readable medium described herein, the uplink switching mode may be the second uplink switching mode and the method, apparatuses, and non-transitory computer-readable medium may include further operations, features, means, or instructions for determining that a communications scheme of the set of multiple communications schemes for transmitting a set of multiple sets of repetitions of the uplink data message is associated with multiple TRPs based on one or more first values of the switching indication field and a value of a time domain resource allocation (TDRA) field in the DCI, where the value of the TDRA field of the DCI indicates whether the communications scheme may be the FDM scheme or the TDM scheme.

Some examples of the method, apparatuses, and non-transitory computer-readable medium described herein may further include operations, features, means, or instructions for determining the switching arrangement and a communications scheme of the set of multiple communications schemes for transmitting the uplink data message based on the value of the switching indication field, where each value of a set of multiple values of the switching indication field indicates a respective switching arrangement of a set of multiple switching arrangements and a respective communications scheme of the set of multiple communications schemes for transmitting the uplink data message.

In some examples of the method, apparatuses, and non-transitory computer-readable medium described herein, the DCI further includes a first resource indication field associated with a first set of multiple values and a second resource indication field associated with a second set of multiple values. In some examples, a first subset of values of the first set of multiple values may be associated with resource indications for a first SRS resource set based on the switching indication field indicating the SDM scheme, and a second subset of values of the second set of multiple values may be associated with resource indications for a second SRS resource set based on the switching indication field indicating the SDM scheme.

In some examples of the method, apparatuses, and non-transitory computer-readable medium described herein, the DCI further includes a first resource indication field associated with a first set of multiple values and a second resource indication field associated with a second set of multiple values. In some examples, a first subset of values of the first set of multiple values may be associated with resource indications for a first SRS resource set based on the switching indication field indicating the SDM scheme, and a second subset of values of the first set of multiple values may be associated with resource indications for a second SRS resource set based on the switching indication field indicating the SDM scheme.

In some examples of the method, apparatuses, and non-transitory computer-readable medium described herein, receiving the control signaling may include operations, features, means, or instructions for receiving an RRC message that indicates two or more SRS resource sets for the UE, where the RRC message indicates a communications scheme of the set of multiple communications schemes for transmission of the uplink data message, and where transmitting the uplink data message may be based on the communications scheme indicated via the RRC message.

Some examples of the method, apparatuses, and non-transitory computer-readable medium described herein may further include operations, features, means, or instructions for determining the communications scheme based on the RRC message and a frequency band on which the uplink data message may be transmitted, where the RRC message indicates a respective communications scheme of the set of multiple communications schemes for each frequency band of a set of multiple frequency bands.

Some examples of the method, apparatuses, and non-transitory computer-readable medium described herein may further include operations, features, means, or instructions for determining the communications scheme based on the RRC message and a configuration of the DCI, where the RRC message indicates a respective communications scheme of the set of multiple communications schemes for each type of the DCI of a set of multiple types.

In some examples of the method, apparatuses, and non-transitory computer-readable medium described herein, receiving the control signaling may include operations, features, means, or instructions for receiving a medium access control-control element (MAC-CE) that indicates a communications scheme of the set of multiple communications schemes for transmission of the uplink data message, where transmitting the uplink data message may be based on the communications scheme indicated via the MAC-CE.

Some examples of the method, apparatuses, and non-transitory computer-readable medium described herein may further include operations, features, means, or instructions for receiving an RRC message that indicates two SRS resource sets for the UE, where the MAC-CE disables a first SRS resource set of the two SRS resource sets, and where a presence of a switching indication field in the DCI may be based on disabling the first SRS resource set.

A method for wireless communication at a base station is described. The method may include transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme, transmitting, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets, and receiving, from the UE, the uplink data message in accordance with the switching arrangement.

An apparatus for wireless communication at a base station is described. The apparatus may include a processor, memory coupled with the processor, and instructions stored in the memory. The instructions may be executable by the processor to cause the apparatus to transmit, to a UE, control signaling that indicates a configuration of a set of multiple communications schemes for uplink communications by the UE, the set of multiple communications schemes including an FDM scheme, a TDM scheme, an SDM scheme, and an sTRP transmission scheme, transmit, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets, and receive, from the UE, the uplink data message in accordance with the switching arrangement.

Another apparatus for wireless communication at a base station is described. The apparatus may include means for transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme, means for transmitting, to the UE, DCI that schedules an uplink data message and indicates one or more SRS resource sets associated with the uplink data message, where a switching arrangement between the set of multiple communications schemes is indicated for the uplink data message by one or more of the control signaling, the DCI, or the one or more SRS resource sets, and means for receiving, from the UE, the uplink data message in accordance with the switching arrangement.

A non-transitory computer-readable medium storing code for wireless communication at a base station is described. The code may include instructions executable by a processor to transmit, to a UE, control signaling that indicates a configuration of a set of multiple communications schemes for uplink communications by the UE, the set of multiple communications schemes including an FDM scheme, a TDM scheme, an SDM scheme, and an sTRP transmission scheme, transmit, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets, and receive, from the UE, the uplink data message in accordance with the switching arrangement.

In some examples of the method, apparatuses, and non-transitory computer-readable medium described herein, transmitting the DCI may include operations, features, means, or instructions for transmitting a switching indication field, where a value of the switching indication field indicates the switching arrangement between the set of multiple communications schemes for the uplink data message.

In some examples of the method, apparatuses, and non-transitory computer-readable medium described herein, the one or more SRS resource sets indicated via the DCI include a first SRS resource set and a second SRS resource set associated with the uplink data message and the switching arrangement indicates an arrangement for transmitting a first portion or a first repetition of the uplink data message in accordance with a first set of parameters associated with the first SRS resource set and for transmitting a second portion or a second repetition of the uplink data message in accordance with a second set of parameters associated with the second SRS resource set.

In some examples of the method, apparatuses, and non-transitory computer-readable medium described herein, transmitting the control signaling may include operations, features, means, or instructions for transmitting an RRC message that indicates an uplink switching mode for the UE, the uplink switching mode associated with a switch between a subset of communications schemes of the set of multiple communications schemes and selected from one of a first uplink switching mode and a second uplink switching mode. In some examples, the first uplink switching mode may be associated with a first subset of communications schemes including the SDM scheme and the sTRP transmission scheme, and the second uplink switching mode may be associated with a second subset of communications schemes including the FDM scheme, the TDM scheme, and the sTRP transmission scheme.

In some examples of the method, apparatuses, and non-transitory computer-readable medium described herein, each value of the switching indication field indicates a respective communications scheme of the subset of communications schemes associated with the indicated uplink switching mode.

In some examples of the method, apparatuses, and non-transitory computer-readable medium described herein, the uplink switching mode may be the first uplink switching mode, and a first set of values of the switching indication field may indicate the sTRP transmission scheme, and a second set of values of the switching indication field may indicate the SDM scheme.

In some examples of the method, apparatuses, and non-transitory computer-readable medium described herein, the uplink switching mode may be the second uplink switching mode, and one or more first values of the switching indication field may correspond to a communications scheme of the set of multiple communications schemes that may be associated with multiple TRPs, and a value of a TDRA field in the DCI indicates whether the communications scheme may be the FDM scheme or the TDM scheme.

In some examples of the method, apparatuses, and non-transitory computer-readable medium described herein, each value of a set of multiple values of the switching indication field indicates a respective switching arrangement of a set of multiple switching arrangements and a respective communications scheme of the set of multiple communications schemes for transmitting the uplink data message.

In some examples of the method, apparatuses, and non-transitory computer-readable medium described herein, the DCI further includes a first resource indication field associated with a first set of multiple values and a second resource indication field associated with a second set of multiple values, a first subset of values of the first set of multiple values may be associated with resource indications for a first SRS resource set based on the switching indication field indicating the SDM scheme, and a second subset of values of the second set of multiple values may be associated with resource indications for a second SRS resource set based on the switching indication field indicating the SDM scheme.

In some examples of the method, apparatuses, and non-transitory computer-readable medium described herein, the DCI further includes a first resource indication field associated with a first set of multiple values and a second resource indication field associated with a second set of multiple values, a first subset of values of the first set of multiple values may be associated with resource indications for a first SRS resource set based on the switching indication field indicating the SDM scheme, and a second subset of values of the first set of multiple values may be associated with resource indications for a second SRS resource set based on the switching indication field indicating the SDM scheme.

In some examples of the method, apparatuses, and non-transitory computer-readable medium described herein, transmitting the control signaling may include operations, features, means, or instructions for transmitting an RRC message that indicates two or more SRS resource sets for the UE, where the RRC message indicates a communications scheme of the set of multiple communications schemes for transmission of the uplink data message, and where transmitting the uplink data message may be based on the communications scheme indicated via the RRC message.

In some examples of the method, apparatuses, and non-transitory computer-readable medium described herein, transmitting the control signaling may include operations, features, means, or instructions for transmitting a MAC-CE that indicates a communications scheme of the set of multiple communications schemes for transmission of the uplink data message, where transmitting the uplink data message may be based on the communications scheme indicated via the MAC-CE.

Some examples of the method, apparatuses, and non-transitory computer-readable medium described herein may further include operations, features, means, or instructions for transmitting an RRC message that indicates two SRS resource sets for the UE, where the MAC-CE disables a first SRS resource set of the two reference signal resource sets, and where a presence of a switching indication field in the DCI may be based on disabling the first SRS resource set.

DETAILED DESCRIPTION

Figure 1:
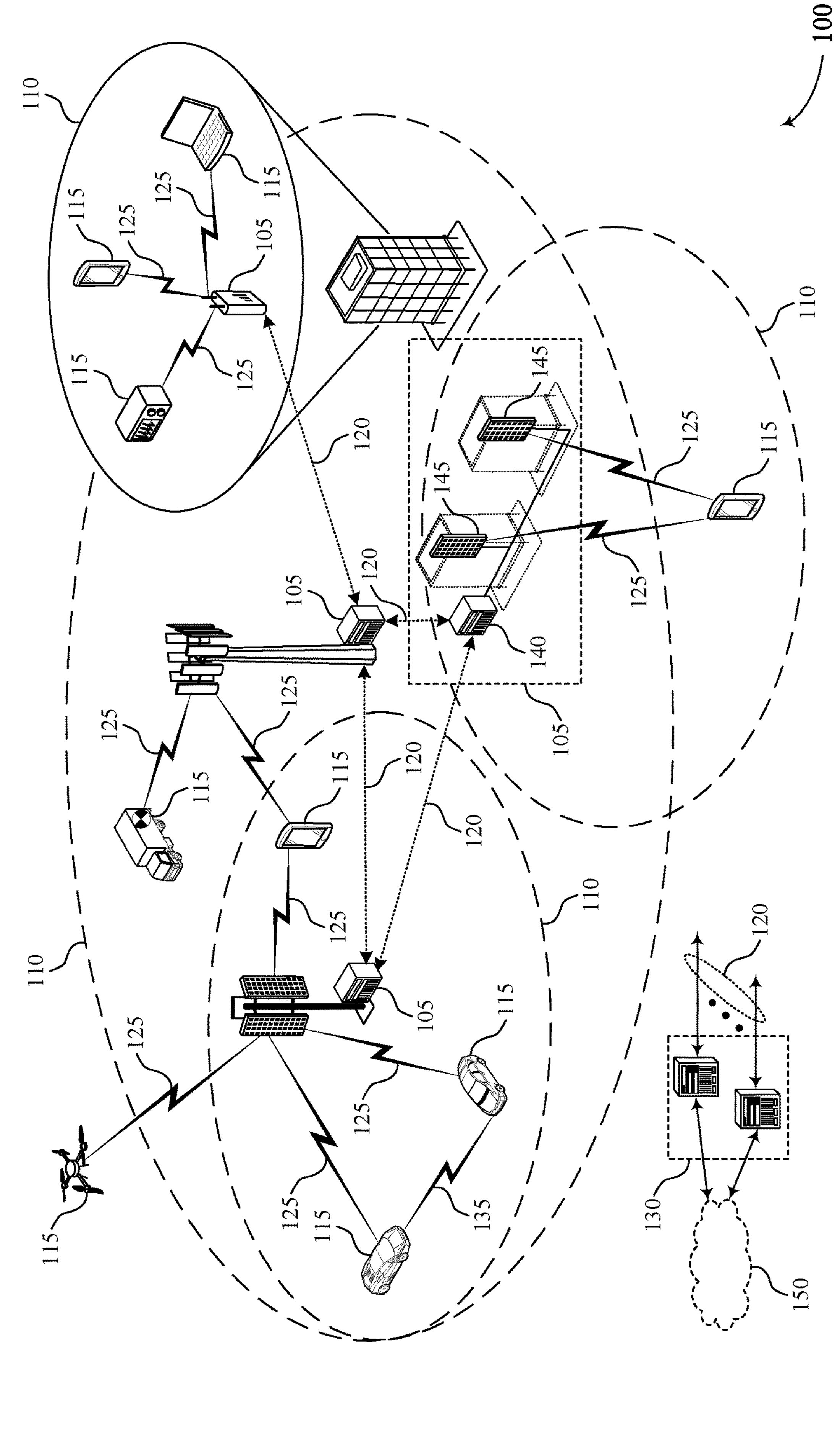
FIG. 1 illustrates an example of a wireless communications system that supports dynamic switching between communications schemes for uplink communications in accordance with aspects of the present disclosure.

In some wireless communications systems, a user equipment (UE) may transmit uplink data messages to a base station via an uplink data channel. The base station may transmit control signaling to the UE to indicate a configuration of a sounding reference signal (SRS) resource set for the uplink data transmissions. The base station may transmit downlink control information (DCI) that schedules each uplink data message. The DCI may include an SRS resource indication (SRI) field that indicates one or more of the SRS resources from the SRS resource set. The UE may transmit the uplink message using transmission parameters that are associated with the indicated SRS resource(s).

A UE may receive DCI that schedules multiple repetitions of an uplink data message over time. If the UE supports time division multiplexing (TDM) for uplink communication, a first subset of the uplink repetitions may be associated with a different set of transmission parameters than a second subset of the uplink repetitions. In such cases, the DCI may include a switching indication field that indicates whether the UE is to use transmission parameters associated with a first SRS resource set, a second SRS resource set, or both for transmitting the uplink repetitions. If the DCI indicates both sets of transmission parameters, a first subset of the uplink repetitions may be associated with the first resource set and directed toward a first transmission/reception point (TRP) and a second subset of the repetitions may be associated with the second resource set and directed toward a second TRP. If the UE supports a spatial division multiplexing (SDM) scheme or a frequency division multiplexing (FDM) scheme for uplink communication, different spatial layers or sets of resource blocks (RBs) of an uplink data message may be associated with different SRS resource sets and directed toward different TRPs. A configuration for indicating a switching arrangement that supports switching between TDM, FDM, and SDM schemes may be beneficial.

As described herein, a base station may transmit control signaling, DCI, or both to indicate a switching arrangement for the UE to switch between communications schemes and corresponding transmission parameters for uplink communications according to any of a TDM scheme, an FDM scheme, an SDM scheme, and a single TRP (sTRP) scheme. The base station may transmit control signaling to the UE to indicate a configuration of the multiple communications schemes. The control signaling may additionally or alternatively configure two or more SRS resource sets for the UE. The base station may subsequently transmit DCI to the UE to schedule an uplink data message, one or more repetitions of the uplink data message, or both. One or more SRI fields in the DCI may indicate one or more SRS resources from the SRS resource sets that are associated with the uplink data message. The indicated SRS resources may correspond to one or more sets of transmission parameters that the UE may use to transmit the uplink data message. The control signaling, the DCI, or both may indicate, to the UE, one of the communications schemes and a switching arrangement for the UE to use to transmit the uplink data message. The UE may transmit the uplink data message using the indicated communication scheme. The UE may transmit one or more portions or repetitions of the uplink data message using different sets of transmission parameters based on the switching arrangement. A portion of the uplink data message may correspond to a set of RBs, a set of spatial layers, or both.

In some examples, the control signaling may be radio resource control (RRC) signaling or a medium access control-control element (MAC-CE) that indicates one of the communications schemes for the UE to use. The UE may subsequently receive the DCI that indicates how the UE should switch between SRS resource sets for transmitting respective portions or repetitions of an uplink data message using the indicated communications scheme. Alternatively, the control signaling may be a MAC-CE that disables all but one of the SRS resource sets configured for the UE, and the UE may transmit the repetitions to a single TRP according to the indicated communications scheme and a single SRS resource set (e.g., without a switching arrangement). In some other examples, the control signaling may indicate a configuration of the SRS resource sets and the multiple communications schemes, and the DCI may indicate a single communications scheme and corresponding switching arrangement for the UE. For example, the UE may support a set of switching arrangements and a value of a switching indication field in the DCI may indicate or point to a single communications scheme and corresponding switching arrangement of the set of switching arrangements for the UE. The switching indication field may be referred to as a dynamic switching field herein. As such, the described techniques provide for a UE to switch between multiple communications schemes for uplink data transmissions.

Aspects of the disclosure are initially described in the context of wireless communications systems. Additional aspects of the disclosure are described with reference to communications scheme configurations, switching arrangements, SRI configurations, and process flows. Aspects of the disclosure are further illustrated by and described with reference to apparatus diagrams, system diagrams, and flowcharts that relate to dynamic switching between communications schemes for uplink communications.

FIG. 1 illustrates an example of a wireless communications system 100 that supports dynamic switching between communications schemes for uplink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal FDM (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM (FDM) techniques, FDM (FDM) techniques, or hybrid FDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may switch between set of multiple communications schemes for transmission of one or more uplink data messages. The UE 115 may receive control signaling from a base station 105 that indicates a configuration of the set of multiple communications schemes for uplink communications by the UE 115. The set of multiple communications schemes may include a TDM scheme, an FDM scheme, an SDM scheme, an sTRP transmission scheme, or any combination thereof. The UE 115 may receive, after receiving the control signaling, DCI that schedules at least one uplink data message and that indicates one or more SRS resource sets associated with the uplink data message. A switching arrangement for switching between the SRS resource sets may be indicated by one or more of the control signaling, the DCI, or the one or more SRS resources sets. The UE 115 may transmit the uplink data message to the base station 105 in accordance with the switching arrangement. For example, the UE 115 may transmit a portion of the uplink data message or one or more repetitions of the uplink data message using one of the communications schemes and based on the indicated switching arrangement.

Figure 2:
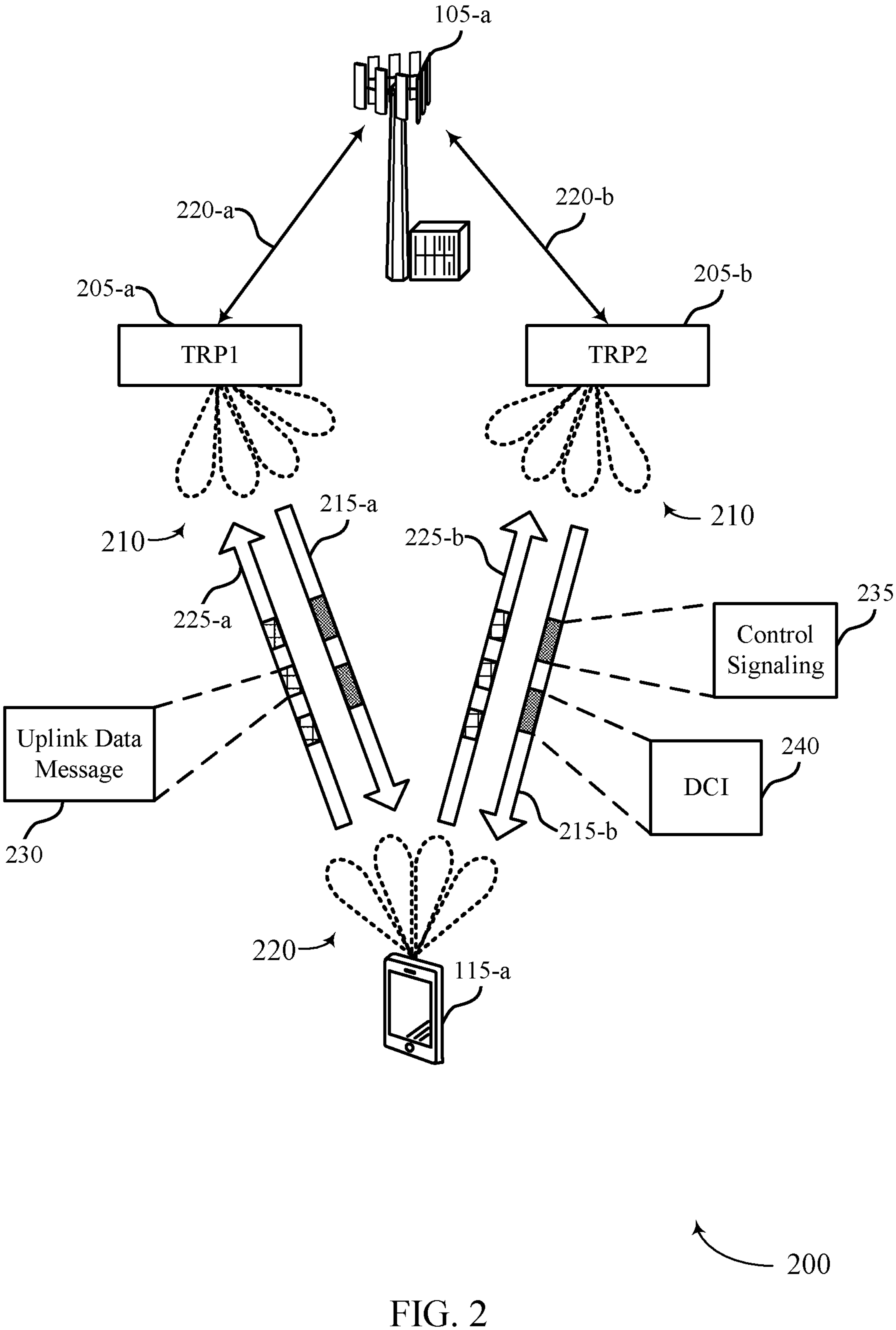
FIG. 2 illustrates an example of a wireless communications system that supports dynamic switching between communications schemes for uplink communications in accordance with aspects of the present disclosure.

FIG. 2 illustrates an example of a wireless communications system 200 that supports dynamic switching between communications schemes for uplink communications in accordance with aspects of the present disclosure. The wireless communications system 200 may implement or be implemented by aspects of the wireless communications system 100 as described with reference to FIG. 1. For example, the wireless communications system 200 may include a base station 105-*a* and a UE 115-*a*, which may represent examples of a UE 115 and a base station 105 as described with reference to FIG. 1.

In the example of FIG. 2, the base station 105-*a* may include, or be in communication with, one or more access network transmission entities, which may be referred to as radio heads, smart radio heads, or TRPs 205. The base station 105-*a* may communicate with the TRPs 205-*a* and 205-*b* via backhaul links 220-*a* and 220-*b*, respectively, which may represent examples of backhaul links 120 as described with reference to FIG. 1. The UE 115-*a* may communicate with the TRPs 205-*a* and 205-*b* via downlink communication links 215 and uplink communication links 225. The TRPs 205 may forward downlink data and control information from the base station 105-*a* to the UE 115-*a*. The TRPs 205 may receive uplink data from the UE 115-*a* and forward the uplink data to the base station 105-*a* via the backhaul links 220. The TRPs 205 and the UE 115-*a* may support beamformed communications. For example, the TRP 205-*a*, the TRP 205-*b*, and the UE 115-*a* may each perform beamforming using a respective set of beams 210 for uplink and downlink communications.

The UE 115-*a* may transmit one or more uplink data messages 230 to the base station 105-*a* via the uplink communication link 225-*a*, the uplink communication link 225-*b*, or both (e.g., via the TRPs 205). In some cases, the base station 105-*a* may schedule the uplink communications by the UE 115-*a*. The base station 105-*a* may configure an SRS resource set for uplink communications by the UE 115-*a*. Each SRS resource in the SRS resource set may be associated with a set of transmission parameters, such as a spatial domain filter (e.g., a beam), a quantity of antenna ports, or other transmission parameters. The base station 105-*a* may transmit a scheduling DCI 240 to the UE 115-*a* to schedule each uplink data message 230. The base station 105-*a* may transmit the scheduling DCI 240 to the UE 115-*a* via a physical downlink control channel (PDCCH) of the downlink communication link 215-*a*, the downlink communication link 215-*b*, or both (e.g., via one or both of the TRPs 205-*a* and 205-*b*). The base station 105-*a* may transmit an SRI field in the DCI 240 that may indicate one or more SRS resources from the SRS resource set that are associated with the respective uplink data message 230. The UE 115-*a* may transmit the uplink data message 230 using transmission parameters that are associated with the indicated SRS resource(s).

The UE 115-*a* may support two types of uplink communications, such as codebook-based physical uplink shared data channel (PUSCH) communications and non-codebook-based PUSCH communications. The SRS resources may be configured based on the type of uplink communications. For codebook-based PUSCH, the base station 105-*a* may transmit control signaling 235 (e.g., RRC signaling) that configures the SRS resource set for codebook-based PUSCH (e.g., an SRS resource set with "usage" set to "codebook"). The SRS resource set may include a first quantity of SRS resources configured for the UE 115-*a* (e.g., a maximum of four SRS resources, or some other quantity of resources). Each SRS resource in the SRS resource set may be configured with a quantity of antenna ports (e.g., nrofSRS-Ports). The SRI field in the DCI 240 may indicate a single SRS resource from the SRS resource set. The UE 115-*a* may determine a quantity of antenna ports to use for transmitting the uplink data message 230 based on a quantity of antenna ports that are associated with the indicated SRS resources. The quantity of antenna ports may, in some cases, correspond to a quantity of spatial layers of the uplink data message 230, a quantity of TRPs 205 associated with the uplink data message 230, or both. The UE 115-*a* may transmit the uplink data message 230 using a same spatial domain filter (e.g., beam) as the indicated SRS resource. The DCI 240 may include a different field, such as a precoding information and number of layers field, configured to indicate a quantity of spatial layers (e.g., a rank) and a precoder (e.g., a transmit precoding matrix indicator (TPMI)) for the uplink data message 230.

For non-codebook-based PUSCH, the base station 105-*a* may transmit the control signaling 235 (e.g., RRC signaling) that configures the SRS resource set for non-codebook-based PUSCH (e.g., an SRS resource set with "usage" set to "non-codebook"). The SRS resource set may include a first quantity of SRS resources configured for the UE 115-*a* (e.g., a maximum of four SRS resources, or some other quantity of SRS resources). Each SRS resource in the SRS resource set may be configured with, for example, one antenna port. The SRI field in the DCI 240 may indicate one or more SRS resources from the SRS resource set. The UE 115-*a* may determine a quantity of antenna ports to use for transmitting the uplink data message 230 based on a quantity of SRS resources that are indicated via the DCI 240. The quantity of antenna ports may, in some cases, correspond to a quantity of spatial layers of the uplink data message 230, a quantity of TRPs 205 associated with the uplink data message 230, or both. The UE 115-*a* may transmit the uplink data message 230 using a same spatial domain filter (e.g., beam) as the indicated SRS resource(s). For both codebook-based and non-codebook-based PUSCH, a size of the SRI field in the DCI 240 (e.g., a quantity of bits) may be based on a quantity of SRS resources within the SRS resource set configured for the UE 115-*a*.

The UE 115-*a* may support PUSCH repetition in a TDM manner. For example, the UE 115-*a* may receive a single DCI 240 that schedules a first uplink data message 230 and one or more repetitions of the uplink data message 230, where each uplink repetition may be transmitted at a different time (e.g., in a TDM fashion). In some cases, the DCI 240 may indicate different transmission parameters for the uplink repetitions. The UE 115-*a* may be configured with two or more SRS resource sets, and the DCI 240 may include a first resource indication field (e.g., an SRI or TPMI field) for indicating a first SRS resource from a first SRS set and a second resource indication field for indicating a second SRS resource from a second SRS resource set. That is, uplink repetitions that are scheduled by a same DCI 240 may belong to two sets, where each set may be associated with a different SRS resource set and a different set of transmission parameters. The transmission parameters may include spatial relation parameters (e.g., a beam), power control parameters, precoding parameters, or any combination thereof.

In some examples, each SRS resource set and corresponding set of transmission parameters may correspond to a different TRP 205. For example, the first set of transmission parameters may indicate a beam and power control parameters that are targeted toward a first TRP 205-*a* and the second set of transmission parameters may indicate a beam and power control parameters that are targeted toward a second TRP 205-*b*. The UE 115-*a* may thereby support PUSCH repetition in an sTRP manner (e.g., using a single SRS resource set) and a multi-TRP TDM manner (e.g., using multiple SRS resource sets).

To support switching between sTRP and multi-TRP TDM communications, the DCI 240 may include a switching field that is configured to indicate a switching arrangement (e.g., a pattern or configuration) for switching between the two sets of transmission parameters for the uplink repetitions. A value of the switching field (e.g., a two-bit field) may indicate whether the UE 115-*a* is to transmit the uplink repetitions using one or two SRS resource sets, and which repetitions are associated with which resource sets. Table 1 illustrates example values of the uplink switching field and corresponding switching arrangements. In some examples, such as in the example of Table 1, the value of the switching field may be referred to as a codepoint.

TABLE 1

Switching Arrangements for sTRP and multi-TRP TDM PUSCH

| Codepoint | SRS Resource Set(s) | SRI/TPMI |
|---|---|---|
| 00 | s-TRP mode with 1$^{st}$ SRS Resource Set (TRP1) | 1$^{st}$ SRI/TPMI Field (2$^{nd}$ field is unused) |
| 01 | s-TRP mode with 2$^{nd}$ SRS Resource Set (TRP2) | 1$^{st}$ SRI/TPMI Field (2$^{nd}$ field is unused) |
| 10 | m-TRP mode with (TRP1, TRP2) order 1$^{st}$ SRI/TPMI field: 1$^{st}$ SRS Resource Set 2$^{nd}$ SRI/TPMI field: 2$^{nd}$ SRS Resource Set | Both 1$^{st}$ and 2$^{nd}$ SRI/TPMI fields |
| 11 | m-TRP mode with (TRP2, TRP1) order 1$^{st}$ SRI/TPMI field: 1$^{st}$ SRS Resource Set 2$^{nd}$ SRI/TPMI field: 2$^{nd}$ SRS Resource Set | Both 1$^{st}$ and 2$^{nd}$ SRI/TPMI fields |

In the example of Table 1, the switching field may include two bits and may indicate that the UE 115-*a* is to use the first set of parameters associated with the first SRS resource set and the TRP 205-*a* (e.g., TRP1), use the second set of parameters associated with the second SRS resource set and the TRP 205-*b* (e.g., TRP2), use both sets of parameters for two sets of uplink repetitions with a first order (e.g., TRP1, TRP2), or to use both sets of parameters for two sets of uplink repetitions with a second order (e.g., TRP2, TRP1). The first SRS resource set may be the SRS resource set that has the lowest ID value (e.g., ID=2) of the two SRS resource sets configured for the UE 115-*a*. The other SRS resource set with a higher ID value (e.g., ID=4) may be configured as the second SRS resource set.

The order of the switching arrangement (e.g., for the codepoints 10 and 11) may indicate which SRS resource set to use for a first uplink repetition in time, and the UE 115-*a* may alternate between the SRS resource sets for transmission of the remaining uplink repetitions in accordance with the order and the sets of uplink repetitions. For example, if the switching field indicates the codepoint 10, the UE 115-*a* may transmit a first uplink repetition in accordance with the first set of transmission parameters directed toward the TRP 205-*a*, a second uplink data message in accordance with the second set of transmission parameters directed toward the TRP 205-*b*, and the UE 115-*a* may continue to transmit remaining uplink repetitions in an alternating fashion. A quantity of uplink repetitions (e.g., a repetition number) may be indicated by a value of a time domain resource allocation (TDRA) field in the DCI 240. The described switching field may be applied for both codebook-based PUSCH and non-codebook-based PUSCH communications.

The UE 115-*a* as described herein may support FDM and SDM schemes for uplink data transmissions (e.g., PUSCH) in addition to, or as an alternative to, the described TDM scheme. For example, the UE 115-*a* may receive control signaling 235 that indicates multiple communications schemes for the UE 115-*a*, including a TDM scheme, an FDM scheme, an SDM scheme, an sTRP transmission scheme, or any combination thereof. The TDM scheme, the FDM scheme, and the SDM scheme may be associated with multi-TRP transmissions, and the sTRP transmission scheme may correspond to transmission of uplink repetitions directed to a single TRP 205. During the TDM, FDM, or SDM schemes, the UE 115-*a* may transmit one or more portions (e.g., a set of RBs or spatial layers) or one or more repetitions of the uplink data message toward each of the TRP 205-*a* and the TRP 205-*b* (e.g., and/or one or more other TRPs 205). During the sTRP transmission scheme, the UE 115-*a* may transmit each portion and uplink repetition of the uplink data message to a same TRP 205. The TDM, FDM, and SDM schemes are illustrated and described in further detail with respect to FIG. 3.

In some examples, the UE 115-*a* may be configured with two SRS resource sets, and each SRS resource set may correspond to a different TRP 205 and corresponding set of transmission parameters. For example, each TRP 205 may be associated with a respective SRS resource set and corresponding set of transmission parameters. For multi-TRP communications, the UE 115-*a* may transmit a first set of RBs, a first set of spatial layers, or a first set of uplink repetitions toward the TRP 205-*a* in accordance with a first set of transmission parameters. The first set of transmission parameters may be indicated by a first SRI field in the DCI 240 that indicates SRS resources from a first SRS resource set. The UE 115-*a* may transmit a second set of RBs, a second set of spatial layers, or a second set of uplink repetitions toward the TRP 205-*b* in accordance with a second set of transmission parameters. The second set of transmission parameters may be indicated by a second SRI field in the DCI 240 that indicates SRS resources from a second SRS resource set. In some cases, the switching field in DCI may not be configured to support switching between TDM, FDM, and SDM schemes.

Enhanced signaling described herein may provide for the base station 105-*a* to dynamically or semi-statically indicate, to the UE 115-*a*, which communications scheme to use and a switching arrangement for switching between sets of transmission parameters for the indicated communications schemes. For example, the wireless communications system 200 may support enhanced control signaling 235, an enhanced DCI 240, or both that are capable of indicating a communications scheme and a switching arrangement for the UE 115-*a* to use for transmitting one or more uplink repetitions of an uplink data message 230. The switching arrangement may correspond to a mode, configuration, or pattern for the UE 115-*a* to use for switching between sets of transmission parameters for each portion (e.g., set of RBs or spatial layers) or repetition of the uplink data message 230. The enhanced signaling may be used for codebook or non-codebook-based communications when a UE 115 is configured with two or more SRS resource sets.

The base station 105-*a* may transmit the control signaling 235 to the UE 115-*a* to indicate a configuration of the two or more SRS resource sets for the UE 115-*a*. The two or more SRS resource sets may be configured for codebook or non-codebook-based PUSCH. In some examples, the control signaling 235 may include an RRC message that configures two SRS resource sets and indicates a communications scheme for the UE 115-*a* to use for performing subsequent uplink transmissions. The communications scheme may be one of the FDM, TDM, or SDM schemes. The UE 115-*a* may transmit subsequent uplink data messages 230 in accordance with the indicated communications scheme. In some examples, the RRC message may configure a communications scheme per frequency band (e.g., per component carrier or per bandwidth part (BWP)). The UE 115-*a* may determine which communications scheme to use based on the RRC message and a frequency band on which the uplink repetitions are scheduled. Additionally or alternatively, the RRC message may configure a communications scheme per type of the DCI 240. For example, the RRC message may configure a respective communications scheme for each format of the DCI 240 (e.g., DCI format 0_1 or 0_2 for dynamically granted PUSCH), or the RRC message may configure a respective communications scheme for each grant configuration (e.g., for configured grant PUSCH). The UE 115-*a* may determine which communications scheme to use for transmitting uplink repetitions based on the RRC message and a type of the DCI 240 or other scheduling grant that the UE 115-*a* receives.

Additionally or alternatively, the base station 105-*a* may transmit the RRC message to indicate the configuration of the two SRS resource sets, and the base station 105-*a* may subsequently transmit a MAC-CE to indicate a communications scheme. The UE 115-*a* may transmit subsequent uplink data messages 230 in accordance with the communications scheme indicated via the MAC-CE. The MAC-CE may be transmitted dynamically or semi-statically to indicate a switch or change in communications schemes to the UE 115-*a*. The MAC-CE may additionally, or alternatively, enable or disable one or more of the SRS resource sets configured for the UE 115-*a* to enable or disable multi-TRP communications. For example, if the MAC-CE disables one of the two SRS resource sets configured for the UE 115-*a*, the UE 115-*a* may perform single-TRP communications until a subsequent MAC-CE enables both of the SRS resource sets.

The base station 105-*a* may transmit the DCI 240 to the UE 115-*a* after transmitting the control signaling 235 (e.g., the RRC message, the MAC-CE, or both). The DCI 240 may schedule the uplink data message 230 and corresponding uplink repetitions. The DCI 240 may be transmitted dynamically or semi-statically, and may represent an example of a dynamic grant or a configured grant for the UE 115-*a*. The DCI 240 may include two SRI fields. A first SRI field in the DCI 240 may indicate an SRS resource from the first SRS resource set configured for the UE 115-*a* and a second SRI field in the DCI 240 may indicate an SRS resource from the second SRS resource set configured for the UE 115-*a*. The first SRS resource, the second SRS resource, or both may be associated with a respective set of parameters for the UE 115-*a* to use to transmit the uplink data message 230.

To support switching between the sets of transmission parameters for each portion or repetition of the uplink data message 230 as described herein, the DCI 240 may include a dynamic switching field configured to indicate which set(s) of parameters the UE 115-*a* should use and an order for switching between the sets of transmission parameters. If the MAC-CE disables one of the two SRS resource sets for the UE 115-*a*, the dynamic switching field may be empty, or may not be present in the DCI 240. Configurations of the dynamic switching field are described in further detail elsewhere herein, including with reference to FIGS. 4-7.

The described techniques support transmission of uplink data repetitions according to an FDM scheme, a TDM scheme, an SDM scheme, an sTRP transmission scheme, or any combination thereof. The UE 115-*a* may thereby switch between multiple communications schemes for transmission of uplink data messages 230, which may provide for improved communication reliability and efficiency for uplink communications.

Figure 3:
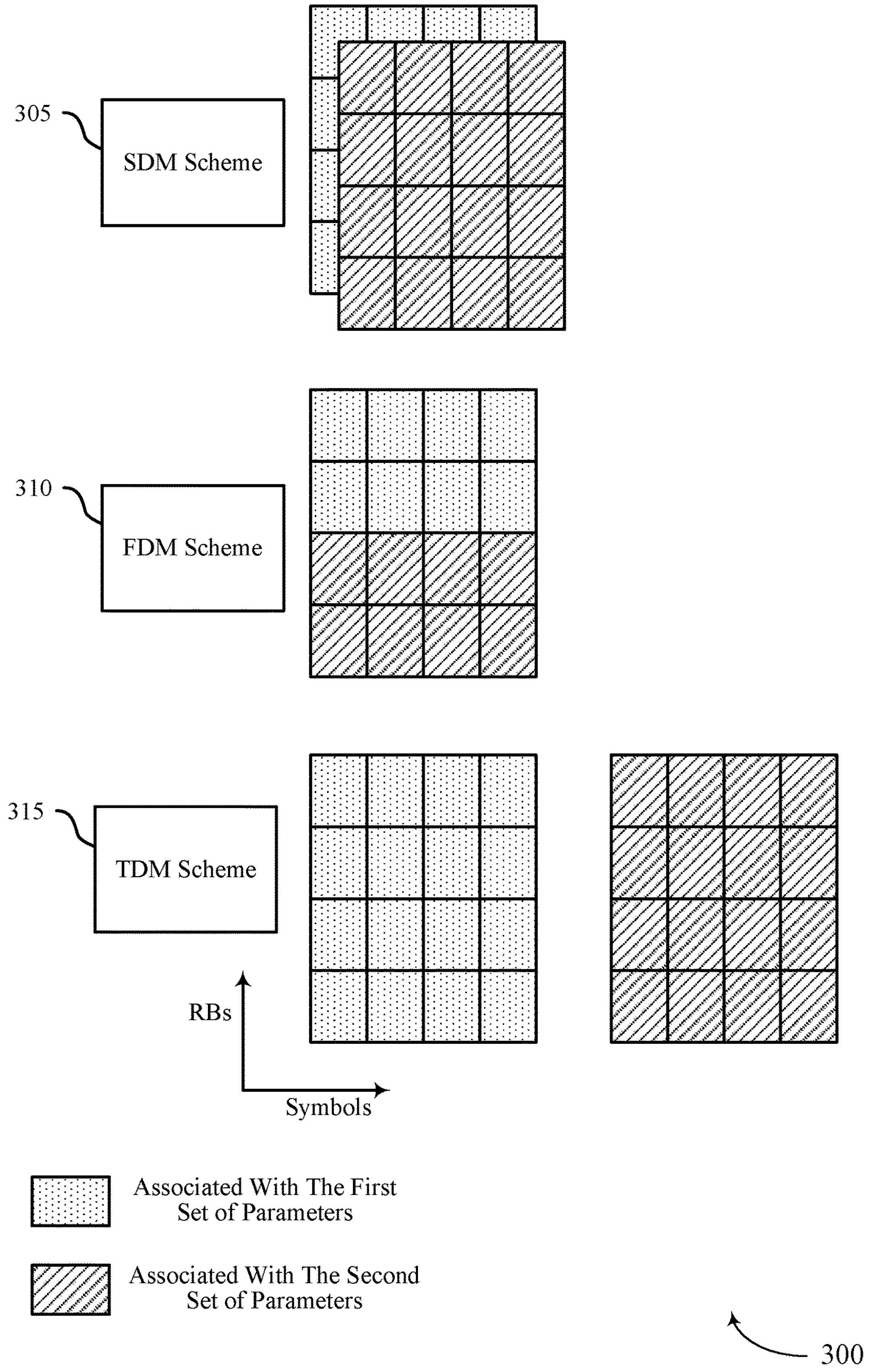
FIG. 3 illustrates an example of a communications scheme configuration that supports dynamic switching between communications schemes for uplink communications in accordance with aspects of the present disclosure.

FIG. 3 illustrates an example of a communications scheme configuration 300 that supports dynamic switching between communications schemes for uplink communications in accordance with aspects of the present disclosure. The communications scheme configuration 300 may implement or be implemented by aspects of the wireless communications systems 100 and 200 as described with reference to FIGS. 1 and 2. For example, the communications scheme configuration 300 illustrates example configurations or allocations of resources for different uplink communications schemes supported by a UE 115, which may represent an example of a UE 115 as described with reference to FIGS. 1 and 2. The UE 115 may transmit uplink data messages to a base station 105 in accordance with one or more of the communications schemes illustrated in the communications scheme configuration 300.

The communications scheme configuration 300 illustrates example allocations of resources for an SDM scheme 305, an FDM scheme 310, and a TDM scheme 315. The UE 115 may support each of the communications schemes, and the UE 115 may receive control signaling, DCI, or both that indicates which scheme the UE 115 should use at a given time. The resources illustrated in FIG. 3 may include symbols in a time domain (e.g., a horizontal axis in FIG. 3) and RBs in a frequency domain (e.g., a vertical axis in FIG. 3). In some examples, the resources may be spatially layered in a spatial domain (e.g., an axis extending out of the page in FIG. 3). Although not illustrated in FIG. 3, each uplink data message may include one or multiple spatial layers, including uplink data messages transmitted according to the FDM scheme 310 or the TDM scheme 315. A quantity of the spatial layers may correspond to a rank of the uplink data message, and may be determined based on a quantity of SRS resources that are indicated, a quantity of antenna ports associated with an indicated SRS resource, or a TPMI field in the DCI, as described with reference to FIG. 2.

If the signaling indicates the SDM scheme 305, the spatial layers of the uplink data message may be grouped into sets of one or more spatial layers, and each set may be associated with same or different transmission parameters. In the example of FIG. 3, a first spatial layer may be transmitted in accordance with a first set of transmission parameters (e.g., a first SRS resource set) and a second spatial layer may be transmitted in accordance with a second set of transmission parameters (e.g., a second SRS resource set). Each set of transmission parameters may be associated with or directed toward a different TRP. As such, the first spatial layer may be transmitted to a first TRP (e.g., TRP 205-*a* in FIG. 2) and the second spatial layer may be transmitted to a second TRP (e.g., TRP 205-*b* in FIG. 2). The UE 115 may determine which set of spatial layers is associated with which set of transmission parameters based on one or more SRI fields in the DCI and a value of a dynamic switching field in the DCI, as described in further detail with reference to FIGS. 4-8. Although not pictured in FIG. 3, it is to be understood that, in some examples, each spatial layer of an uplink data message may be transmitted in accordance with a same set of transmission parameters. In such cases, the uplink data message may be transmitted in an sTRP manner.

If the signaling indicates the FDM scheme 310, the UE 115 may transmit an uplink data message that includes multiple sets of RBs each associated with a same or different set of transmission parameters. In the example of FIG. 3, a first set of RBs in the frequency domain may be transmitted in accordance with the first set of transmission parameters (e.g., a first SRS resource set) and a second set of RBs in the frequency domain may be transmitted in accordance with the second set of transmission parameters (e.g., a second SRS resource set). As such, the first set of RBs may be transmitted to the first TRP and the second set of RBs may be transmitted to the second TRP. The UE 115 may determine which set of RBs is associated with which set of transmission parameters based on one or more SRI fields in the DCI and a value of a dynamic switching field in the DCI, as described in further detail with reference to FIGS. 5-8. Although not pictured in FIG. 3, it is to be understood that, in some examples, each set of RBs in an uplink data message may be transmitted in accordance with a same set of transmission parameters. In such cases, the uplink data message may be transmitted according to an sTRP transmission scheme.

If the signaling indicates the TDM scheme 315, the UE 115 may transmit multiple repetitions of the uplink data message in time. Each repetition of the uplink data message may be associated with a same or different set of transmission parameters. In the example of FIG. 3, a first repetition of the uplink data message may be transmitted in accordance with the first set of transmission parameters (e.g., a first SRS resource set) and a second repetition of the uplink data message may be transmitted in accordance with the second set of transmission parameters (e.g., a second SRS resource set). As such, the first uplink repetition may be transmitted to the first TRP and the second uplink repetition may be transmitted to the second TRP. The UE 115 may determine an order for switching between the sets of transmission parameters based on one or more SRI fields in the DCI and a value of a dynamic switching field in the DCI, as described in further detail with reference to FIGS. 4-8. Although not pictured in FIG. 3, it is to be understood that, in some examples, each repetition of an uplink data message may be transmitted in accordance with a same set of transmission parameters. In such cases, the uplink repetitions may be transmitted according to an sTRP transmission scheme.

A TDRA field in the DCI may indicate a quantity of repetitions of the uplink data message for the UE 115 to transmit in the time domain. The UE 115 may or may not support uplink repetition (e.g., PUSCH repetition) for the SDM scheme 305 and the FDM scheme 310. If the TDRA field indicates more than one repetition for the SDM scheme 305 or the FDM scheme 310, the UE 115 may refrain from transmitting the uplink repetitions, or the UE 115 may repeat the SDM or FDM pattern for each uplink repetition in time. If the UE 115 does not support repetitions for SDM, FDM, or both, the UE 115 may ignore the TDRA field and transmit a single uplink data message. If uplink repetition is enabled for any of the communications schemes, each repetition of an uplink message may include a same quantity of spatial layers. If the uplink data message is scheduled to be transmitted using the FDM scheme 310 or the TDM scheme 315 and with a rank that is greater than one (e.g., more than one spatial layer), each spatial layer may include a same FDM or TDM resource pattern.

As described herein, to support switching between the SDM scheme 305, the FDM scheme 310, and the TDM scheme 315, the UE 115 may receive control signaling, a DCI, or both that indicate which communications scheme to use and a switching arrangement for transmitting uplink data in accordance with the indicated communications scheme. The switching arrangement may correspond to a configuration or pattern for the UE 115 to switch between SRS resource sets and corresponding sets of transmission parameters for transmitting respective sets of spatial layers (e.g., for the SDM scheme 305), respective sets of RBs (e.g., for the FDM scheme 310), or respective repetitions of the uplink data message (e.g., for the TDM scheme 315), as described in further detail with reference to FIGS. 4-8.

Figure 4:
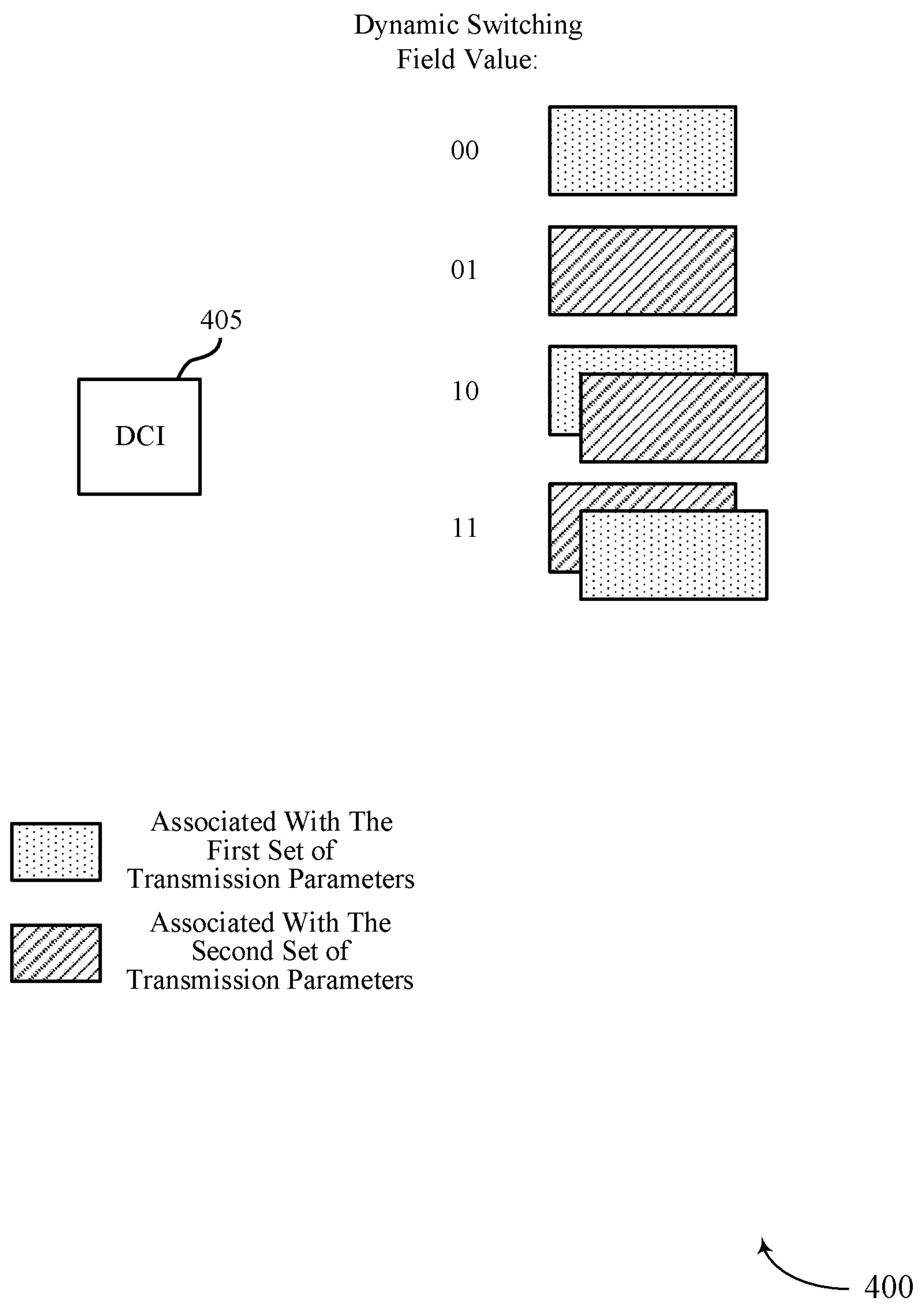
FIGS. 4-6 illustrate examples of switching arrangements that support dynamic switching between communications schemes for uplink communications in accordance with aspects of the present disclosure.

FIG. 4 illustrates an example of a switching arrangement 400 that supports dynamic switching between communications schemes for uplink communications in accordance with aspects of the present disclosure. The switching arrangement 400 may implement or be implemented by aspects of the wireless communications systems 100 and 200, as described with reference to FIGS. 1 and 2. For example, the switching arrangement 400 illustrates example arrangements that may be indicated by a base station 105 to a UE 115 via a dynamic switching field in DCI. The base station 105 and the UE 115 may represent examples of a base station 105 and a UE 115 as described with reference to FIGS. 1 through 3. In this case, the dynamic switching field may indicate arrangements for a UE 115 to switch between an sTRP transmission scheme and an SDM scheme, in which the UE 115 may switch between sets of transmission parameters for transmission of different sets of spatial layers in an SDM manner. The SDM scheme may represent an example of the SDM scheme 305 described with reference to FIG. 3.

As described with reference to FIG. 2, the UE 115 may receive control signaling (e.g., an RRC configuration) from the base station 105 that configures the UE 115 with a first SRS resource set and a second SRS resource set for uplink communications. The SRS resource sets may be configured for codebook-based PUSCH or for non-codebook-based PUSCH. The first SRS resource set may be associated with a first set of transmission parameters and a first TRP (TRP1). The second SRS resource set may be associated with a second set of transmission parameters and a second TRP (TRP2). The control signaling may additionally indicate a configuration for the UE 115 to support an FDM communications scheme, a TDM communications scheme, an SDM communications scheme, and an sTRP transmission scheme.

The UE 115 may receive, via the control signaling, or via a second control signal (e.g., a second RRC message), an indication of an uplink switching mode for the UE 115. The indication of the uplink switching mode may be transmitted dynamically or semi-statically, and the UE 115 may switch between a first uplink switching mode (mode 1) and a second uplink switching mode (mode 2) based on the signaling. Each uplink switching mode may be associated with switching between a subset of the multiple communications schemes. For example, the first uplink switching mode may be associated with the SDM scheme and the sTRP transmission scheme (e.g., an SDM mode). The second uplink switching mode may be associated with the TDM scheme, the FDM scheme, and the sTRP transmission scheme (e.g., a TDM-FDM mode). If the UE 115 receives an indication of the first uplink switching mode, the UE 115 may support switching between the SDM scheme (e.g., a multi-TRP SDM scheme) and the sTRP scheme. If the UE 115 receives an indication of the second uplink switching mode, the UE 115 may support switching between the TDM scheme, the FDM scheme (e.g., multi-TRP TDM and FDM schemes), and the sTRP scheme.

The UE 115 may receive scheduling DCI 405 from the base station 105 that indicates a communications scheme of the subset of communications schemes associated with the indicated uplink switching mode. As described with reference to FIG. 2, the DCI 405 may include a dynamic switching field that is configured to indicate a communications scheme of the multiple communications schemes for the UE 115 and a switching arrangement for the UE 115 to use for transmitting the uplink message in accordance with the communications scheme. The switching arrangement may indicate whether the UE 115 is to use the first SRS resource set, the second SRS resource set, or both, and an order for the UE 115 to switch between sets of transmission parameters corresponding to the SRS resource sets. In some examples, the value of the dynamic switching field may be interpreted differently based on which uplink switching mode is configured for the UE 115.

In the example of FIG. 4, the UE 115 may operate in the first uplink switching mode (e.g., the SDM mode). FIG. 4 illustrates an example values of the dynamic switching field in the DCI 405 and corresponding switching arrangements for the UE 115 to use for communicating an uplink data message using one or more sets of transmission parameters and the SDM scheme or the sTRP transmission scheme. The dynamic switching field may include at least two bits. If the control signaling indicates the first uplink switching mode, the UE 115 may determine a switching arrangement based on a value of the two bits. In some examples, the dynamic switching field may include more than two bits, and the UE 115 and the base station 105 may utilize two of the bits for indicating switching arrangements when the UE 115 operates in the first uplink switching mode.

A value of the dynamic switching field may indicate an uplink communications scheme and a switching arrangement for the UE 115. For example, each value of the two bits of the dynamic switching field may index to or point to a switching arrangement in a table configured for the UE 115. In some examples, the value of the dynamic switching field may be referred to as a codepoint. Table 2 illustrates example codepoint values and corresponding uplink switching arrangements for the first uplink switching mode.

TABLE 2

Switching Arrangements for sTRP and multi-TRP SDM PUSCH

| Codepoint | SRS Resource Set(s) | SRI/TPMI Field(s) |
|---|---|---|
| 00 | s-TRP mode with 1st SRS Resource Set (TRP1) | Joint SRI/TPMI Field |
| 01 | s-TRP mode with 2nd SRS Resource Set (TRP2) | Joint SRI/TPMI Field |
| 10 | m-TRP mode with (TRP1, TRP2) order for two sets of layers 1st SRI/TPMI field: 1st SRS Resource Set 2nd SRI/TPMI field: 2nd SRS Resource Set | Both 1st and 2nd SRI/TPMI fields |
| 11 | m-TRP mode with (TRP2, TRP1) order for two sets of layers 1st SRI/TPMI field: 1st SRS Resource Set 2nd SRI/TPMI field: 2nd SRS Resource Set | Both 1st and 2nd SRI/TPMI fields |

As shown in Table 2 and illustrated in FIG. 4, the values of the dynamic switching field for the first uplink switching mode may indicate that the UE 115 is to transmit one or more uplink data repetitions in an SDM manner. If the dynamic switching field indicates a first value (e.g., 00), the UE 115 may transmit each layer of the uplink data message in accordance with a first set of transmission parameters associated with the first SRS resource set. Each spatial layer may be transmitted to the first TRP. If the dynamic switching field indicates a second value (e.g., 01), the UE 115 may transmit each layer of the uplink data message in accordance with a second set of transmission parameters associated with the second SRS resource set. Each spatial layer may be transmitted to the second TRP. A quantity of spatial layers of the uplink data message may be based on the SRI field in the DCI 505 and may be associated with a rank of the uplink message. The first and second values of the dynamic switching field may thereby indicate that the UE 115 is to transmit the uplink data message using an sTRP transmission scheme and a single set of transmission parameters.

If the dynamic switching field indicates a third value (e.g., 10), the UE 115 may transmit a first set of spatial layers of the uplink message in accordance with the first set of transmission parameters associated with the first SRS resource set, and the UE 115 may transmit a second set of spatial layers of the uplink message in accordance with the second set of transmission parameters associated with the second SRS resource set. If the dynamic switching field indicates a fourth value (e.g., 11), the UE 115 may transmit a first set of spatial layers of the uplink message in accordance with the second set of transmission parameters associated with the second SRS resource set, and the UE 115 may transmit a second set of spatial layers of the uplink message in accordance with the first set of transmission parameters associated with the first SRS resource set. The first and second sets of spatial layers may each include one or multiple spatial layers.

Each set of spatial layers that is transmitted in accordance with a different set of transmission parameters may, in some examples, be transmitted to a different TRP. As such, if the dynamic switching field indicates the third or fourth values, the UE 115 may perform multi-TRP SDM communications. The third and fourth values may additionally indicate an order for the UE 115 to switch between the sets of transmission parameters and corresponding TRPs. For example, the codepoint 10 may indicate that the UE 115 is to transmit a first spatial layer based on the first SRS resource set and the first set of transmission parameters and transmit a second spatial layer based on the second SRS resource set and the second set of transmission parameters. The UE 115 may determine the first SRS resource set based on an ID of the first SRS resource set being greater than an ID of the second SRS resource set.

A quantity of spatial layers of the uplink data message (e.g., a rank) may be based on the SRI field in the DCI 405. For example, for codebook-based PUSCH, the SRI field may indicate an SRS resource associated with a total rank of four (e.g., four spatial layers), and the UE 115 may transmit four spatial layers of the uplink data message accordingly. For non-codebook-based PUSCH, the SRI fields may indicate a total of four SRS resources, and the UE 115 may transmit four spatial layers of the uplink data message accordingly. A quantity of spatial layers in the first and second sets of spatial layers may be based on the first and second SRI fields, respectively. For example, if the first SRI field indicates a single SRS resource or an SRS resource associated with a rank of one from the first SRS resource set, the first set of spatial layers may include one spatial layer. If the second SRI field indicates two SRS resources or an SRS resource associated with a rank of two from the second SRS resource set, the second set of spatial layers may include two spatial layers.

Although FIG. 4 illustrates a single repetition of the uplink data message in time, it is to be understood that the UE 115 may transmit one or more repetitions of the uplink data message in accordance with the SDM scheme and based on a value of a TDRA field in the DCI. For example, the UE 115 may, in some examples, repeat the indicated switching arrangement for each repetition of the uplink data message. The UE 115 may transmit the same quantity of spatial layers in each repetition of the uplink data message. Alternatively, the UE 115 may not support uplink repetition for SDM, and the UE 115 may transmit a single uplink message in accordance with the SDM scheme.

The UE 115 may thereby be configured to operation in first uplink switching mode for switching between SDM and sTRP communications. The UE 115 may determine whether to transmit spatial layers of an uplink message in accordance with a single set of transmission parameters or more than one set of transmission parameters based on a value of the dynamic switching field in the DCI 405 that schedules the uplink data message.

Figure 5:
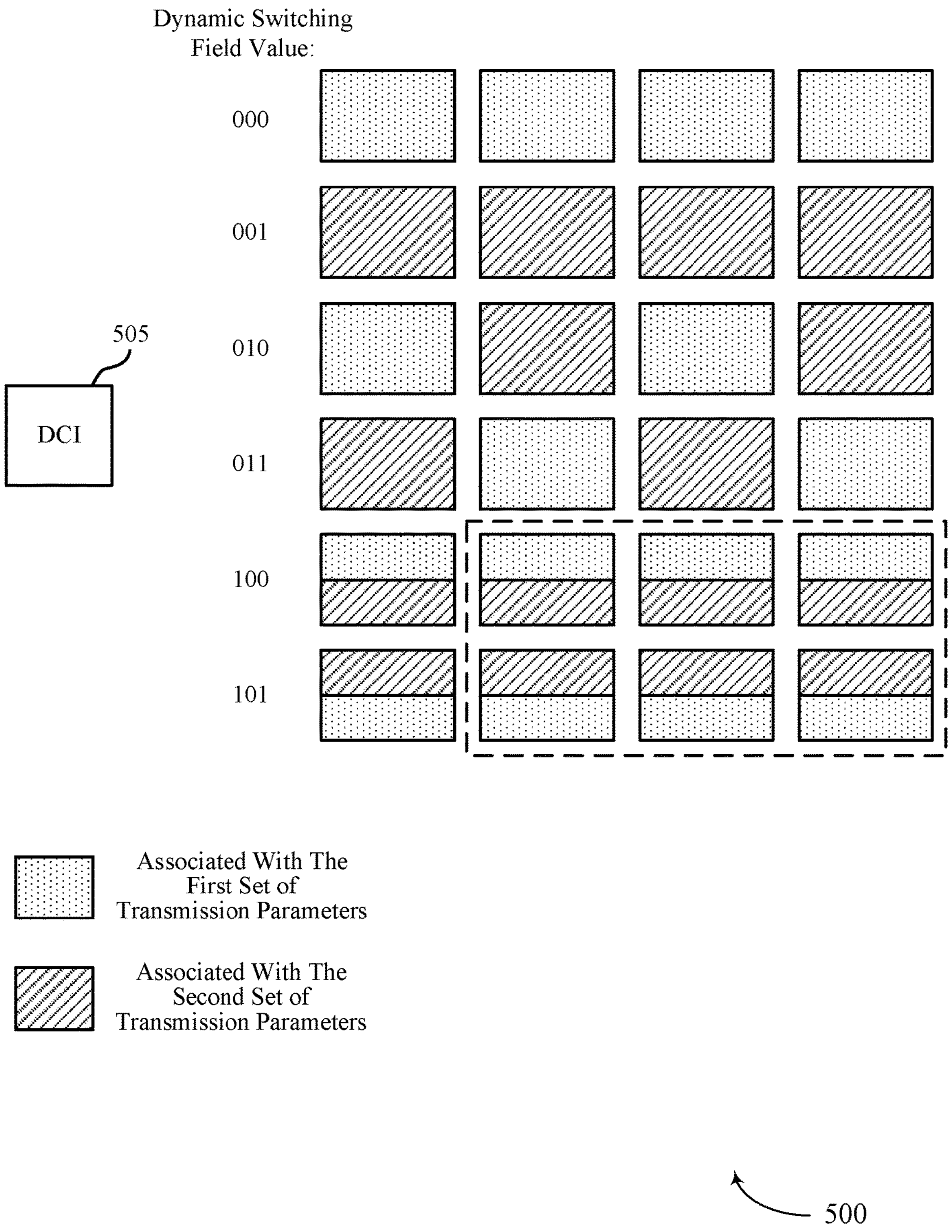

FIG. 5 illustrates an example of a switching arrangement 500 that supports dynamic switching between communications schemes for uplink communications in accordance with aspects of the present disclosure. The switching arrangement 500 may implement or be implemented by aspects of the wireless communications systems 100 and 200, as described with reference to FIGS. 1 and 2. For example, the switching arrangement 500 illustrates example arrangements that may be indicated by a base station 105 to a UE 115 via a dynamic switching field in DCI. The base station 105 and the UE 115 may represent examples of a base station 105 and a UE 115 as described with reference to FIGS. 1 through 4. In this case, the dynamic switching field may indicate arrangements for a UE 115 to switch between an sTRP transmission scheme, a TDM scheme, and an FDM scheme. In the TDM and FDM schemes, the UE 115 may switch between sets of transmission parameters for transmission of different uplink repetitions or sets of RBs in a TDM or an FDM manner, respectively. The FDM and TDM schemes may represent an example of the FDM scheme 310 and the TDM scheme 315, respectively, as described with reference to FIG. 3.

As described with reference to FIGS. 2 and 4, the UE 115 may receive control signaling (e.g., an RRC configuration) from the base station 105 that configures the UE 115 with a first SRS resource set and a second SRS resource set for uplink communications. The SRS resource sets may be configured for codebook-based PUSCH or for non-codebook-based PUSCH. The first SRS resource set may be associated with a first set of transmission parameters and a first TRP (TRP1). The second SRS resource set may be associated with a second set of transmission parameters and a second TRP (TRP2). The control signaling may additionally indicate a configuration for the UE 115 to support an FDM scheme, a TDM scheme, an SDM scheme, and an sTRP transmission scheme.

The UE 115 may receive, via the control signaling, or via a second control signal (e.g., a second RRC message), an indication of a first uplink switching mode or a second uplink switching mode for the UE 115, as described in further detail with reference to FIG. 4. The UE 115 may receive scheduling DCI 505 from the base station 105 that includes a dynamic switching field configured to indicate a communications scheme of a subset of communications schemes associated with the indicated uplink switching mode and a switching arrangement for the UE 115 to use for transmitting the uplink data message. The switching arrangement may indicate whether the UE 115 is to use the first SRS resource set, the second SRS resource set, or both, and an order for the UE 115 to switch between sets of transmission parameters corresponding to the SRS resource sets. In some examples, the value of the dynamic switching field may be interpreted differently based on which uplink switching mode is configured for the UE 115.

In the example of FIG. 5, the UE 115 may operate in the second uplink switching mode (e.g., a TDM-FDM mode). FIG. 5 illustrates an example values of the dynamic switching field in the DCI 505 and corresponding switching arrangements for the UE 115 to use for communicating an uplink data message using one or more sets of transmission parameters and the sTRP transmission scheme, the TDM scheme, or the FDM scheme. The dynamic switching field in the DCI 505 may include two bits, three bits, or some other quantity of bits.

In a first example, the dynamic switching field may include three bits that may indicate a set of values (e.g., eight values). Each value may indicate a respective communications scheme and corresponding switching arrangement for the UE 115 to use to transmit uplink repetitions. For example, each value (e.g., each codepoint) may index or point to a respective switching arrangement in a table configured for the UE 115. In some examples, one or more of the values may be reserved, or may not point to a switching arrangement. Table 3 and FIG. 5 illustrate example codepoint values and corresponding switching arrangements for switching between TDM, FDM, and sTRP communications if the dynamic switching field includes three bits.

TABLE 3

Switching Arrangements for TDM and FDM PUSCH

| Codepoint | SRS Resource Set(s) | SRI/TPMI Fields |
|---|---|---|
| 000 | s-TRP mode with 1$^{st}$ SRS Resource Set (TRP1) | 1$^{st}$ SRI/ TPMI Field (2$^{nd}$ field is unused) |
| 001 | s-TRP mode with 2$^{nd}$ SRS Resource Set (TRP2) | 1$^{st}$ SRI/TPMI Field (2$^{nd}$ field is unused) |
| 010 | m-TRP mode with (TRP1, TRP2) order for two sets of repetition in time 1$^{st}$ SRI/TPMI field: 1$^{st}$ SRS Resource Set 2$^{nd}$ SRI/TPMI field: 2$^{nd}$ SRS Resource Set | Both 1$^{st}$ and 2$^{nd}$ SRI/TPMI fields |
| 011 | m-TRP mode with (TRP2, TRP1) order for two sets of repetition in time 1$^{st}$ SRI/TPMI field: 1$^{st}$ SRS Resource Set 2$^{nd}$ SRI/TPMI field: 2$^{nd}$ SRS Resource Set | Both 1$^{st}$ and 2$^{nd}$ SRI/TPMI fields |
| 100 | m-TRP mode with (TRP1, TRP2) order for two sets of RBs 1$^{st}$ SRI/TPMI field: 1$^{st}$ SRS Resource Set 2$^{nd}$ SRI/TPMI field: 2$^{nd}$ SRS Resource Set | Both 1$^{st}$ and 2$^{nd}$ SRI/TPMI fields |
| 101 | m-TRP mode with (TRP2, TRP1) order for two sets of RBs 1$^{st}$ SRI/TPMI field: 1$^{st}$ SRS Resource Set 2$^{nd}$ SRI/TPMI field: 2$^{nd}$ SRS Resource Set | Both 1$^{st}$ and 2$^{nd}$ SRI/TPMI fields |
| 110 | Reserved | Reserved |
| 111 | Reserved | Reserved |

As shown in Table 3 and illustrated in FIG. 5, a value of the dynamic switching field may indicate whether the UE 115 operating in the second uplink switching mode is to transmit an uplink data message and one or more repetitions of the uplink data message in a TDM, FDM, or sTRP manner. The UE 115 may determine that a first set of values of the dynamic switching field (e.g., 000 and 001) are associated with sTRP communications. The UE 115 may transmit the uplink repetitions in a TDM fashion using a same set of transmission parameters and directed toward a single TRP.

If the dynamic switching field indicates a first value (e.g., 000), the UE 115 may transmit the uplink repetitions using the first set of transmission parameters indicated by the first SRI field and associated with the first TRP. If the dynamic switching field indicates a second value (e.g., 001) the UE 115 may transmit the uplink repetitions using the second set of transmission parameters indicated by the second SRI field and associated with the second TRP. In the example of FIG. 5, a TDRA field in the DCI may indicate a repetition number of four, and the UE 115 may transmit four uplink repetitions in time. Although four uplink repetitions are illustrated in FIG. 5, it is to be understood that the UE 115 may transmit any quantity of uplink repetitions, including no repetitions of an uplink data message.

The UE 115 may determine that a second set of values of the dynamic switching field (e.g., 010, 011, 100, 101) are associated with multi-TRP communications in either an FDM or SDM scheme, and each value of the second set of values may further indicate a switching arrangement for the UE 115 to switch between sets of transmission parameters for transmission of the uplink repetitions. If the dynamic switching field indicates a third value (e.g., 010), the UE 115 may transmit the uplink repetitions in a TDM manner, and the UE 115 may switch between the first and second sets of transmission parameters in a first order (e.g., TRP1, TRP2). For example, the UE 115 may transmit a first repetition in accordance with the first set of transmission parameters and a second repetition in accordance with the second set of parameters, and the UE 115 may continue to alternate the transmission parameters in this order for remaining uplink repetitions.

If the dynamic switching field indicates a fourth value (e.g., 011), the UE 115 may transmit the uplink repetitions in a TDM manner, and the UE 115 may switch between the first and second sets of transmission parameters in a second order (e.g., TRP2, TRP1). For example, the UE 115 may transmit a first repetition in accordance with the second set of transmission parameters and a second repetition in accordance with the first set of parameters, and the UE 115 may continue to alternate the transmission parameters in this order for remaining uplink repetitions.

If the dynamic switching field indicates a fifth value (e.g., 100), the UE 115 may transmit the uplink data message in an FDM manner, and the UE 115 may switch between the first and second sets of transmission parameters in a first order (e.g., TRP1, TRP2). For example, the UE 115 may transmit a first subset of RBs of the uplink data message in accordance with the first set of transmission parameters and a second subset of RBs of the uplink data message in accordance with the second set of parameters. If the dynamic switching field indicates a sixth value (e.g., 101), the UE 115 may transmit the uplink data message in an FDM manner, and the UE 115 may switch between the first and second sets of transmission parameters in a second order (e.g., TRP2, TRP1). For example, the UE 115 may transmit a first subset of RBs of the uplink data message in accordance with the second set of transmission parameters and a second subset of RBs of the uplink data message in accordance with the first set of parameters.

In some examples, the UE 115 may not support uplink repetitions for an uplink data message transmitted using the FDM scheme. That is, the UE 115 may not expect to receive a TDRA field in the DCI 505 that indicates a repetition number greater than one. In such cases, if the dynamic switching field in the DCI 505 indicates the FDM scheme, the UE 115 may transmit the uplink data message using the FDM scheme based on the value of the dynamic switching field, and the UE 115 may refrain from repeating the uplink data message in time.

Alternatively, the UE 115 may support uplink repetitions for an uplink data message transmitted using the FDM scheme. If the TDRA field in the DCI 505 indicates a repetition number greater than one, the UE 115 may transmit multiple repetitions of the uplink data message using the same FDM resource configuration as indicated by the value of the dynamic switching field. The UE 115 may repeat the same FDM pattern in the time domain for the quantity of repetitions indicated by the TDRA field (e.g., four repetitions in FIG. 5).

In some examples (not illustrated in FIG. 5), the dynamic switching field may include two bits for indicating a switching arrangement for the second uplink switching mode. The two bits may be used to indicate a communications scheme between the sTRP, TDM, and FDM schemes. In such cases, a first set of values of the dynamic switching field (e.g., 00 and 01) may indicate an sTRP scheme for transmitting the uplink repetitions in accordance with either the first or second set of transmission parameters. Such sTRP switching arrangements may be similar to the sTRP scheme described with reference to Table 1, or with reference to codepoints 000 and 001 in Table 3 and FIG. 5.

A second set of values of the dynamic switching field (e.g., 10 and 11) may be associated with multiple TRPs. The UE 115 may determine whether the second set of values indicate a TDM scheme or an FDM scheme based on a value of the TDRA field in the DCI. For example, if a repetition number indicated by the TDRA field is greater than one, the UE 115 may determine that the codepoints 10 and 11 indicate the TDM communications scheme, and if the TDRA row in the TDRA field is not configured with a repetition number or is configured with a repetition number of one, the UE 115 may determine that the codepoints 10 and 11 indicate the FDM scheme.

Regardless of whether the TDRA field indicates the TDM scheme or the FDM scheme, the codepoints 10 and 11 may indicate a corresponding order for the UE 115 to switch between the first and second sets of transmission parameters in accordance with the respective scheme. If the TDRA field indicates TDM, the codepoints 10 and 11 may indicate a same order for the UE 115 as the codepoints 10 and 11 described with reference to Table 1, or as codepoints 010 and 011 described with reference to Table 3 and FIG. 5. If the TDRA field indicates the FDM scheme, the codepoints 10 and 11 may indicate a same order for the UE 115 as the codepoints 100 and 101 described with reference to Table 3 and FIG. 5.

The UE 115 may thereby receive RRC signaling that indicates one of a first or a second uplink switching mode each associated with switching between a subset of communications schemes. A configuration of the dynamic switching field in the DCI may be based on the indicated uplink switching mode and may indicate a communications scheme of the subset associated with the indicated uplink switching mode and an order or arrangement for switching between sets of transmission parameters in accordance with the communications scheme.

Figure 6:
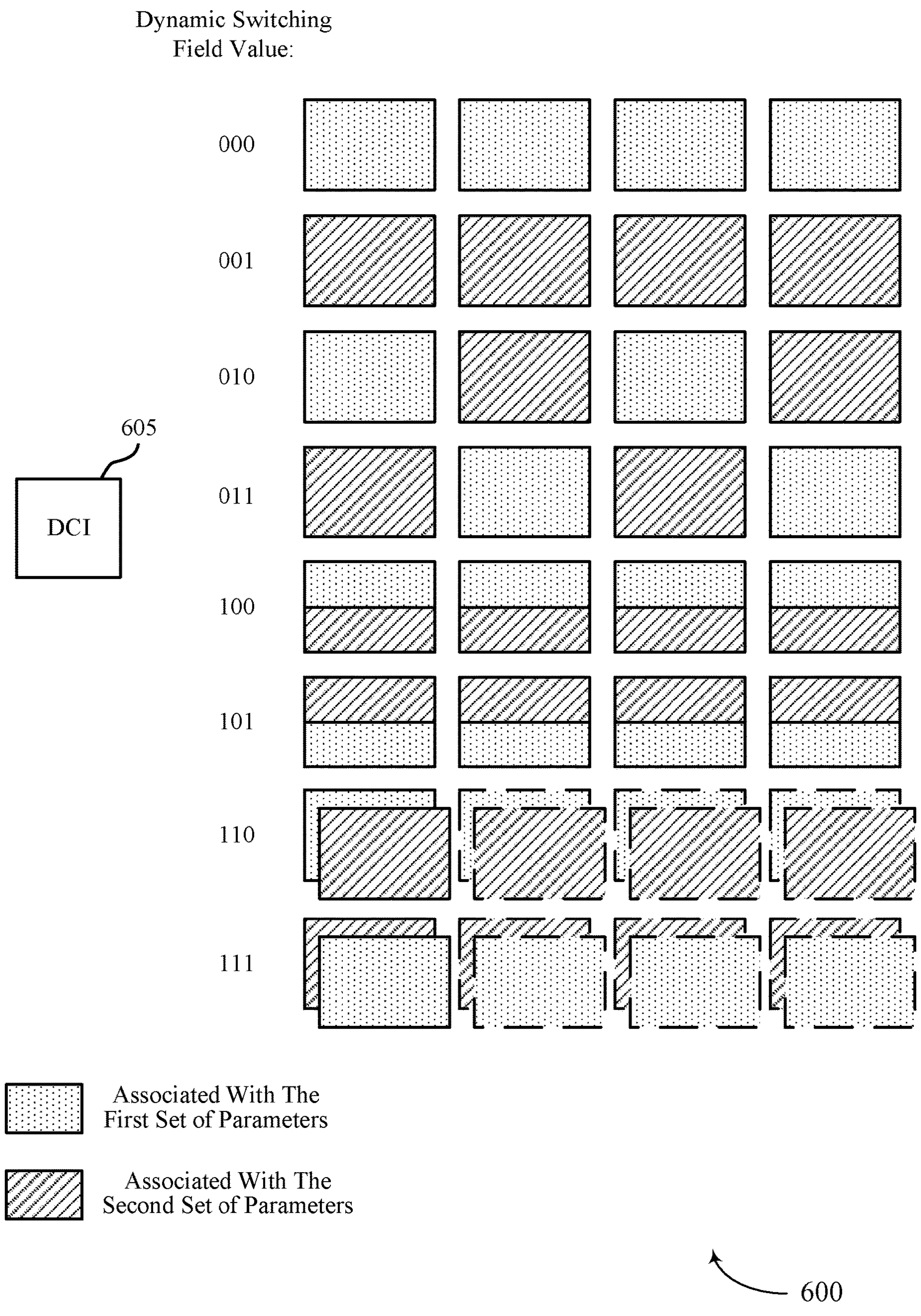

FIG. 6 illustrates an example of a switching arrangement 600 that supports dynamic switching between communications schemes for uplink communications in accordance with aspects of the present disclosure. The switching arrangement 600 may implement or be implemented by aspects of the wireless communications systems 100 and 200, as described with reference to FIGS. 1 and 2. For example, the switching arrangement 600 illustrates example switching arrangements that may be configured by a base station 105 for a UE 115 to use for transmitting uplink repetitions in an sTRP manner, a TDM manner, an FDM manner, or an SDM manner. The base station 105 and the UE 115 may represent examples of a base station 105 and a UE 115 as described with reference to FIGS. 1 through 5.

The TDM, FDM, and SDM schemes may represent examples of corresponding communications schemes as described with reference to FIG. 3.

As described with reference to FIG. 2, the UE 115 may receive control signaling (e.g., an RRC configuration) from the base station 105 that configures the UE 115 with a first SRS resource set and a second SRS resource set for uplink communications. The SRS resource sets may be configured for codebook-based PUSCH or for non-codebook-based PUSCH. The first SRS resource set may be associated with a first set of transmission parameters and a first TRP (TRP1). The second SRS resource set may be associated with a second set of transmission parameters and a second TRP (TRP2). The control signaling may additionally indicate a configuration for the UE 115 to support an FDM communications scheme, a TDM communications scheme, an SDM communications scheme, and an sTRP communications scheme.

The UE 115 may receive a scheduling DCI 605 from the base station 105 that includes a dynamic switching field configured to indicate a communications scheme of the multiple communications schemes configured for the UE 115 and a switching arrangement for the UE 115 to use for transmitting the uplink repetitions. The switching arrangement may indicate whether the UE 115 is to use the first SRS resource set, the second SRS resource set, or both, and an order for the UE 115 to switch between sets of transmission parameters corresponding to the SRS resource sets. In the example of FIG. 6, the dynamic switching field may indicate a communications scheme from any of the TDM, FDM, SDM, and sTRP transmission schemes (e.g., irrespective of an indication of an uplink switching mode for the UE 115).

To indicate the communications scheme and corresponding switching arrangement as described herein, the dynamic switching field in the DCI 605 may include a first quantity of bits (e.g., three bits) that may indicate a set of values (e.g., eight values). Each value may indicate a respective communications scheme and corresponding switching arrangement for the UE 115 to use to transmit uplink repetitions. For example, each value (e.g., each codepoint) may index or point to a respective switching arrangement in a table configured for the UE 115. Table 4 illustrates example codepoint values and corresponding switching arrangements for switching between TDM, FDM, SDM, and sTRP communications if the dynamic switching field includes three bits.

TABLE 4

Switching Arrangements for TDM, FDM, and SDM PUSCH

| Codepoint | SRS Resource Set(s) | SRI/TPMI |
|---|---|---|
| 000 | s-TRP mode with 1st SRS Resource Set (TRP1) | 1st SRI/TPMI Field (2nd field is unused) |
| 001 | s-TRP mode with 2nd SRS Resource Set (TRP2) | 1st SRI/TPMI Field (2nd field is unused) |
| 010 | m-TRP mode with (TRP1, TRP2) order for two sets of repetition in time<br>1st SRI/TPMI field:<br>1st SRS Resource Set<br>2nd SRI/TPMI field:<br>2nd SRS Resource Set | Both 1st and 2nd SRI/TPMI fields |
| 011 | m-TRP mode with (TRP2, TRP1) order for two sets of repetition in time<br>1st SRI/TPMI field:<br>1st SRS Resource Set<br>2nd SRI/TPMI field:<br>2nd SRS Resource Set | Both 1st and 2nd SRI/TPMI fields |

TABLE 4-continued

Switching Arrangements for TDM, FDM, and SDM PUSCH

| Codepoint | SRS Resource Set(s) | SRI/TPMI |
|---|---|---|
| 100 | m-TRP mode with (TRP1, TRP2) order for two sets of RBs<br>1st SRI/TPMI field:<br>1st SRS Resource Set<br>2nd SRI/TPMI field:<br>2nd SRS Resource Set | Both 1st and 2nd SRI/TPMI fields |
| 101 | m-TRP mode with (TRP2, TRP1) order for two sets of RBs<br>1st SRI/TPMI field:<br>1st SRS Resource Set<br>2nd SRI/TPMI field:<br>2nd SRS Resource Set | Both 1st and 2nd SRI/TPMI fields |
| 110 | m-TRP mode with (TRP1, TRP2) order for two sets of layers<br>1st SRI/TPMI field:<br>1st SRS Resource Set<br>2nd SRI/TPMI field:<br>2nd SRS Resource Set | Both 1st and 2nd sub-SRI/TPMI fields |
| 111 | m-TRP mode with (TRP2, TRP1) order for two sets of layers<br>1st SRI/TPMI field:<br>1st SRS Resource Set<br>2nd SRI/TPMI field:<br>2nd SRS Resource Set | Both 1st and 2nd sub-SRI/TPMI fields |

As shown in Table 4 and illustrated in FIG. 6, the value of the dynamic switching field in the DCI 605 may schedule the UE 115 to transmit an uplink data message, one or more uplink repetitions of the uplink data message, or both, according to any one of the TDM, FDM, and SDM communications schemes. The value of the dynamic switching field may, in some cases, additionally indicate an order for the UE 115 to switch between sets of transmission parameters for transmitting portions or repetitions of the uplink data message. A portion of the uplink data message may include a set of RBs or a set of spatial layers.

A first set of values of the dynamic switching field may represent examples of the codepoints described with reference to FIG. 5 and Table 3. For example, the first set of values may indicate either an sTRP transmission scheme (e.g., 000 and 001), a TDM scheme (e.g., 010 and 011), or an FDM scheme (e.g., 100 and 101) and a corresponding switching arrangement for switching between sets of transmission parameters in accordance with the indicated communications schemes. Such switching arrangements are described in further detail with respect to FIG. 4 and Table 3.

Remaining values of the dynamic switching field (e.g., 110 and 111) may indicate the SDM transmission scheme. That is, the fifth and sixth values of the dynamic switching field may indicate that the UE 115 is to transmit a first set of spatial layers and a second set of spatial layers of the uplink data message in accordance with different sets of transmission parameters.

If the dynamic switching field indicates a fifth value (e.g., 110), the UE 115 may transmit a first set of one or more spatial layers according to the first set of transmission parameters indicated by the first SRI field and a second set of one or more spatial layers according to the second set of transmission parameters indicated by the second SRI field. The first set of spatial layers may be transmitted to a first TRP and the second set of spatial layers may be transmitted to a second TRP. If the dynamic switching field indicates a sixth value (e.g., 111), the UE 115 may transmit the first set of one or more spatial layers according to the second set of transmission parameters indicated by the first SRI field and the second set of one or more spatial layers according to the first set of transmission parameters indicated by the second SRI field. The first set of spatial layers may be transmitted to the second TRP and the second set of spatial layers may be transmitted to the first TRP.

A quantity of spatial layers in each set may be based on values of the first and second SRI fields in the DCI 605, as described with reference to FIG. 4. The UE 115 may or may not support uplink repetitions for the SDM scheme. For example, the UE 115 may refrain from transmitting repetitions of the uplink data message if the DCI 605 indicates the SDM scheme, or the UE 115 may transmit repetitions of the uplink data message by repeating the SDM switching arrangement for each uplink repetition. In some examples, the fifth and sixth codepoints in Table 4 may indicate similar switching arrangements as the third and fourth codepoints, respectively in Table 2 and as described with respect to FIG. 4.

The base station 105 may thereby indicate, to the UE 115, a switching arrangement for transmitting one or more uplink data messages in accordance with any of the TDM, FDM, SDM, and sTRP transmission schemes. Such techniques may provide for the UE 115 to switch between communications schemes for uplink communications with reduced latency and improved communication reliability.

Figure 7:
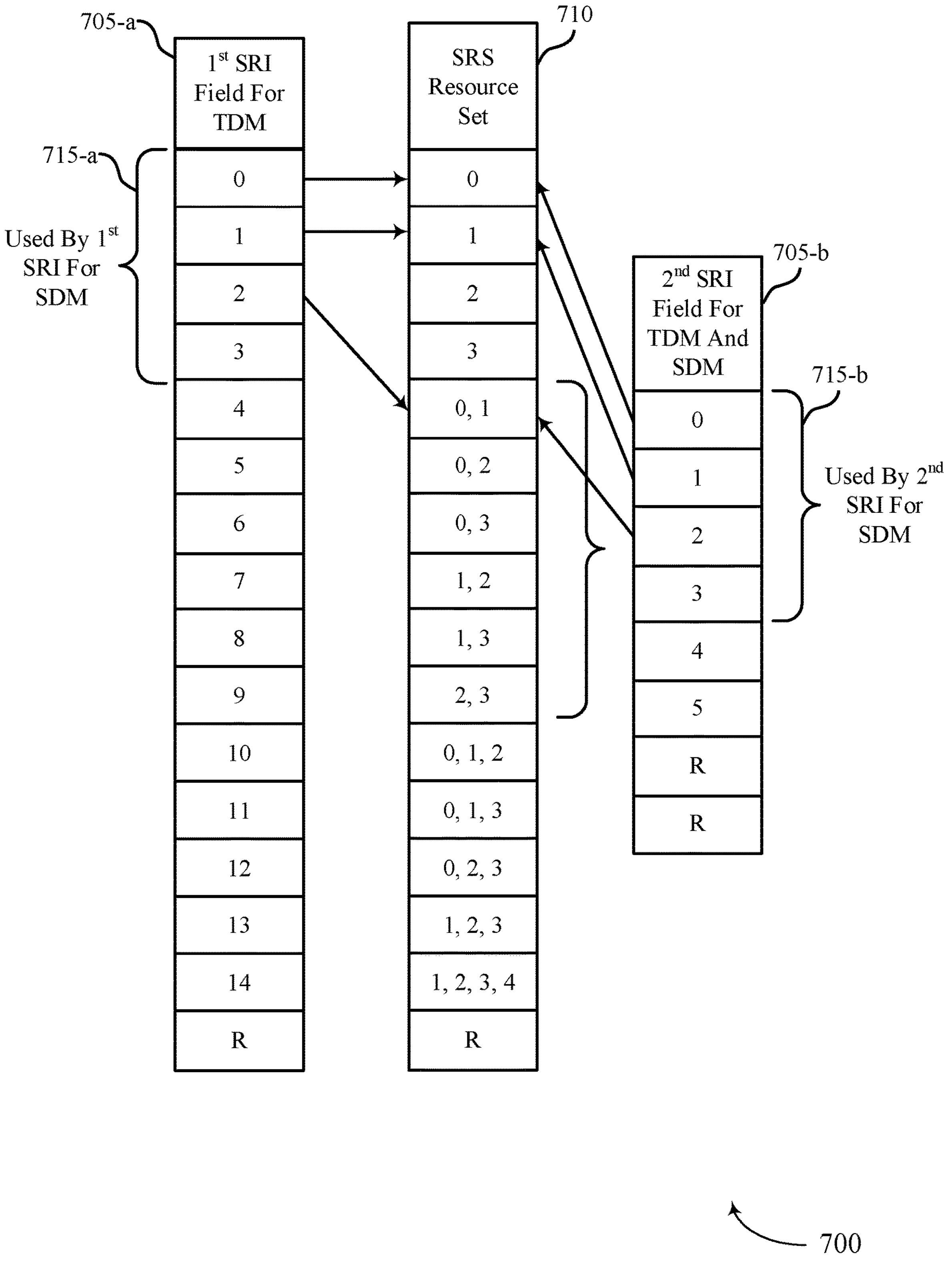
FIGS. 7 and 8 illustrate examples of sounding reference signal resource indication (SRI) configurations that support dynamic switching between communications schemes for uplink communications in accordance with aspects of the present disclosure.

FIG. 7 illustrates an example of an SRI configuration 700 that supports dynamic switching between communications schemes for uplink communications in accordance with aspects of the present disclosure. The SRI configuration 700 may implement or be implemented by aspects of the wireless communications systems 100 and 200 as described with reference to FIGS. 1 and 2. For example, the SRI configuration 700 illustrates an example configuration of a first SRI field 705-*a* and a second SRI field 705-*b* that support communications according to TDM, FDM, SDM, and sTRP schemes. The SRI fields 705 in a DCI may be transmitted by a base station 105 to a UE 115 via a PDCCH. The base station 105 and the UE 115 may represent examples of a base station 105 and a UE 115 as described with reference to FIGS. 1 through 6. In this case, the base station 105 may utilize a subset 715 of values or bits of each SRI field 705 to indicate SRS resources for the SDM scheme, which may support efficient utilization of resources and reduced overhead for switching between multiple communications schemes.

As described herein, the UE 115 may receive RRC signaling that indicates a TDM, FDM, SDM, and sTRP scheme and that configures two SRS resource sets 710 for the UE 115. The UE 115 may support one of the TDM, FDM, SDM, and sTRP schemes at any given time. The UE 115 may switch between the communications schemes in accordance with an indication received via a dynamic switching field in the DCI. The dynamic switching field may indicate any of the TDM, FDM, SDM, and sTRP schemes, as described with reference to FIG. 6 and Table 4.

FIG. 7 illustrates a single SRS resource set 710 for clarity purposes. However, it is to be understood that the UE 115 may be configured with two SRS resource sets 710 that may be the same or different. The SRS resource set 710 may represent both a first SRS resource set 710 and a second SRS resource set 710 that share a same configuration. In the example of FIG. 7, the SRS resource sets 710 may include four SRS resources, although it is to be understood that an SRS resource set 710 may include any quantity of SRS resources.

The DCI that schedules one or more uplink messages may include a first SRI field 705-*a* and a second SRI field 705-*b*. The first SRI field 705-*a* may indicate an SRS resource from the first SRS resource set 710 and the second SRI field 705-*b* may indicate an SRS resource from the second SRS resource set 710. The indicated SRS resources may be associated with one or more antenna ports, and the UE 115 may transmit an uplink message or a portion of an uplink message (e.g., one or more RBs or one or more spatial layers) using a same quantity of antenna ports (e.g., a same rank or same quantity of spatial layers) as the indicated SRS resource(s). Each SRS resource may be associated with a single antenna port or one or more antenna ports, for non-codebook-based PUSCH and codebook-based PUSCH, respectively, as described in further detail with reference to FIG. 2. In the example of FIG. 7, a maximum rank for TDM communications may be four, and a total maximum rank for SDM communications may be four. As such, a maximum rank for each SRS resource set 710 (e.g., and corresponding set of spatial layers) may be two for SDM communications.

The UE 115 may determine whether to use transmission parameters indicated via the first SRI field 705-*a* in the DCI, the second SRI field 705-*b* in the DCI, or both, based on the value of the dynamic switching field in the DCI. Uplink repetitions transmitted in a TDM manner may each include a same quantity of spatial layers. That is, a rank and quantity of demodulation reference signal (DMRS) ports may be the same across all uplink repetitions for TDM communications. If the dynamic switching field indicates that the UE 115 is to switch between transmission parameters for transmitting the uplink repetitions in the TDM manner, the first SRI field 705-*a* for TDM will indicate a quantity of the spatial layers (e.g., a rank), and the second SRI field 705-*b* for TDM will not indicate a rank. As such, a size of the second SRI field 705-*b* may be smaller than a size of the first SRI field 705-*a* for the TDM scheme. For example, in FIG. 7, the first SRI field 705-*a* for TDM may indicate a rank of two, and the second SRI field 705-*b* for TDM may indicate SRS resources from among the SRS resource set 710 that are associated with a rank of two (e.g., instead of indicating one or more SRS resources from all of the SRS resources in the SRS resource set 710). For codebook-based PUSCH, in some examples, the SRI fields 705-*a* and 705-*b* may be TPMI fields that may indicate a respective rank and quantity of spatial layers for the uplink data message.

If the dynamic switching field indicates that the UE 115 is to switch between transmission parameters for transmitting different sets of spatial layers in an SDM fashion, the first SRI 705-*a* may indicate a first quantity of spatial layers and the second SRI 705-*b* may indicate a second quantity of spatial layers that may be the same as or different than the first quantity. That is, the second SRI 705-*b* may point to any of the SRS resources from the SRS resource set 710 irrespective of a value of the first SRI 705-*a*. However, for SDM communications, a maximum rank for each SRS resource set 710 may be less than a maximum rank for TDM communications. For example, a rank combination for two sets of TDM repetitions may be four and four, and a maximum rank for all spatial layers of an uplink message transmitted in an SDM fashion may be four.

As such, the first SRI 705-*a* may indicate a first subset of resources from the first SRS resource set 710 for SDM, and the second SRI 705-*b* may indicate a second subset of SRS resources from the second SRS resource set 710 for SDM.

A quantity of the first subset of SRS resources may be the first X SRS resources in the first SRS resource set 710, where $$X = \min\left(N_{SRS}^{1}, \left\lceil \frac{L_{max}}{2} \right\rceil\right).$$

A quantity of the second subset of SRS resources may be the first Y SRS resources in the second SRS resource set 710, where $$Y = \min\left(N_{SRS}^{2}, L_{max} - \left\lceil \frac{L_{max}}{2} \right\rceil\right).$$

$$N_{SRS}^{1} \text{ and } N_{SRS}^{2}$$

may correspond to quantities of SRS resources in the first and second SRS resource sets, respectively, and $L_{max}$ may correspond to a maximum rank or quantity of spatial layers for SDM (e.g., a total maximum rank).

To improve utilization of the SRI fields 705-*a* and 705-*b* for both TDM and SDM communications, each value of the SRI fields 705-*a* and 705-*b* may be used to indicate SRS resources for TDM communications, and a subset 715 of values (e.g., a subset of SRI codepoints) of the SRI fields 705-*a* and 705-*b* may be used to indicate one or more SRS resources from the first and second SRS resource sets 710, respectively, for SDM communications. A quantity of bits to indicate any of the first or second subsets of SRS resources for SDM communications may be the same as or less than the first and second quantity of bits for TDM communications. As such, a subset 715 or all of the bits in the SRI fields 705-*a* and 705-*b* may be used for SDM communications.

For example, the SRI field 705-*a* may include a first quantity of bits (e.g., three bits) that supports an indication of any of the SRS resources from the SRS resource set 710 for TDM communications. The subset 715-*a* of the SRI field 705-*a* may be used to indicate SRS resources from the first subset of SRS resources for SDM communications. The SRI field 705-*b* may include a second quantity of bits (e.g., two bits) that supports an indication of any of the SRS resources associated with a single rank in the SRS resource set 710 for TDM communications. The subset 715-*b* of the SRI field 705-*b* may be used to indicate SRS resources from the second subset of SRS resources for SDM communications. If the dynamic switching field in the DCI indicates the SDM scheme, the base station 105 may pad the subsets 715-*a* and 715-*b* of the SRI fields 705-*a* and 705-*b*, respectively (e.g., zero-padding the SRIs) to match the SRI size for TDM communications.

The SRI fields 705 in the DCI may thereby be used for any one of TDM, FDM, and SDM communications at any given time. The SRI fields 705 may include a quantity of bits that support SRS resource indications for TDM, and a subset 715 of each SRI field 705 may be used for SRS resource indications for SDM. In some examples, the first and second SRI fields 705-*a* and 705-*b* may be used to indicate SRS resources for non-codebook-based PUSCH communications. In some other examples, such as for codebook-based PUSCH communications, the SRI fields 705 may represent examples of TPMI fields, and the subsets 715-*a* and 715-*b* may represent sub-TPMIs for indication of respective precoding matrices. Such techniques may provide for the UE 115 to switch between multiple communications schemes, which may improve communication reliability and reduce latency.

Figure 8:
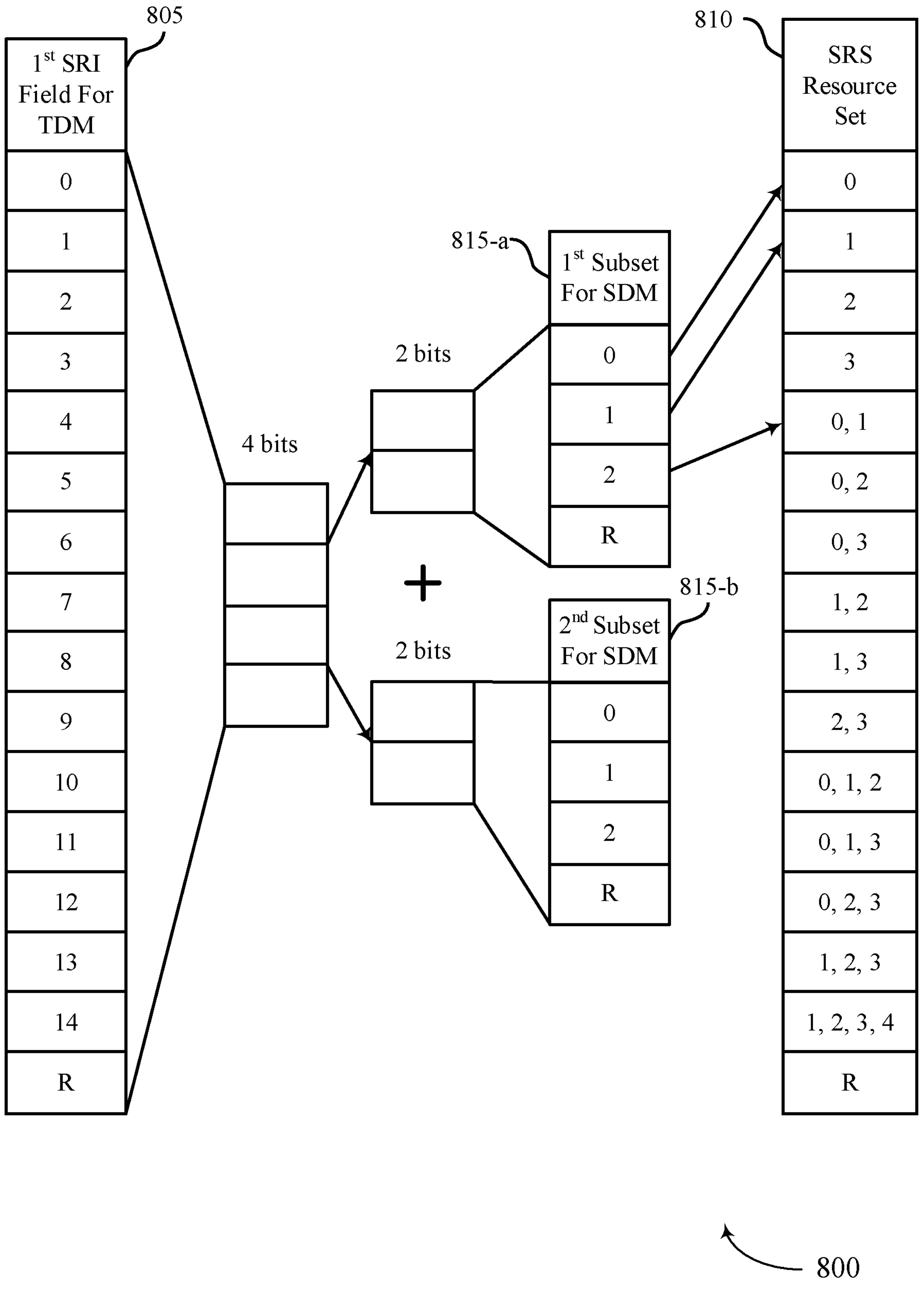

FIG. 8 illustrates an example of an SRI configuration 800 that supports dynamic switching between communications schemes for uplink communications in accordance with aspects of the present disclosure. The SRI configuration 800 may implement or be implemented by aspects of the wireless communications systems 100 and 200 as described with reference to FIGS. 1 and 2. For example, the SRI configuration 800 illustrates an example configuration of a first SRI field 805. In this case, the first SRI field 805 may be divided into two or more subsets 815 to support SDM communications. The SRI field 805 in a DCI may be transmitted by a base station 105 to a UE 115 via a PDCCH. The base station 105 and the UE 115 may represent examples of a base station 105 and a UE 115 as described with reference to FIGS. 1 through 7.

The UE 115 may receive RRC signaling that indicates TDM, FDM, SDM, and sTRP schemes and that configures two SRS resource sets 810 for the UE 115. The UE 115 may support one of the TDM, FDM, SDM, and sTRP schemes at any given time. The UE 115 may switch between the communications schemes in accordance with an indication received via a dynamic switching field in the DCI. The dynamic switching field may indicate any of the TDM, FDM, SDM, and sTRP schemes, as described with reference to FIG. 6 and Table 4.

FIG. 8 illustrates a single SRS resource set 810 for clarity purposes. However, it is to be understood that the UE 115 may be configured with two SRS resource sets 810 that may be the same or different. The SRS resource set 810 may represent both a first SRS resource set 810 and a second SRS resource set 810 that share a same configuration. In the example of FIG. 8, the SRS resource sets 810 may include four SRS resources, although it is to be understood that an SRS resource set 810 may include any quantity of SRS resources.

The DCI that schedules one or more uplink messages may include a first SRI field 805, a second SRI field 805 (not pictured in FIG. 8), or both. The UE 115 may determine whether to use transmission parameters indicated via the first SRI field 805, the second SRI field 805, or both, based on the value of the dynamic switching field in the DCI and a communications scheme indicated to the UE 115. As described in further detail with reference to FIG. 7, a size of SRI fields 805 may be different for different communications schemes. For example, an SRI field 805 may include a first quantity of bits (e.g., four bits) to support SRS resource indications for TDM communications and a second quantity of bits (e.g., two bits) that is less than the first quantity of bits to support SRS resource indications for SDM communications.

To improve shared utilization of the SRI fields 805 for any one of TDM, FDM, and SDM communications schemes at a given time, the first SRI field 805 may be divided into two subsets 815 to support SDM communications. That is, when the dynamic switching field in the DCI indicates the SDM scheme, the first SRI field 805 may be interpreted as two subsets 815-*a* and 815-*b* (e.g., sub-SRIs) for indication of one or more SRS resources from the first and second SRS resource sets, respectively. The second SRI field 805 may be used to for SRS resource indications from the second SRS resource set for TDM communications, and the second SRI field 805 may not be used when the dynamic switching field indicates SDM.

For example, the SRI field 805 may include a first quantity of bits (e.g., four bits) that supports an indication of any of the SRS resources from the SRS resource set 810 for TDM communications. A first subset 815-*a* of the SRI field 805 may include a first quantity of bits (e.g., two bits) that supports an indication of one or more SRS resources from a first SRS resource set 810 for a set of spatial layers of an uplink message, and a second subset 815-*b* of the SRI field 805 may include a second quantity of bits (e.g., two bits) that may be the same as or different than the first quantity of bits and may support an indication of one or more SRS resources from a second SRS resource set 810 for a second set of spatial layers of the uplink data message.

A quantity of bits to indicate any of the first or second subsets of SRS resources for SDM communications may be the same as or less than the first and second quantity of bits for TDM communications. As such, a total quantity of bits associated with the subsets 815-*a* and 815-*b* may be less than or the same as a quantity of bits in the SRI field 805.

The SRI fields 805 in the DCI may thereby be used for any one of TDM, FDM, and SDM communications at any given time. The first SRI field 805 may include a quantity of bits that support SRS resource indications for TDM, and first and second subsets 815 of the first SRI field 805 may be used for SRS resource indications for SDM. In some examples, the first and second SRI fields 805 may be used to indicate SRS resources for non-codebook-based PUSCH communications. In some other examples, such as for codebook-based PUSCH communications, the SRI fields 805 may represent examples of TPMI fields, and the subsets 815-*a* and 815-*b* may represent sub-TPMIs for indication of respective precoding matrices. Such techniques may provide for the UE 115 to switch between multiple communications schemes, which may improve communication reliability and reduce latency.

Figure 9:
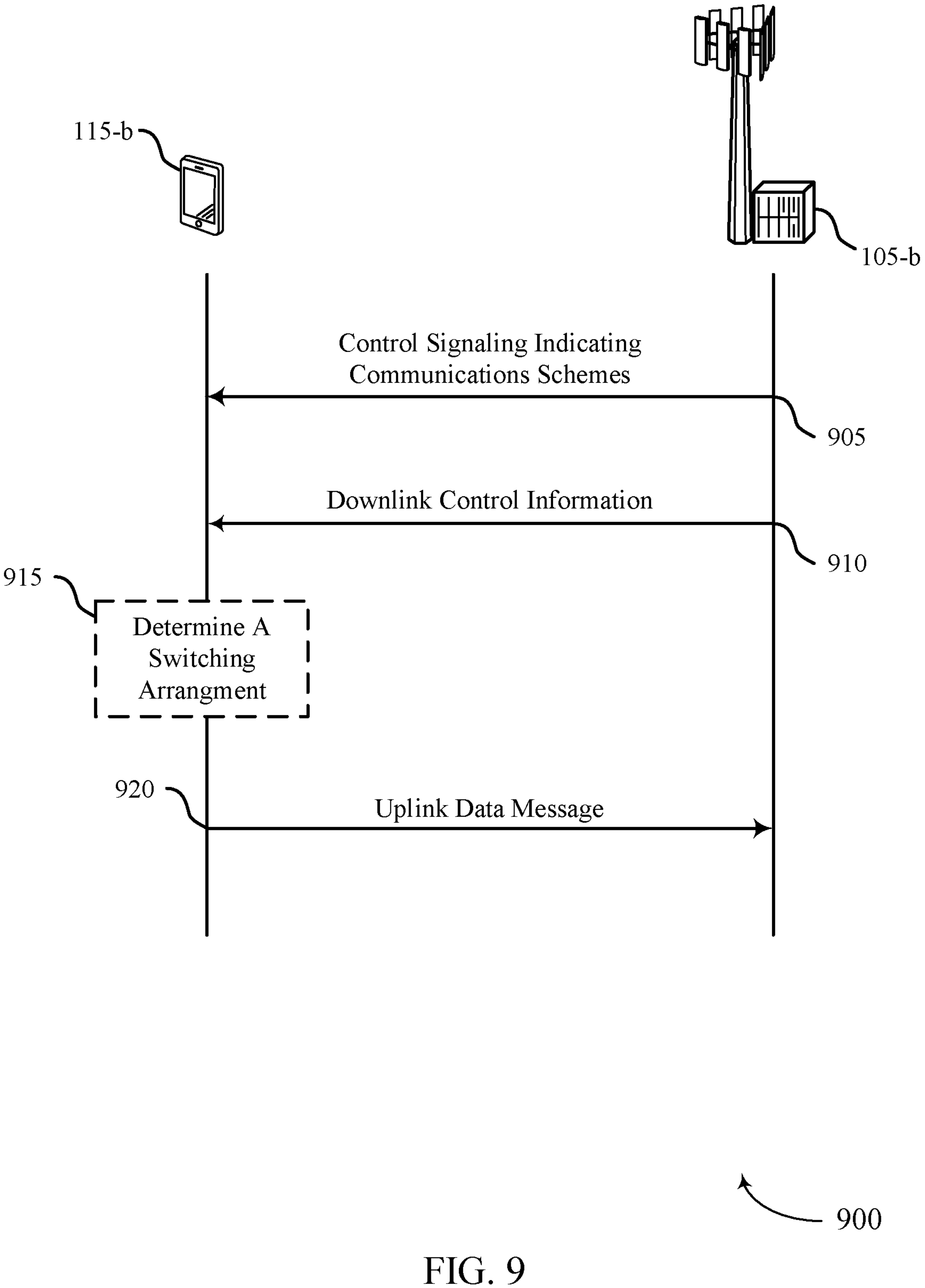
FIG. 9 illustrates an example of a process flow that supports dynamic switching between communications schemes for uplink communications in accordance with aspects of the present disclosure.

FIG. 9 illustrates an example of a process flow 900 that supports dynamic switching between communications schemes for uplink communications in accordance with aspects of the present disclosure. The process flow 900 may implement or be implemented by aspects of the wireless communications systems 100 and 200 as described with reference to FIGS. 1 and 2, respectively. For example, the process flow 900 may implement or be implemented by a UE 115-*b* and a base station 105-*b*, which may be examples of a UE 115 and a base station 105 as described with reference to FIGS. 1 through 8. The UE 115-*b* may switch between a TDM scheme, an FDM scheme, an SDM scheme, and an sTRP scheme for uplink communications.

In the following description of the process flow 900, the operations between the UE 115-*b* and the base station 105-*b* may be performed in different orders or at different times. Some operations may also be left out of the process flow 900, or other operations may be added. Although the base station 105-*b* and the UE 115-*b* are shown performing the operations of the process flow 900, some aspects of some operations may also be performed by one or more other wireless devices.

At 905, the base station 105-*b* may transmit control signaling to the UE 115-*b*. The control signaling may indicate a configuration of a set of communications schemes for uplink communications by the UE 115-*b*. The set of communications schemes may include an FDM scheme, a TDM scheme, an SDM scheme, and an sTRP scheme (e.g., among other communications schemes).

At 910, the base station 105-*b* may transmit DCI to the UE 115-*b*. The DCI may schedule an uplink data message. The DCI may indicate one or more SRS resource sets associated with the uplink data message. In some examples, the DCI may include a dynamic switching field that is configured to indicate a communications scheme and a switching arrangement between the set of communications schemes.

At 915, in some examples, the UE 115-*b* may determine a switching arrangement between the set of communications schemes. The switching arrangement may be indicated to the UE 115-*b* by one or more of: the control signaling, the DCI, or the one or more SRS resource sets. In some examples, the UE 115-*b* may be configured with a first SRS resource set and a second SRS resource set, and the switching arrangement may indicate an arrangement for transmitting a first portion or repetition of the uplink data message in accordance with a first set of transmission parameters associated with the first SRS resource set and for transmitting a second portion or repetition of the uplink data message in accordance with a second set of parameters associated with the second SRS resource set.

At 920, the UE 115-*b* may transmit the uplink data message to the base station 105-*b* in accordance with the switching arrangement. In some examples, the UE 115-*b* may transmit the uplink data message using one of the TDM, FDM, or SDM schemes and in accordance with two or more sets of transmission parameters based on the switching arrangement.

Figure 10:
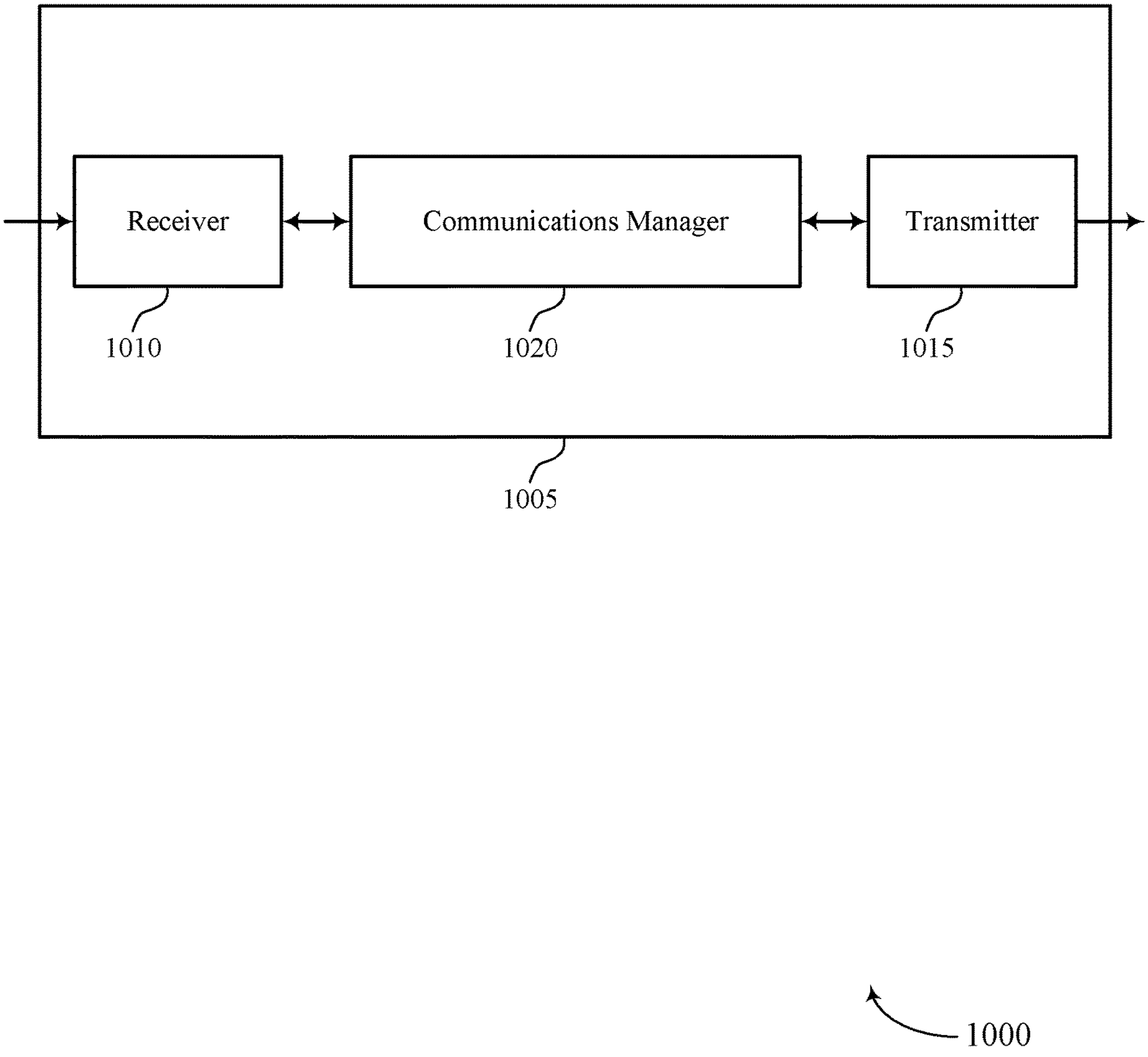
FIGS. 10 and 11 show block diagrams of devices that support dynamic switching between communications schemes for uplink communications in accordance with aspects of the present disclosure.

FIG. 10 shows a block diagram 1000 of a device 1005 that supports dynamic switching between communications schemes for uplink communications in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic switching between communications schemes for uplink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic switching between communications schemes for uplink communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of dynamic switching between communications schemes for uplink communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving control signaling that indicates a configuration of a set of multiple communications schemes for uplink communications by the UE, the set of multiple communications schemes including an FDM scheme, a TDM scheme, an SDM scheme, and an sTRP transmission scheme. The communications manager 1020 may be configured as or otherwise support a means for receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The communications manager 1020 may be configured as or otherwise support a means for transmitting the uplink data message in accordance with the switching arrangement.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, improved utilization of communication resources, and reduced processing latency. For example, the processor of the device 1005 (e.g., a UE 115) may support dynamic switching between multiple communications schemes, which may improve reliability and reduce processing as compared with systems in which the device 1005 does not support switching between communications schemes. The device 1005 may receive an indication of a communications scheme and a switching arrangement for uplink communications via one or more control messages, such as an RRC message, a MAC-CE, or DCI that include fields or information elements configured to indicate a communications scheme from the multiple communications schemes. The described control signaling may improve utilization of communication resources for uplink communications.

Figure 11:
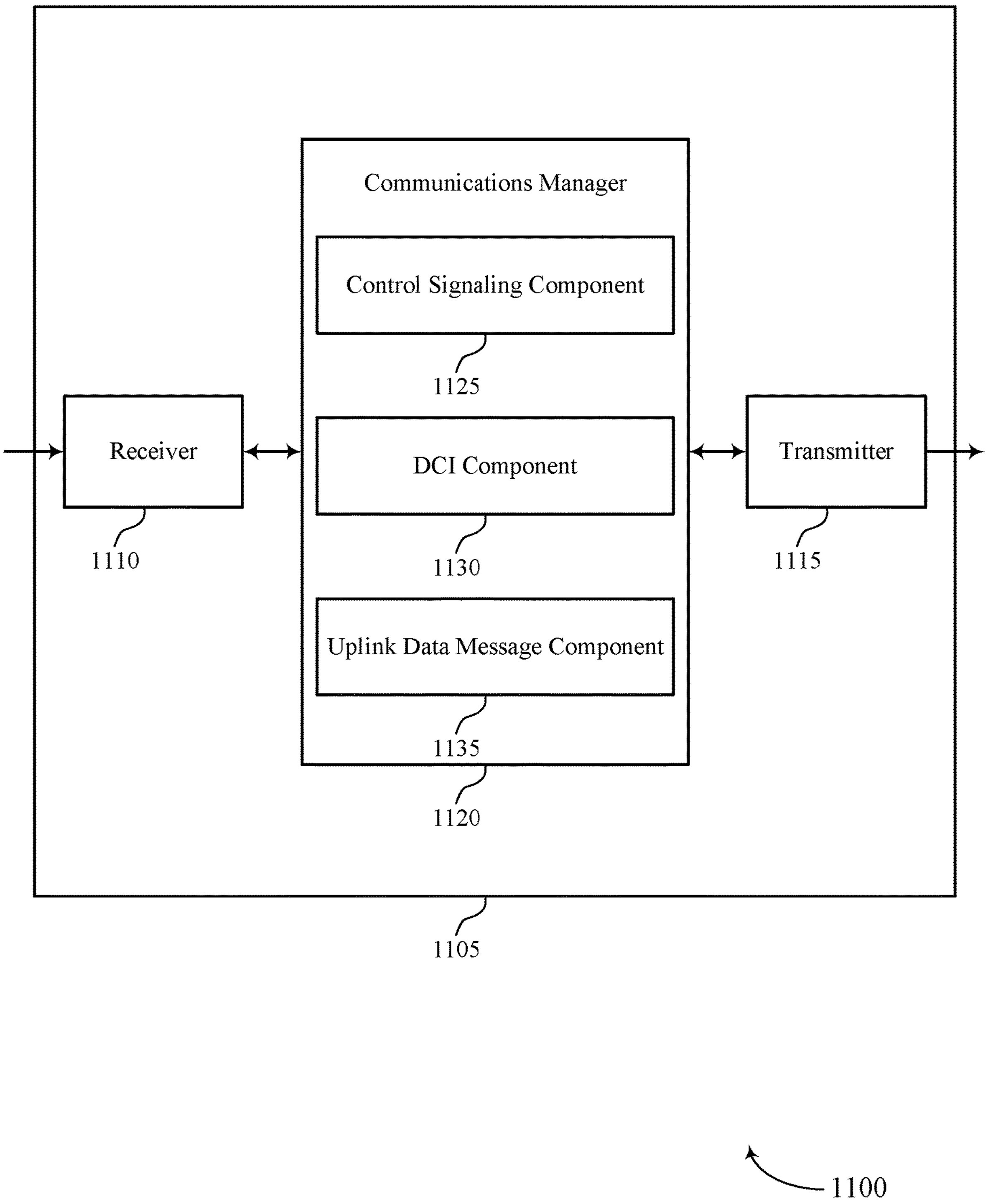

FIG. 11 shows a block diagram 1100 of a device 1105 that supports dynamic switching between communications schemes for uplink communications in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to dynamic switching between communications schemes for uplink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to dynamic switching between communications schemes for uplink communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of dynamic switching between communications schemes for uplink communications as described herein. For example, the communications manager 1120 may include a control signaling component 1125, a DCI component 1130, an uplink data message component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The control signaling component 1125 may be configured as or otherwise support a means for receiving control signaling that indicates a configuration of a set of multiple communications schemes for uplink communications by the UE, the set of multiple communications schemes including an FDM scheme, a TDM scheme, an SDM scheme, and an sTRP transmission scheme. The DCI component 1130 may be configured as or otherwise support a means for receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The uplink data message component 1135 may be configured as or otherwise support a means for transmitting the uplink data message in accordance with the switching arrangement.

Figure 12:
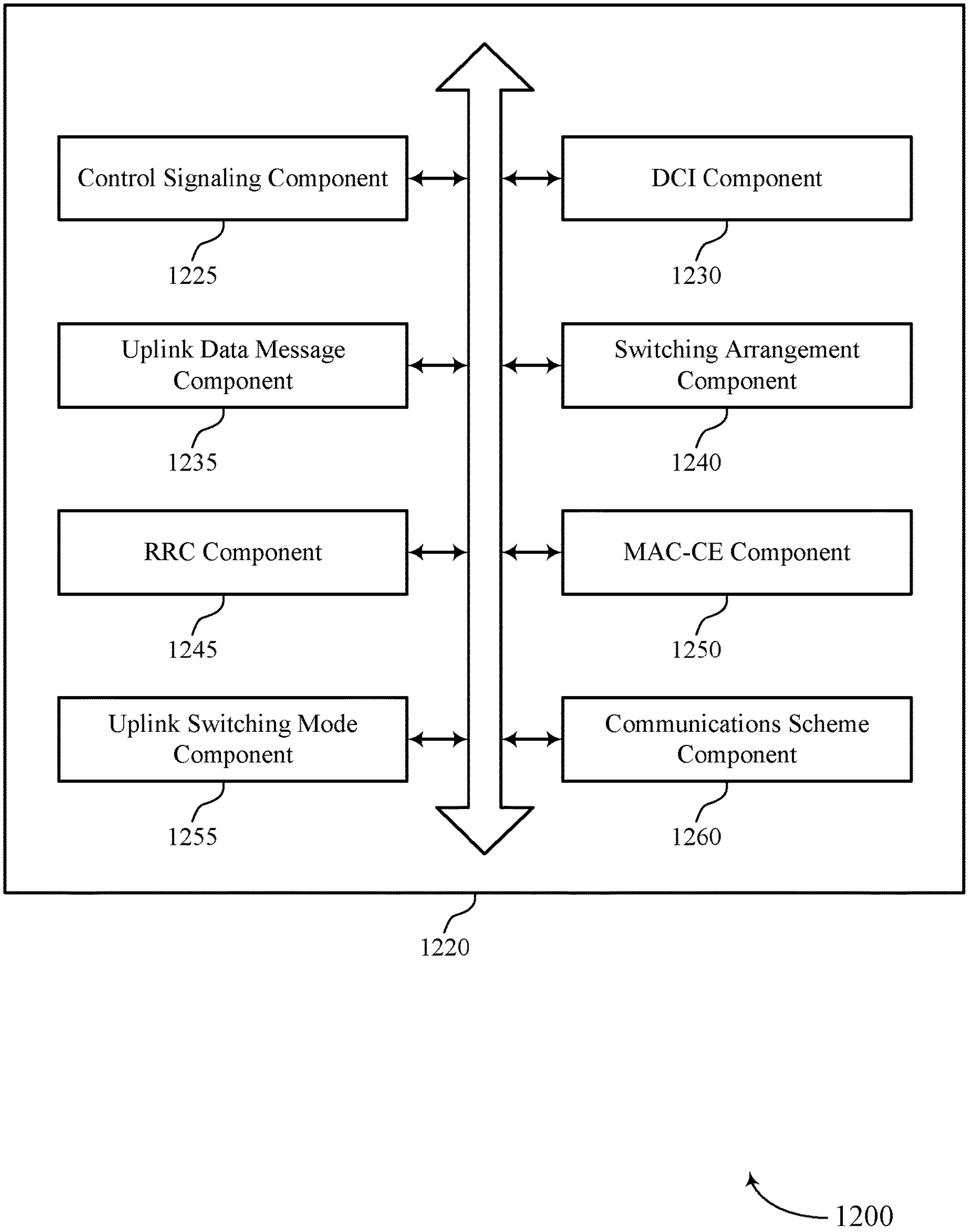
FIG. 12 shows a block diagram of a communications manager that supports dynamic switching between communications schemes for uplink communications in accordance with aspects of the present disclosure.

FIG. 12 shows a block diagram 1200 of a communications manager 1220 that supports dynamic switching between communications schemes for uplink communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of dynamic switching between communications schemes for uplink communications as described herein. For example, the communications manager 1220 may include a control signaling component 1225, a DCI component 1230, an uplink data message component 1235, a switching arrangement component 1240, an RRC component 1245, a MAC-CE component 1250, an uplink switching mode component 1255, a communications scheme component 1260, or any combination thereof. Each of these components may communicate, directly or indirectly, with one another (e.g., via one or more buses).

The communications manager 1220 may support wireless communication at a UE in accordance with examples as disclosed herein. The control signaling component 1225 may be configured as or otherwise support a means for receiving control signaling that indicates a configuration of a set of multiple communications schemes for uplink communications by the UE, the set of multiple communications schemes including an FDM scheme, a TDM scheme, an SDM scheme, and an sTRP transmission scheme. The DCI component 1230 may be configured as or otherwise support a means for receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The uplink data message component 1235 may be configured as or otherwise support a means for transmitting the uplink data message in accordance with the switching arrangement.

In some examples, to support receiving the DCI, the switching arrangement component 1240 may be configured as or otherwise support a means for receiving a switching indication field, where a value of the switching indication field indicates the switching arrangement between the set of multiple communications schemes for the uplink data message.

In some examples, the one or more SRS resource sets indicated via the DCI include a first SRS resource set and a second SRS resource set associated with the uplink data message. In some examples, the switching arrangement indicates an arrangement for transmitting a first portion or a first repetition of the uplink data message in accordance with a first set of parameters associated with the first SRS resource set and for transmitting a second portion or a second repetition of the uplink data message in accordance with a second set of parameters associated with the second SRS resource set.

In some examples, to support receiving the control signaling, the uplink switching mode component 1255 may be configured as or otherwise support a means for receiving an RRC message that indicates an uplink switching mode for the UE, the uplink switching mode associated with a switch between a subset of communications schemes of the set of multiple communications schemes and selected from one of a first uplink switching mode and a second uplink switching mode. In some examples, the first uplink switching mode may be associated with a first subset of communications schemes including the SDM scheme and the sTRP transmission scheme. In some examples the uplink switching mode may be associated with a second subset of communications schemes including the FDM scheme, the TDM scheme, and the sTRP transmission scheme.

In some examples, the communications scheme component 1260 may be configured as or otherwise support a means for determining a communications scheme of the set of multiple communications schemes for transmitting the uplink data message based on the indicated uplink switching mode and the value of the switching indication field, where each value of the switching indication field indicates a respective communications scheme of the subset of communications schemes associated with the uplink switching mode.

In some examples, the uplink switching mode is the first uplink switching mode, and the communications scheme component 1260 may be configured as or otherwise support a means for determining whether a communications scheme of the set of multiple communications schemes for transmitting the uplink data message is the SDM scheme or the sTRP transmission scheme based on the value of the switching indication field. In some examples, a first set of values of the switching indication field may indicate the sTRP transmission scheme, and a second set of values of the switching indication field may indicate the SDM scheme.

In some examples, the uplink switching mode is the second uplink switching mode, and the communications scheme component 1260 may be configured as or otherwise support a means for determining that a communications scheme of the set of multiple communications schemes for transmitting a set of multiple sets of repetitions of the uplink data message is associated with multiple TRPs based on one or more first values of the switching indication field and a value of a TDRA field in the DCI, where the value of the TDRA field of the DCI indicates whether the communications scheme is the FDM scheme or the TDM scheme.

In some examples, the switching arrangement component 1240 may be configured as or otherwise support a means for determining the switching arrangement and a communications scheme of the set of multiple communications schemes for transmitting the uplink data message based on the value of the switching indication field, where each value of a set of multiple values of the switching indication field indicates a respective switching arrangement of a set of multiple switching arrangements and a respective communications scheme of the set of multiple communications schemes for transmitting the uplink data message.

In some examples, the DCI further includes a first resource indication field associated with a first set of multiple values and a second resource indication field associated with a second set of multiple values. In some examples, a first subset of values of the first set of multiple values is associated with resource indications for a first SRS resource set based on the switching indication field indicating the SDM scheme. In some examples, a second subset of values of the second set of multiple values is associated with resource indications for a second SRS resource set based on the switching indication field indicating the SDM scheme.

In some examples, the DCI further includes a first resource indication field associated with a first set of multiple values and a second resource indication field associated with a second set of multiple values. In some examples, a first subset of values of the first set of multiple values is associated with resource indications for a first SRS resource set based on the switching indication field indicating the SDM scheme. In some examples, a second subset of values of the first set of multiple values is associated with resource indications for a second SRS resource set based on the switching indication field indicating the SDM scheme.

In some examples, to support receiving the control signaling, the RRC component 1245 may be configured as or otherwise support a means for receiving an RRC message that indicates two or more SRS resource sets for the UE, where the RRC message indicates a communications scheme of the set of multiple communications schemes for transmission of the uplink data message, and where transmitting the uplink data message is based on the communications scheme indicated via the RRC message.

In some examples, the communications scheme component 1260 may be configured as or otherwise support a means for determining the communications scheme based on the RRC message and a frequency band on which the uplink data message is transmitted, where the RRC message indicates a respective communications scheme of the set of multiple communications schemes for each frequency band of a set of multiple frequency bands.

In some examples, the communications scheme component 1260 may be configured as or otherwise support a means for determining the communications scheme based on the RRC message and a configuration of the DCI, where the RRC message indicates a respective communications scheme of the set of multiple communications schemes for each type of the DCI of a set of multiple types.

In some examples, to support receiving the control signaling, the MAC-CE component 1250 may be configured as or otherwise support a means for receiving a MAC-CE that indicates a communications scheme of the set of multiple communications schemes for transmission of the uplink data message, where transmitting the uplink data message is based on the communications scheme indicated via the MAC-CE.

In some examples, the control signaling component 1225 may be configured as or otherwise support a means for receiving an RRC message that indicates two SRS resource sets for the UE, where the MAC-CE disables a first SRS resource set of the two SRS resource sets, and where a presence of a switching indication field in the DCI is based on disabling the first SRS resource set.

Figure 13:
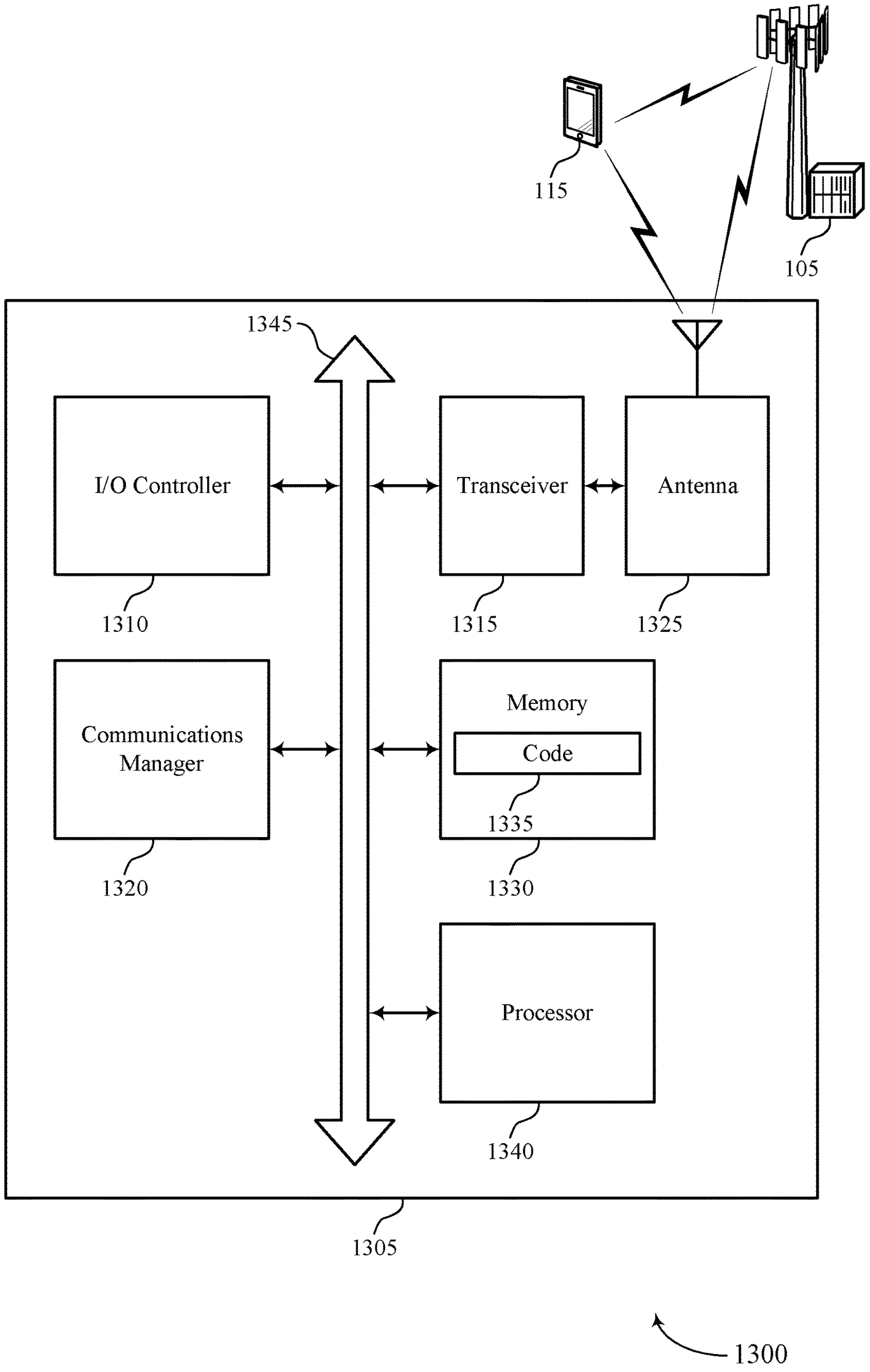
FIG. 13 shows a diagram of a system including a device that supports dynamic switching between communications schemes for uplink communications in accordance with aspects of the present disclosure.

FIG. 13 shows a diagram of a system 1300 including a device 1305 that supports dynamic switching between communications schemes for uplink communications in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting dynamic switching between communications schemes for uplink communications). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving control signaling that indicates a configuration of a set of multiple communications schemes for uplink communications by the UE, the set of multiple communications schemes including an FDM scheme, a TDM scheme, an SDM scheme, and an sTRP transmission scheme. The communications manager 1320 may be configured as or otherwise support a means for receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The communications manager 1320 may be configured as or otherwise support a means for transmitting the uplink data message in accordance with the switching arrangement.

By including or configuring the communications manager 1320 in accordance with examples as described herein, the device 1305 may support techniques for improved communication reliability, reduced latency, more efficient utilization of communication resources, and improved coordination between devices. For example, the device 1305 (e.g., a UE 115) may transmit one or more uplink data messages using a TDM, FDM, SDM, or sTRP scheme. The device 1305 may switch between the communications schemes at any given time based on an indication received via one or more of an RRC message, DCI, or a MAC-CE. By supporting the multiple communications schemes, the device 1305 may perform more efficient and reliable uplink transmissions, which may improve communication reliability and reduce latency. Additionally, or alternatively, the enhanced control signaling described herein may provide for more efficient utilization of communication resources. For example, one or more uplink switching modes or bit configurations may be configured to support any of the multiple communications schemes, such that a same field or information element in the control signaling may be used to indicate any of the communications schemes.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of dynamic switching between communications schemes for uplink communications as described herein, or the processor 1340 and the memory 1330 may be otherwise configured to perform or support such operations.

Figure 14:
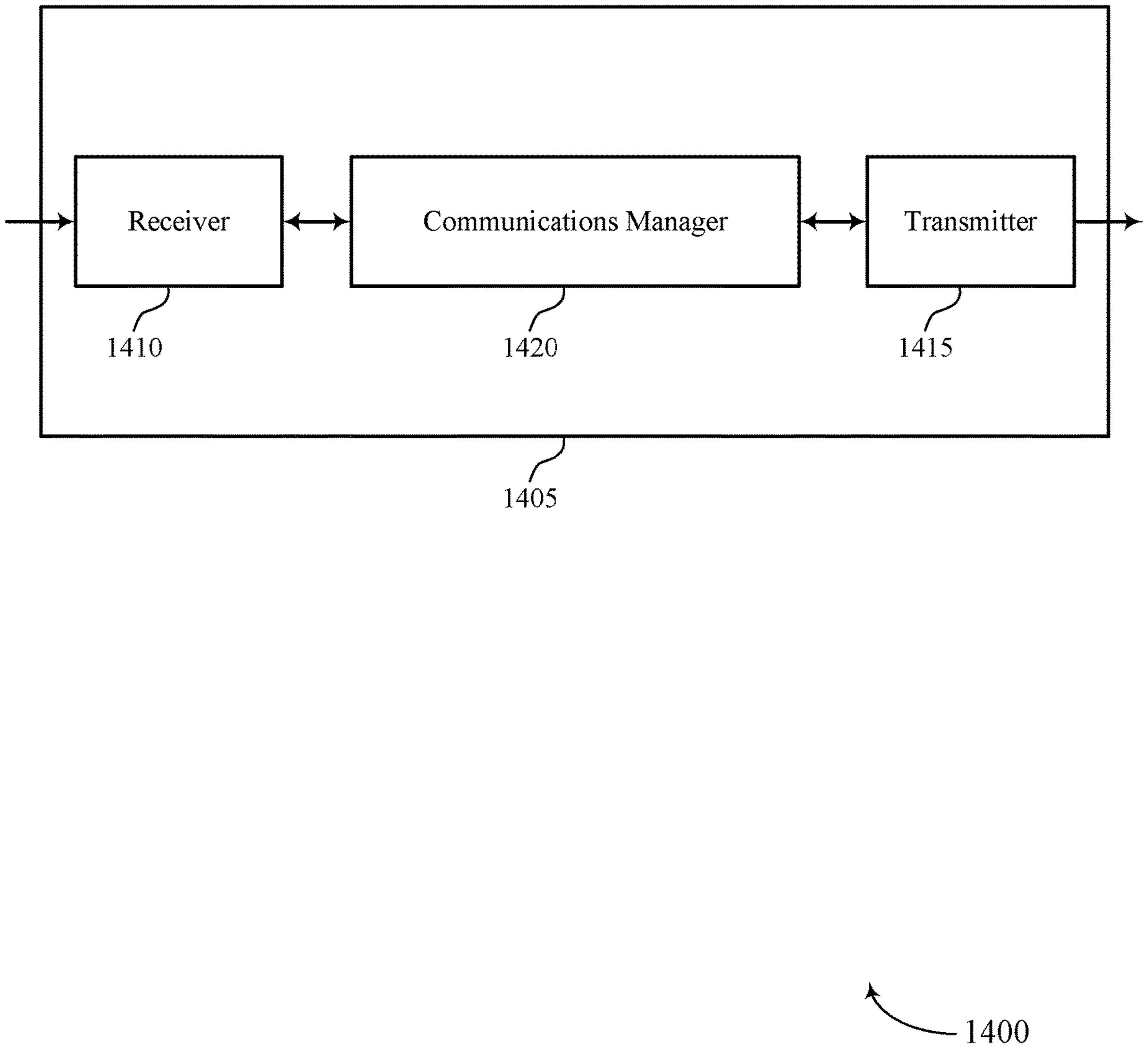
FIGS. 14 and 15 show block diagrams of devices that support dynamic switching between communications schemes for uplink communications in accordance with aspects of the present disclosure.

FIG. 14 shows a block diagram 1400 of a device 1405 that supports dynamic switching between communications schemes for uplink communications in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to dynamic switching between communications schemes for uplink communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to dynamic switching between communications schemes for uplink communications). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of dynamic switching between communications schemes for uplink communications as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme. The communications manager 1420 may be configured as or otherwise support a means for transmitting, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The communications manager 1420 may be configured as or otherwise support a means for receiving, from the UE, the uplink data message in accordance with the switching arrangement.

Figure 15:
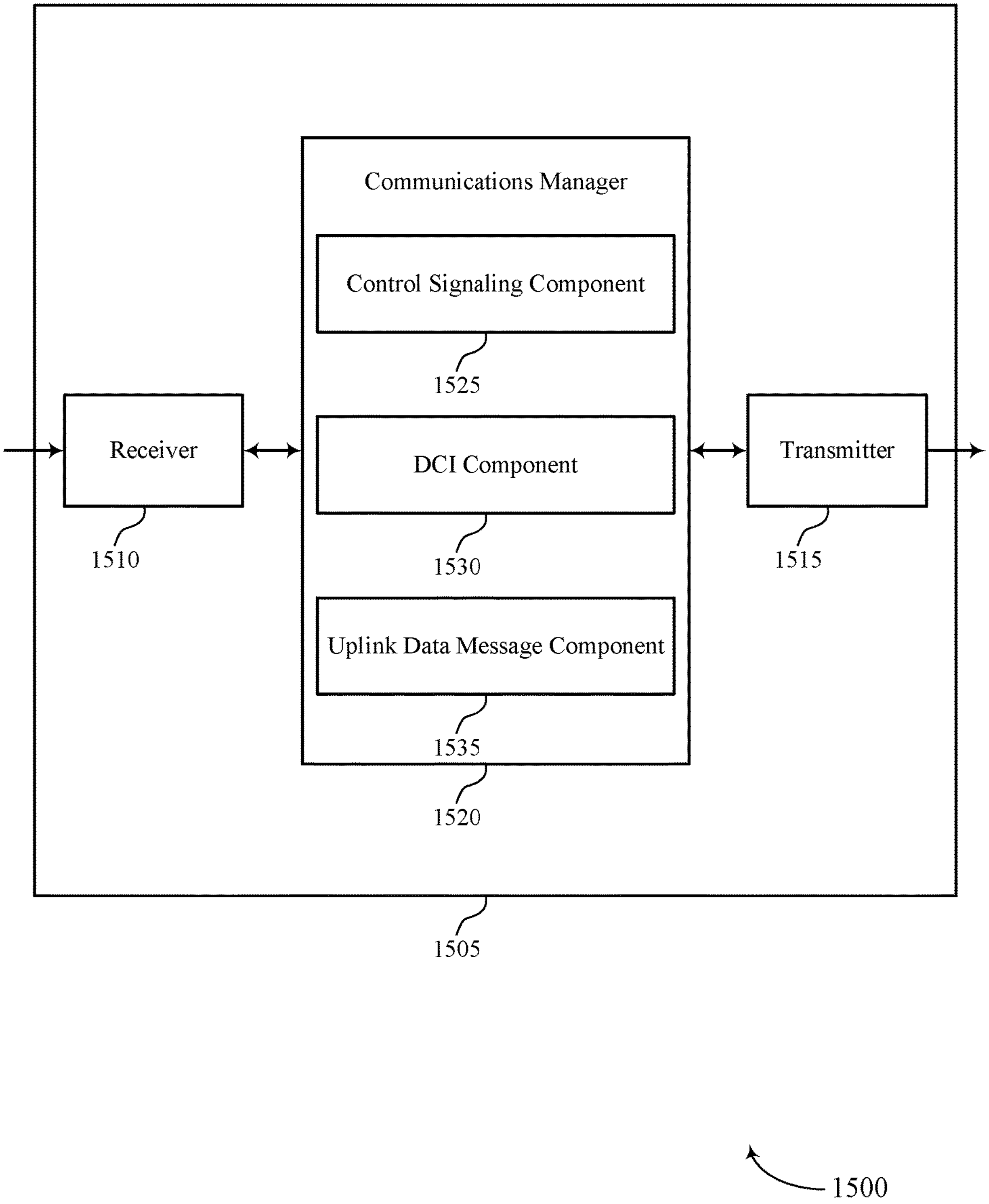

FIG. 15 shows a block diagram 1500 of a device 1505 that supports dynamic switching between communications schemes for uplink communications in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to dynamic switching between communications schemes for uplink communications). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to dynamic switching between communications schemes for uplink communications). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of dynamic switching between communications schemes for uplink communications as described herein. For example, the communications manager 1520 may include a control signaling component 1525, a DCI component 1530, an uplink data message component 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The control signaling component 1525 may be configured as or otherwise support a means for transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme. The DCI component 1530 may be configured as or otherwise support a means for transmitting, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The uplink data message component 1535 may be configured as or otherwise support a means for receiving, from the UE, the uplink data message in accordance with the switching arrangement.

Figure 16:
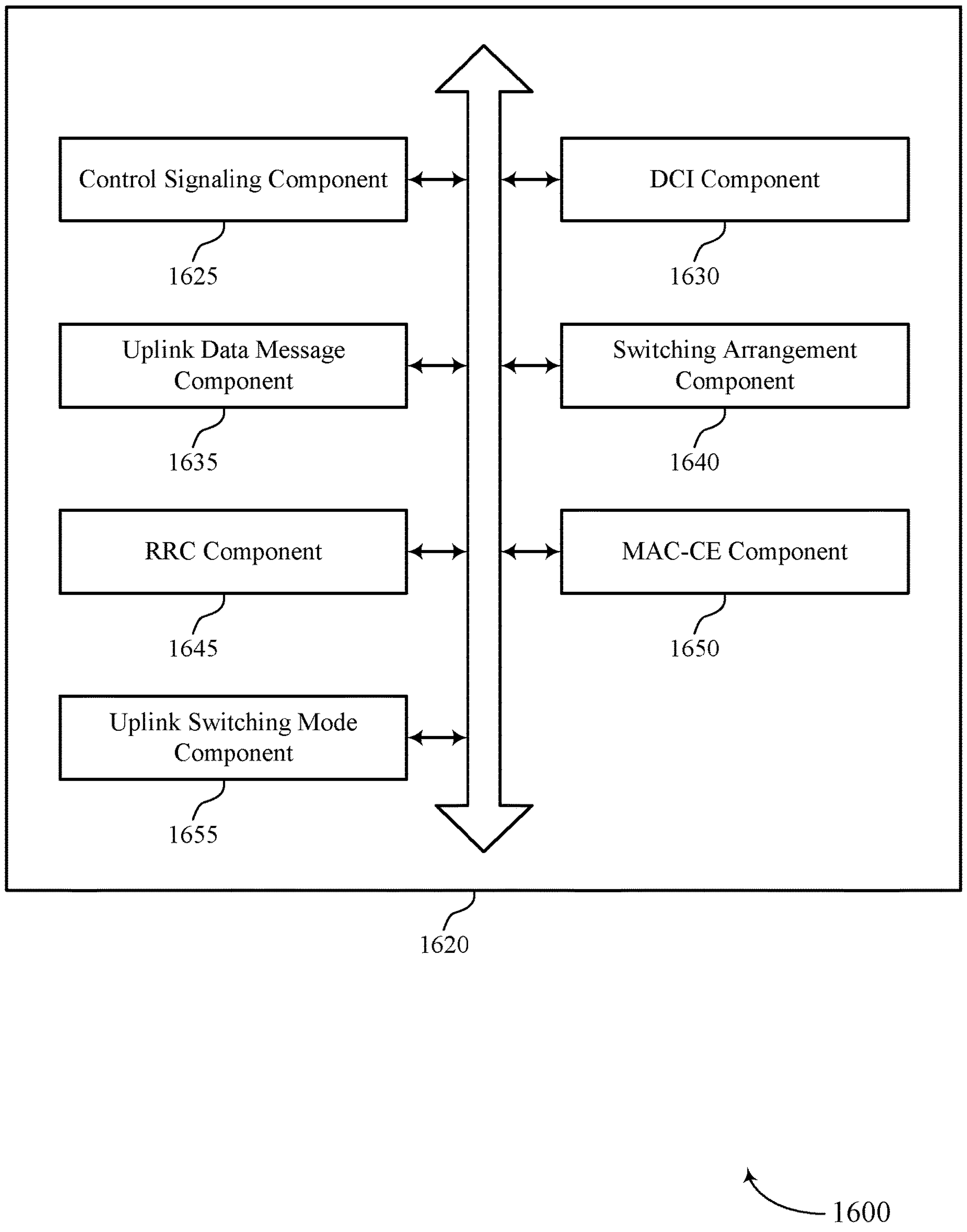
FIG. 16 shows a block diagram of a communications manager that supports dynamic switching between communications schemes for uplink communications in accordance with aspects of the present disclosure.

FIG. 16 shows a block diagram 1600 of a communications manager 1620 that supports dynamic switching between communications schemes for uplink communications in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of dynamic switching between communications schemes for uplink communications as described herein. For example, the communications manager 1620 may include a control signaling component 1625, a DCI component 1630, an uplink data message component 1635, a switching arrangement component 1640, an RRC component 1645, a MAC-CE component 1650, an uplink switching mode component 1655, or any combination thereof. Each of these components may communicate, directly or indirectly, with one another (e.g., via one or more buses).

The communications manager 1620 may support wireless communication at a base station in accordance with examples as disclosed herein. The control signaling component 1625 may be configured as or otherwise support a means for transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme. The DCI component 1630 may be configured as or otherwise support a means for transmitting, to the UE, DCI that schedules an uplink data message and indicates one or more SRS resource sets associated with the uplink data message, where a switching arrangement between the set of multiple communications schemes is indicated for the uplink data message by one or more of the control signaling, the DCI, or the one or more SRS resource sets. The uplink data message component 1635 may be configured as or otherwise support a means for receiving, from the UE, the uplink data message in accordance with the switching arrangement.

In some examples, to support transmitting the DCI, the switching arrangement component 1640 may be configured as or otherwise support a means for transmitting a switching indication field, where a value of the switching indication field indicates the switching arrangement between the set of multiple communications schemes for the uplink data message.

In some examples, the one or more SRS resource sets indicated via the DCI include a first SRS resource set and a second SRS resource set associated with the uplink data message. In some examples, the switching arrangement indicates an arrangement for transmitting a first portion or a first repetition of the uplink data message in accordance with a first set of parameters associated with the first SRS resource set and for transmitting a second portion or a second repetition of the uplink data message in accordance with a second set of parameters associated with the second SRS resource set.

In some examples, to support transmitting the control signaling, the uplink switching mode component 1655 may be configured as or otherwise support a means for transmitting an RRC message that indicates an uplink switching mode for the UE, the uplink switching mode associated with a switch between a subset of communications schemes of the set of multiple communications schemes and selected from one of a first uplink switching mode and a second uplink switching mode. In some examples, the first uplink switching mode may be associated with a first subset of communications schemes including the SDM scheme and the sTRP transmission scheme and the second uplink switching mode may be associated with a second subset of communications schemes including the FDM scheme, the TDM scheme, and the sTRP transmission scheme.

In some examples, each value of the switching indication field indicates a respective communications scheme of the subset of communications schemes associated with the indicated uplink switching mode.

In some examples, the uplink switching mode is the first uplink switching mode. In some examples, a first set of values of the switching indication field indicates the sTRP transmission scheme and a second set of values of the switching indication field indicates the SDM scheme. In some examples, the uplink switching mode is the second uplink switching mode. In some examples, one or more first values of the switching indication field correspond to a communications scheme of the set of multiple communications schemes that is associated with multiple TRPs. In some examples, a value of a TDRA field in the DCI indicates whether the communications scheme is the FDM scheme or the TDM scheme.

In some examples, each value of a set of multiple values of the switching indication field indicates a respective switching arrangement of a set of multiple switching arrangements and a respective communications scheme of the set of multiple communications schemes for transmitting the uplink data message.

In some examples, the DCI further includes a first resource indication field associated with a first set of multiple values and a second resource indication field associated with a second set of multiple values. In some examples, a first subset of values of the first set of multiple values is associated with resource indications for a first SRS resource set based on the switching indication field indicating the SDM scheme. In some examples, a second subset of values of the second set of multiple values is associated with resource indications for a second SRS resource set based on the switching indication field indicating the SDM scheme.

In some examples, the DCI further includes a first resource indication field associated with a first set of multiple values and a second resource indication field associated with a second set of multiple values. In some examples, a first subset of values of the first set of multiple values is associated with resource indications for a first SRS resource set based on the switching indication field indicating the SDM scheme. In some examples, a second subset of values of the first set of multiple values is associated with resource indications for a second SRS resource set based on the switching indication field indicating the SDM scheme.

In some examples, to support transmitting the control signaling, the RRC component 1645 may be configured as or otherwise support a means for transmitting an RRC message that indicates two or more SRS resource sets for the UE, where the RRC message indicates a communications scheme of the set of multiple communications schemes for transmission of the uplink data message, and where transmitting the uplink data message is based on the communications scheme indicated via the RRC message.

In some examples, to support transmitting the control signaling, the MAC-CE component 1650 may be configured as or otherwise support a means for transmitting a MAC-CE that indicates a communications scheme of the set of multiple communications schemes for transmission of the uplink data message, where transmitting the uplink data message is based on the communications scheme indicated via the MAC-CE.

In some examples, the control signaling component 1625 may be configured as or otherwise support a means for transmitting an RRC message that indicates two SRS resource sets for the UE, where the MAC-CE disables a first SRS resource set of the two SRS resource sets, and where a presence of a switching indication field in the DCI is based on disabling the first SRS resource set.

Figure 17:
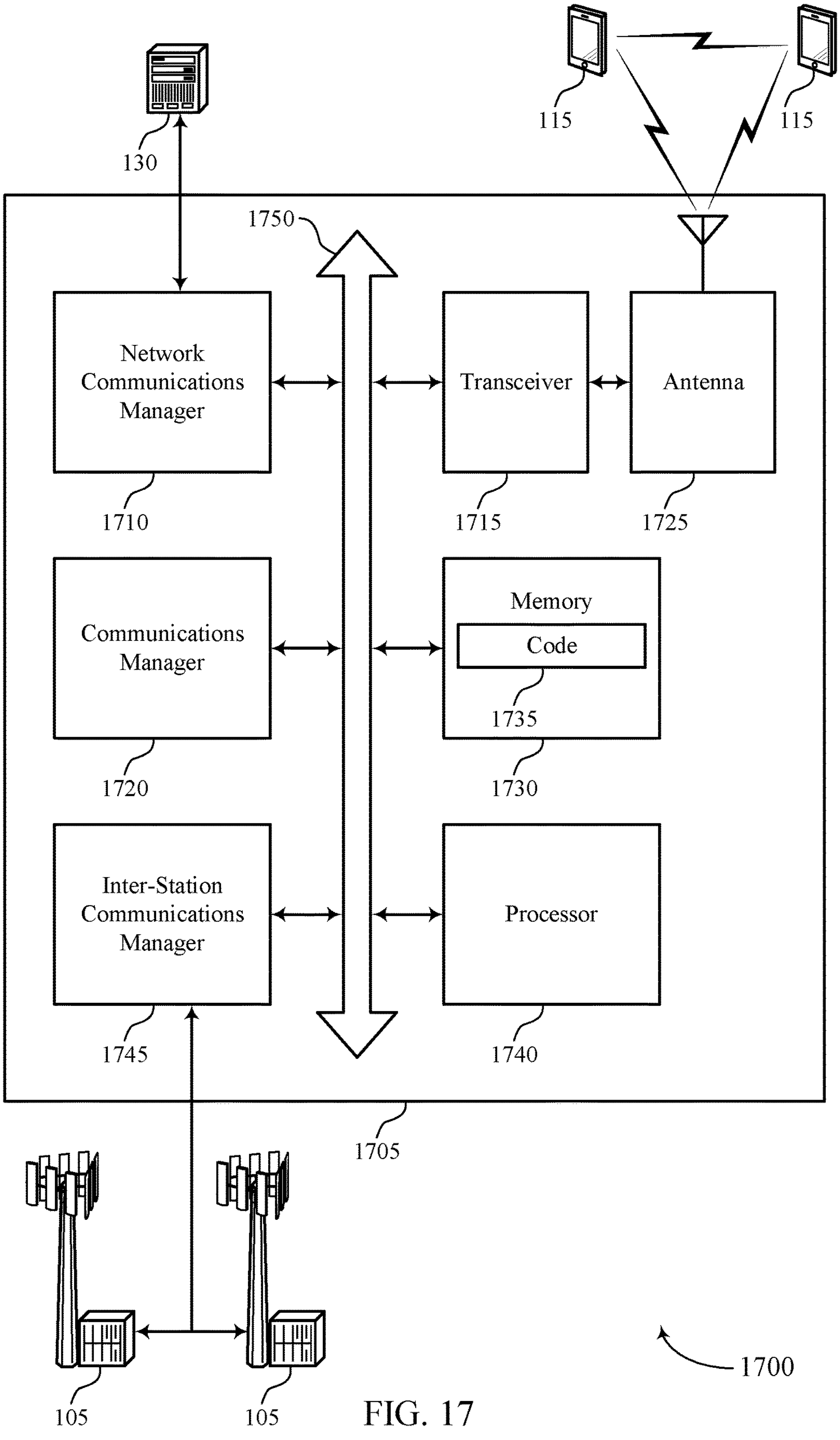
FIG. 17 shows a diagram of a system including a device that supports dynamic switching between communications schemes for uplink communications in accordance with aspects of the present disclosure.

FIG. 17 shows a diagram of a system 1700 including a device 1705 that supports dynamic switching between communications schemes for uplink communications in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745.

These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting dynamic switching between communications schemes for uplink communications). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme. The communications manager 1720 may be configured as or otherwise support a means for transmitting, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The communications manager 1720 may be configured as or otherwise support a means for receiving, from the UE, the uplink data message in accordance with the switching arrangement.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of dynamic switching between communications schemes for uplink communications as described herein, or the processor 1740 and the memory 1730 may be otherwise configured to perform or support such operations.

Figure 18:
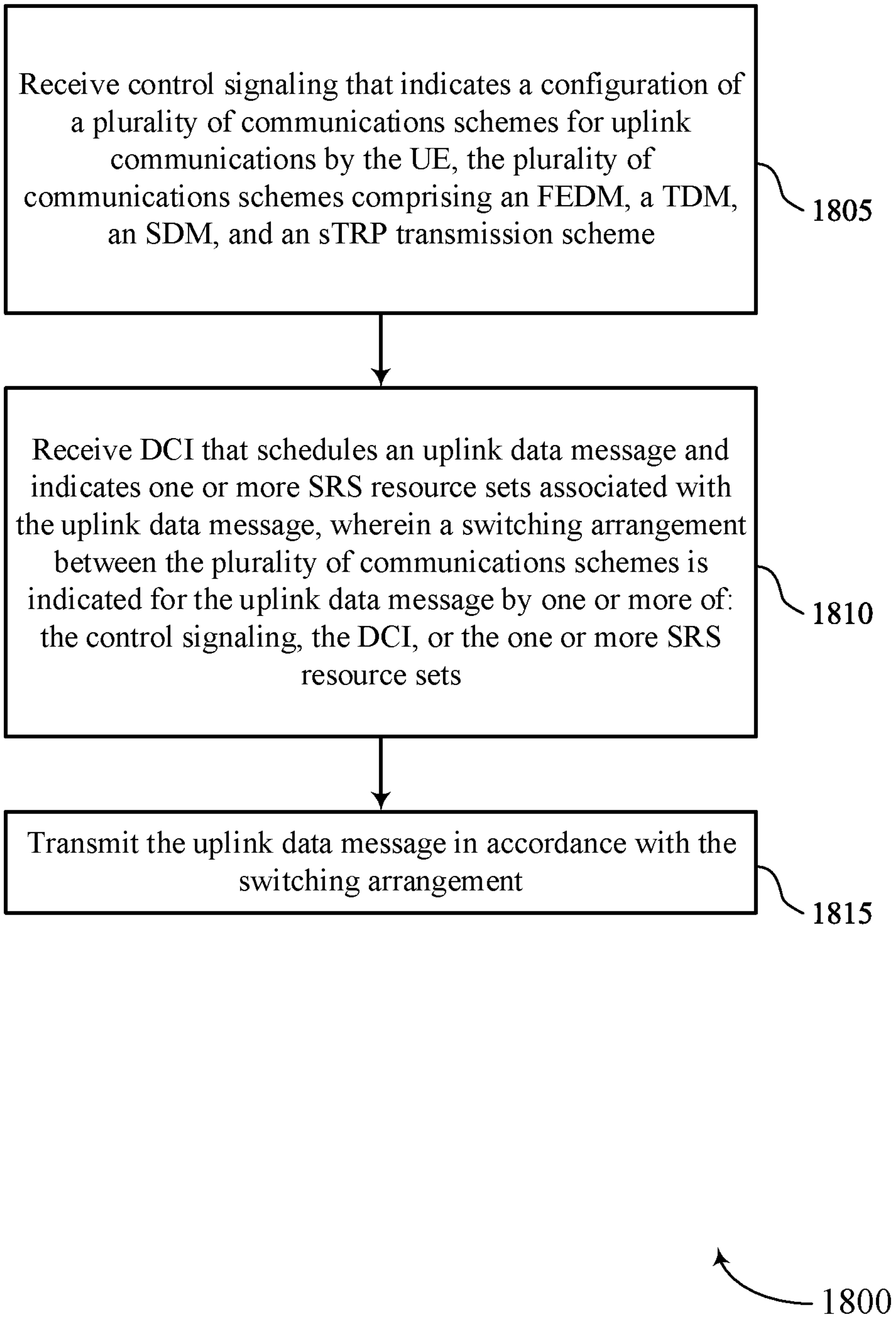
FIGS. 18 through 21 show flowcharts illustrating methods that support dynamic switching between communications schemes for uplink communications in accordance with aspects of the present disclosure.

FIG. 18 shows a flowchart illustrating a method 1800 that supports dynamic switching between communications schemes for uplink communications in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving control signaling that indicates a configuration of a set of multiple communications schemes for uplink communications by the UE, the set of multiple communications schemes including an FDM scheme, a TDM scheme, an SDM scheme, and an sTRP transmission scheme. The operations of 1805 may be performed in accordance with examples as disclosed herein. In some examples, aspects of the operations of 1805 may be performed by a control signaling component 1225 as described with reference to FIG. 12.

At 1810, the method may include receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The operations of 1810 may be performed in accordance with examples as disclosed herein. In some examples, aspects of the operations of 1810 may be performed by a DCI component 1230 as described with reference to FIG. 12.

At 1815, the method may include transmitting the uplink data message in accordance with the switching arrangement. The operations of 1815 may be performed in accordance with examples as disclosed herein. In some examples, aspects of the operations of 1815 may be performed by an uplink data message component 1235 as described with reference to FIG. 12.

Figure 19:
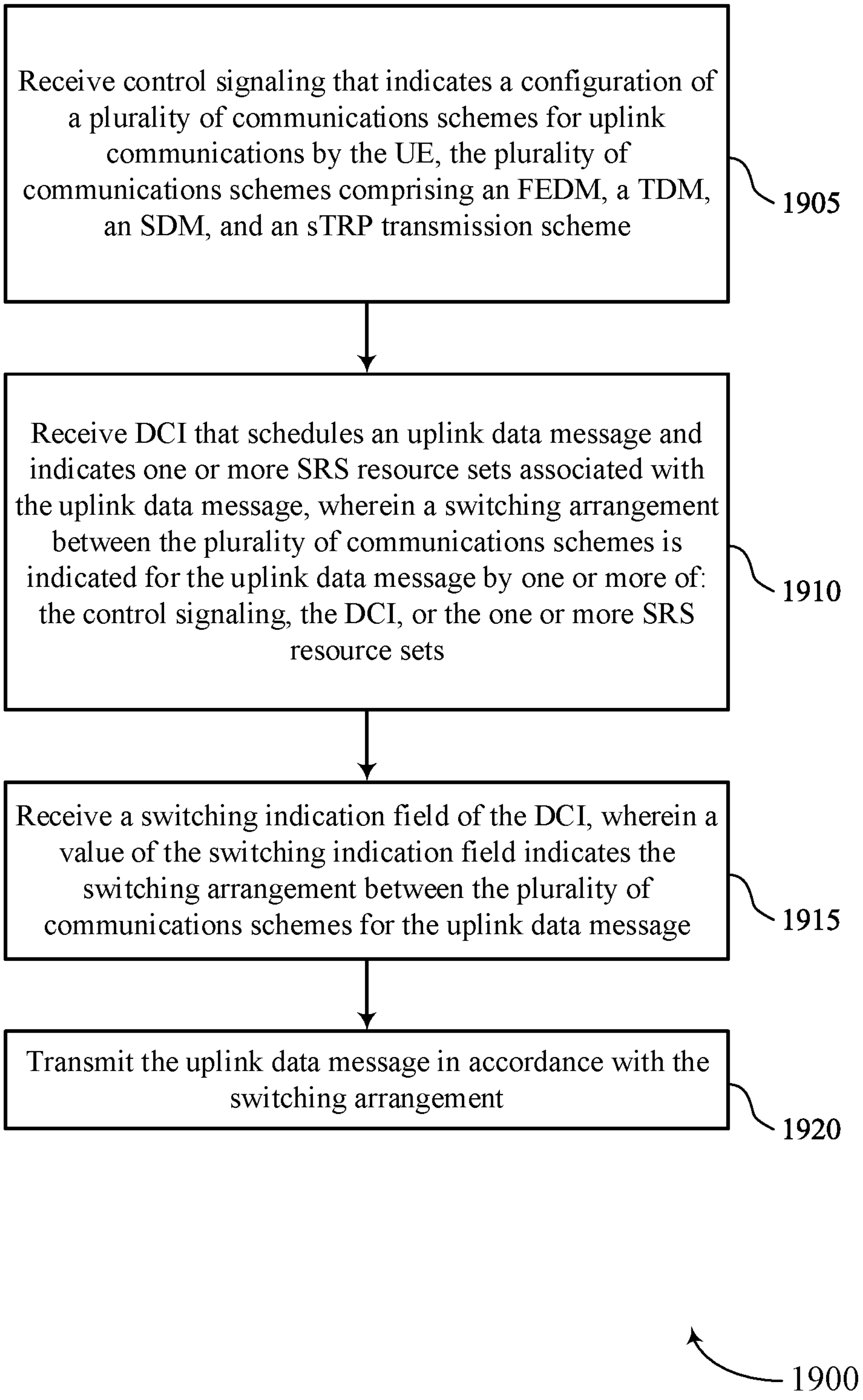

FIG. 19 shows a flowchart illustrating a method 1900 that supports dynamic switching between communications schemes for uplink communications in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving control signaling that indicates a configuration of a set of multiple communications schemes for uplink communications by the UE, the set of multiple communications schemes including an FDM scheme, a TDM scheme, an SDM scheme, and an sTRP transmission scheme. The operations of 1905 may be performed in accordance with examples as disclosed herein. In some examples, aspects of the operations of 1905 may be performed by a control signaling component 1225 as described with reference to FIG. 12.

At 1910, the method may include receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The operations of 1910 may be performed in accordance with examples as disclosed herein. In some examples, aspects of the operations of 1910 may be performed by a DCI component 1230 as described with reference to FIG. 12.

At 1915, the method may include receiving a switching indication field of the DCI, where a value of the switching indication field indicates the switching arrangement between the set of multiple communications schemes for the uplink data message. The operations of 1915 may be performed in accordance with examples as disclosed herein. In some examples, aspects of the operations of 1915 may be performed by a switching arrangement component 1240 as described with reference to FIG. 12.

At 1920, the method may include transmitting the uplink data message in accordance with the switching arrangement. The operations of 1920 may be performed in accordance with examples as disclosed herein. In some examples, aspects of the operations of 1920 may be performed by an uplink data message component 1235 as described with reference to FIG. 12.

Figure 20:
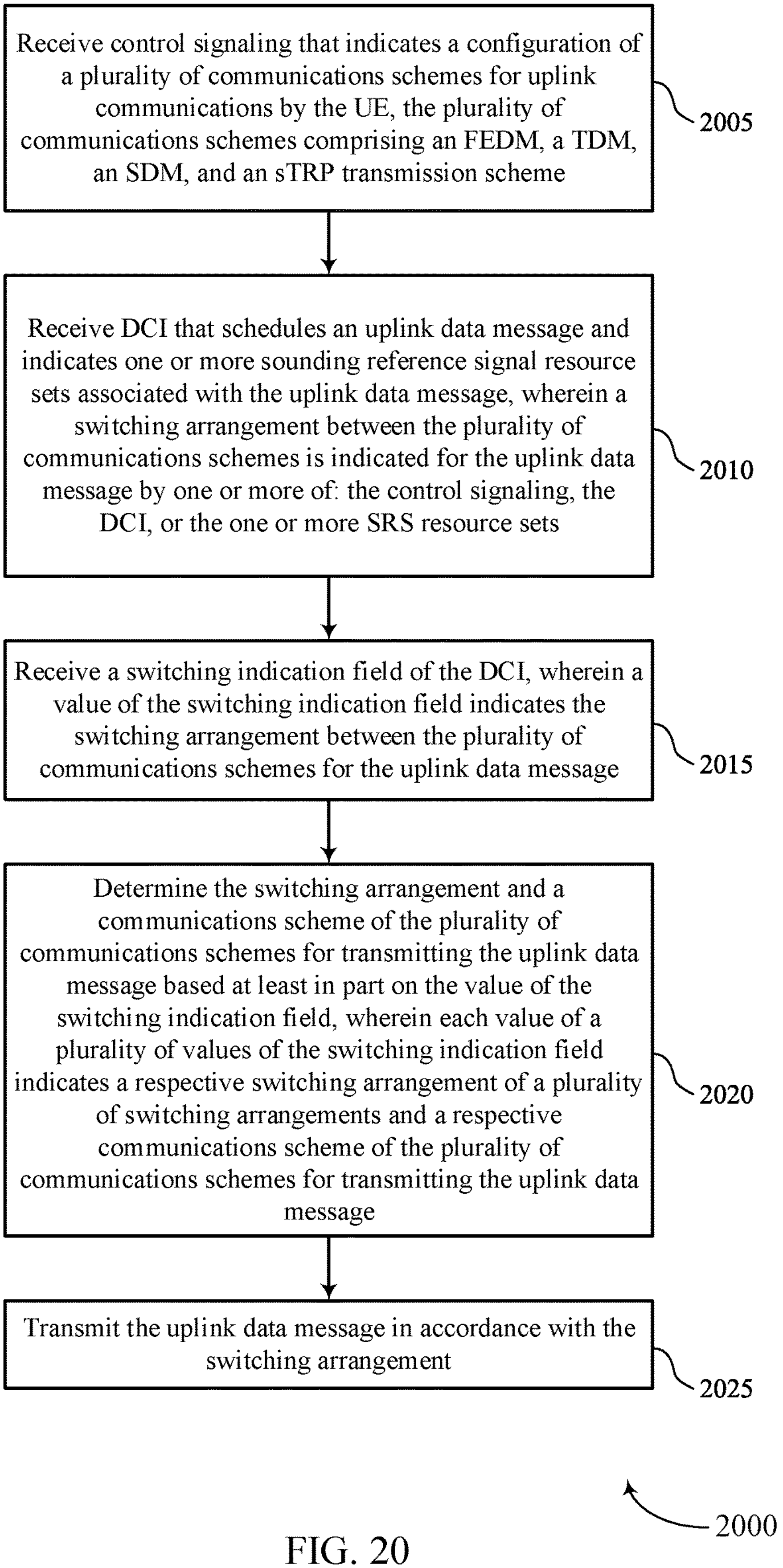

FIG. 20 shows a flowchart illustrating a method 2000 that supports dynamic switching between communications schemes for uplink communications in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving control signaling that indicates a configuration of a set of multiple communications schemes for uplink communications by the UE, the set of multiple communications schemes including an FDM scheme, a TDM scheme, an SDM scheme, and an sTRP transmission scheme. The operations of 2005 may be performed in accordance with examples as disclosed herein. In some examples, aspects of the operations of 2005 may be performed by a control signaling component 1225 as described with reference to FIG. 12.

At 2010, the method may include receiving DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The operations of 2010 may be performed in accordance with examples as disclosed herein. In some examples, aspects of the operations of 2010 may be performed by a DCI component 1230 as described with reference to FIG. 12.

At 2015, the method may include receiving a switching indication field of the DCI, where a value of the switching indication field indicates the switching arrangement between the set of multiple communications schemes for the uplink data message. The operations of 2015 may be performed in accordance with examples as disclosed herein. In some examples, aspects of the operations of 2015 may be performed by a switching arrangement component 1240 as described with reference to FIG. 12.

At 2020, the method may include determining the switching arrangement and a communications scheme of the set of multiple communications schemes for transmitting the uplink data message based on the value of the switching indication field, where each value of a set of multiple values of the switching indication field indicates a respective switching arrangement of a set of multiple switching arrangements and a respective communications scheme of the set of multiple communications schemes for transmitting the uplink data message. The operations of 2020 may be performed in accordance with examples as disclosed herein. In some examples, aspects of the operations of 2020 may be performed by a switching arrangement component 1240 as described with reference to FIG. 12.

At 2025, the method may include transmitting the uplink data message in accordance with the switching arrangement. The operations of 2025 may be performed in accordance with examples as disclosed herein. In some examples, aspects of the operations of 2025 may be performed by an uplink data message component 1235 as described with reference to FIG. 12.

Figure 21:
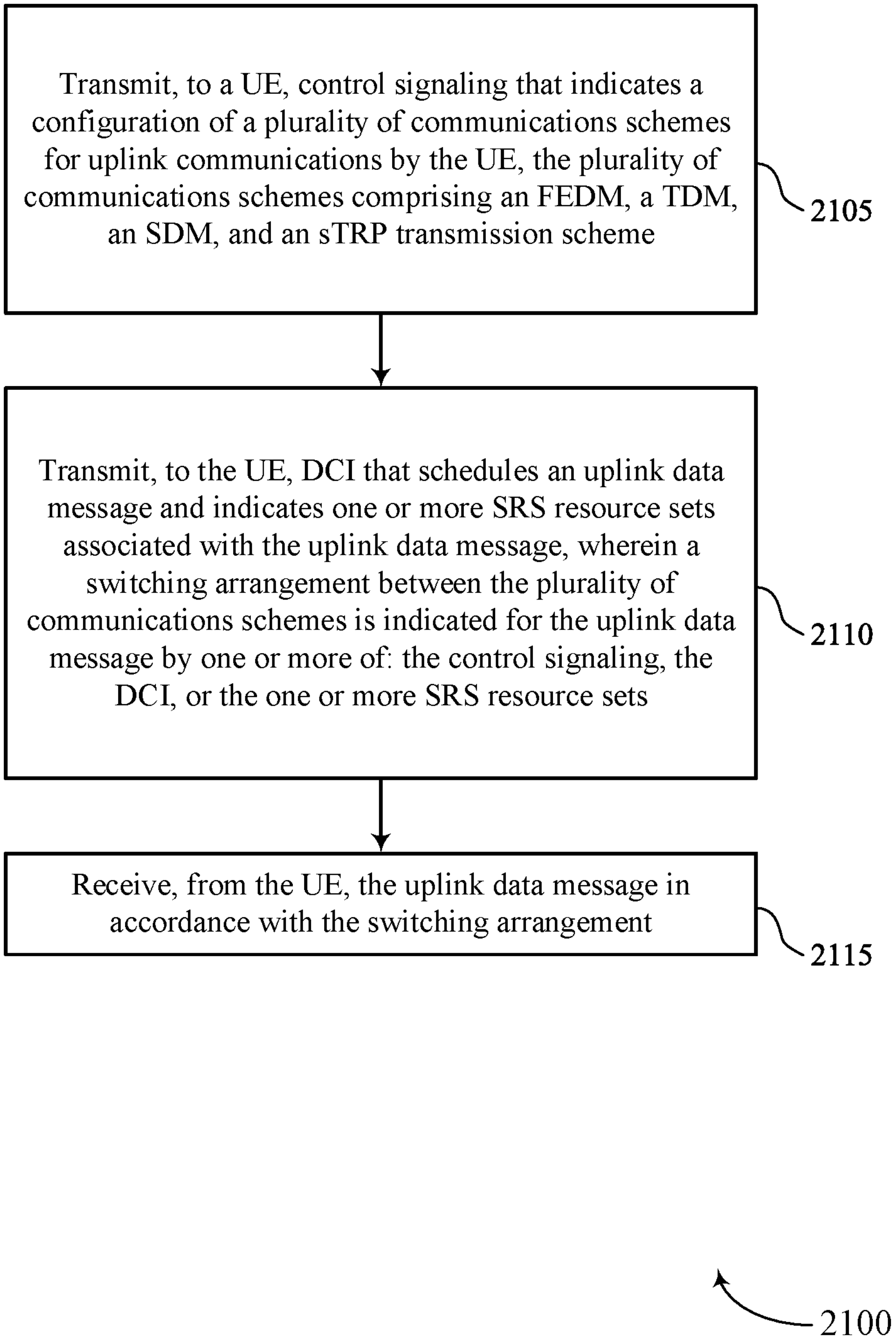

FIG. 21 shows a flowchart illustrating a method 2100 that supports dynamic switching between communications schemes for uplink communications in accordance with aspects of the present disclosure. The operations of the method 2100 may be implemented by a base station or its components as described herein. For example, the operations of the method 2100 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, control signaling that indicates a configuration of a set of multiple communications schemes for uplink communications by the UE, the set of multiple communications schemes including an FDM scheme, a TDM scheme, an SDM scheme, and an sTRP transmission scheme. The operations of 2105 may be performed in accordance with examples as disclosed herein. In some examples, aspects of the operations of 2105 may be performed by a control signaling component 1625 as described with reference to FIG. 16.

At 2110, the method may include transmitting, to the UE, DCI that schedules an uplink data message and indicates one or more SRS resource sets associated with the uplink data message, where a switching arrangement between the set of multiple communications schemes is indicated for the uplink data message by one or more of: the control signaling, the DCI, or the one or more SRS resource sets. The operations of 2110 may be performed in accordance with examples as disclosed herein. In some examples, aspects of the operations of 2110 may be performed by a DCI component 1630 as described with reference to FIG. 16.

At 2115, the method may include receiving, from the UE, the uplink data message in accordance with the switching arrangement. The operations of 2115 may be performed in accordance with examples as disclosed herein. In some examples, aspects of the operations of 2115 may be performed by an uplink data message component 1635 as described with reference to FIG. 16.

The following provides an overview of aspects of the present disclosure:

Aspect 1: A method for wireless communication at a UE, comprising: receiving control signaling that indicates a configuration of a plurality of communications schemes for uplink communications by the UE, the plurality of communications schemes comprising an FDM scheme, a TDM scheme, an SDM scheme, and an sTRP transmission scheme; receiving DCI that schedules an uplink data message and indicates one or more SRS resource sets associated with the uplink data message, wherein a switching arrangement between the plurality of communications schemes is indicated for the uplink data message by one or more of: the control signaling, the DCI, or the one or more SRS resource sets; and transmitting the uplink data message in accordance with the switching arrangement.

Aspect 2: The method of aspect 1, wherein receiving the DCI comprises: receiving a switching indication field, wherein a value of the switching indication field indicates the switching arrangement between the plurality of communications schemes for the uplink data message.

Aspect 3: The method of aspect 2, wherein the one or more SRS resource sets indicated via the DCI comprise a first SRS resource set and a second SRS resource set associated with the uplink data message; and the switching arrangement indicates an arrangement for transmitting a first portion or a first repetition of the uplink data message in accordance with a first set of parameters associated with the first SRS resource set and for transmitting a second portion or a second repetition of the uplink data message in accordance with a second set of parameters associated with the second SRS resource set.

Aspect 4: The method of any of aspects 2 through 3, wherein receiving the control signaling comprises: receiving a RRC message that indicates an uplink switching mode for the UE, the uplink switching mode associated with a switch between a subset of communications schemes of the plurality of communications schemes and selected from one of a first uplink switching mode and a second uplink switching mode, wherein: the first uplink switching mode is associated with a first subset of communications schemes comprising the SDM scheme and the sTRP transmission scheme; and the second uplink switching mode is associated with a second subset of communications schemes comprising the FDM scheme, the TDM scheme, and the sTRP transmission scheme.

Aspect 5: The method of aspect 4, further comprising: determining a communications scheme of the plurality of communications schemes for transmitting the uplink data message based at least in part on the indicated uplink switching mode and the value of the switching indication field, wherein each value of the switching indication field indicates a respective communications scheme of the subset of communications schemes associated with the uplink switching mode.

Aspect 6: The method of aspect 4, wherein the uplink switching mode is the first uplink switching mode, the method further comprising: determining whether a communications scheme of the plurality of communications schemes for transmitting the uplink data message is the SDM scheme or the sTRP transmission scheme based at least in part on the value of the switching indication field, wherein: a first set of values of the switching indication field indicates the sTRP transmission scheme; and a second set of values of the switching indication field indicates the SDM scheme.

Aspect 7: The method of aspect 4, wherein the uplink switching mode is the second uplink switching mode, the method further comprising: determining that a communications scheme of the plurality of communications schemes for transmitting a plurality of sets of repetitions of the uplink data message is associated with multiple TRPs based at least in part on one or more first values of the switching indication field and a value of a TDRA field in the DCI, wherein the value of the TDRA field of the DCI indicates whether the communications scheme is the FDM scheme or the TDM scheme.

Aspect 8: The method of any of aspects 2 through 3, further comprising: determining the switching arrangement and a communications scheme of the plurality of communications schemes for transmitting the uplink data message based at least in part on the value of the switching indication field, wherein each value of a plurality of values of the switching indication field indicates a respective switching arrangement of a plurality of switching arrangements and a respective communications scheme of the plurality of communications schemes for transmitting the uplink data message.

Aspect 9: The method of aspect 8, wherein the DCI further comprises a first resource indication field associated with a first plurality of values and a second resource indication field associated with a second plurality of values; a first subset of values of the first plurality of values is associated with resource indications for a first SRS resource set based at least in part on the switching indication field indicating the SDM scheme; and a second subset of values of the second plurality of values is associated with resource indications for a second SRS resource set based at least in part on the switching indication field indicating the SDM scheme.

Aspect 10: The method of aspect 8, wherein the DCI further comprises a first resource indication field associated with a first plurality of values and a second resource indication field associated with a second plurality of values; a first subset of values of the first plurality of values is associated with resource indications for a first SRS resource set based at least in part on the switching indication field indicating the SDM scheme; and a second subset of values of the first plurality of values is associated with resource indications for a second SRS resource set based at least in part on the switching indication field indicating the SDM scheme.

Aspect 11: The method of any of aspects 1 through 10, wherein receiving the control signaling comprises: receiving an RRC message that indicates two or more SRS resource sets for the UE, wherein the RRC message indicates a communications scheme of the plurality of communications schemes for transmission of the uplink data message, and wherein transmitting the uplink data message is based at least in part on the communications scheme indicated via the RRC message.

Aspect 12: The method of aspect 11, further comprising: determining the communications scheme based at least in part on the RRC message and a frequency band on which the uplink data message is transmitted, wherein the RRC message indicates a respective communications scheme of the plurality of communications schemes for each frequency band of a plurality of frequency bands.

Aspect 13: The method of aspect 11, further comprising: determining the communications scheme based at least in part on the RRC message and a configuration of the DCI, wherein the RRC message indicates a respective communications scheme of the plurality of communications schemes for each type of the DCI of a plurality of types.

Aspect 14: The method of any of aspects 1 through 13, wherein receiving the control signaling comprises: receiving a MAC-CE that indicates a communications scheme of the plurality of communications schemes for transmission of the uplink data message, wherein transmitting the uplink data message is based at least in part on the communications scheme indicated via the MAC-CE.

Aspect 15: The method of aspect 14, further comprising: receiving an RRC message that indicates two SRS resource sets for the UE, wherein the MAC-CE disables a first SRS resource set of the two SRS resource sets, and wherein a presence of a switching indication field in the DCI is based at least in part on disabling the first SRS resource set.

Aspect 16: A method for wireless communication at a base station, comprising: transmitting, to a UE, control signaling that indicates a configuration of a plurality of communications schemes for uplink communications by the UE, the plurality of communications schemes comprising an FDM scheme, a TDM scheme, an SDM scheme, and an sTRP transmission scheme; transmitting, to the UE, DCI that schedules an uplink data message and indicates one or more SRS resource sets associated with the uplink data message, wherein a switching arrangement between the plurality of communications schemes is indicated for the uplink data message by one or more of: the control signaling, the DCI, or the one or more SRS resource sets; and receiving, from the UE, the uplink data message in accordance with the switching arrangement.

Aspect 17: The method of aspect 16, wherein transmitting the DCI comprises: transmitting a switching indication field, wherein a value of the switching indication field indicates the switching arrangement between the plurality of communications schemes for the uplink data message.

Aspect 18: The method of aspect 17, wherein the one or more SRS resource sets indicated via the DCI comprise a first SRS resource set and a second SRS resource set associated with the uplink data message; and the switching arrangement indicates an arrangement for transmitting a first portion or a first repetition of the uplink data message in accordance with a first set of parameters associated with the first SRS resource set and for transmitting a second portion or a second repetition of the uplink data message in accordance with a second set of parameters associated with the second SRS resource set.

Aspect 19: The method of any of aspects 17 through 18, wherein transmitting the control signaling comprises: transmitting an RRC message that indicates an uplink switching mode for the UE, the uplink switching mode associated with a switch between a subset of communications schemes of the plurality of communications schemes and selected from one of a first uplink switching mode and a second uplink switching mode, wherein: the first uplink switching mode is associated with a first subset of communications schemes comprising the SDM scheme and the sTRP transmission scheme; and the second uplink switching mode is associated with a second subset of communications schemes comprising the FDM scheme, the TDM scheme, and the sTRP transmission scheme.

Aspect 20: The method of aspect 19, wherein each value of the switching indication field indicates a respective communications scheme of the subset of communications schemes associated with the indicated uplink switching mode.

Aspect 21: The method of aspect 19, wherein: the uplink switching mode is the first uplink switching mode; a first set of values of the switching indication field indicates the sTRP transmission scheme; and a second set of values of the switching indication field indicates the SDM scheme.

Aspect 22: The method of aspect 19, wherein: the uplink switching mode is the second uplink switching mode; one or more first values of the switching indication field correspond to a communications scheme of the plurality of communications schemes that is associated with multiple TRPs; and a value of a TDRA field in the DCI indicates whether the communications scheme is the FDM scheme or the TDM scheme.

Aspect 23: The method of any of aspects 17 through 18, wherein each value of a plurality of values of the switching indication field indicates a respective switching arrangement of a plurality of switching arrangements and a respective communications scheme of the plurality of communications schemes for transmitting the uplink data message.

Aspect 24: The method of aspect 23, wherein the DCI further comprises a first resource indication field associated with a first plurality of values and a second resource indication field associated with a second plurality of values; a first subset of values of the first plurality of values is associated with resource indications for a first SRS resource set based at least in part on the switching indication field indicating the SDM scheme; and a second subset of values of the second plurality of values is associated with resource indications for a second SRS resource set based at least in part on the switching indication field indicating the SDM scheme.

Aspect 25: The method of aspect 23, wherein the DCI further comprises a first resource indication field associated with a first plurality of values and a second resource indication field associated with a second plurality of values; a first subset of values of the first plurality of values is associated with resource indications for a first SRS resource set based at least in part on the switching indication field indicating the SDM scheme; and a second subset of values of the first plurality of values is associated with resource indications for a second SRS resource set based at least in part on the switching indication field indicating the SDM scheme.

Aspect 26: The method of any of aspects 16 through 25, wherein transmitting the control signaling comprises: transmitting an RRC message that indicates two or more SRS resource sets for the UE, wherein the RRC message indicates a communications scheme of the plurality of communications schemes for transmission of the uplink data message, and wherein transmitting the uplink data message is based at least in part on the communications scheme indicated via the RRC message.

Aspect 27: The method of any of aspects 16 through 26, wherein transmitting the control signaling comprises: transmitting a MAC-CE that indicates a communications scheme of the plurality of communications schemes for transmission of the uplink data message, wherein transmitting the uplink data message is based at least in part on the communications scheme indicated via the MAC-CE.

Aspect 28: The method of aspect 27, further comprising: transmitting an RRC message that indicates two SRS resource sets for the UE, wherein the MAC-CE disables a first SRS resource set of the two reference signal resource sets, and wherein a presence of a switching indication field in the DCI is based at least in part on disabling the first SRS resource set.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
- a processor;
- memory coupled with the processor; and
- instructions stored in the memory and executable by the processor to cause the apparatus to:
  - receive control signaling that indicates a configuration of a plurality of communications schemes for uplink communications by the UE, the plurality of communications schemes comprising a frequency division multiplexing scheme, a time division multiplexing scheme, a spatial division multiplexing scheme, and a single transmission/reception point transmission scheme;
  - receive downlink control information that schedules an uplink data message and indicates one or more sounding reference signal resource sets associated with the uplink data message, wherein a switching arrangement between the plurality of communications schemes is indicated for the uplink data message by one or more of: the control signaling, the downlink control information, or the one or more sounding reference signal resource sets;
  - transmit the uplink data message in accordance with the switching arrangement;
  - wherein the instructions to receive the downlink control information are executable by the processor to cause the apparatus to:
  - receive a switching indication field, wherein a value of the switching indication field indicates the switching arrangement between the plurality of communications schemes for the uplink data message; and
  - wherein:
- the one or more sounding reference signal resource sets indicated via the downlink control information comprise a first sounding reference signal resource set and a second sounding reference signal resource set associated with the uplink data message; and
- the switching arrangement indicates an arrangement for transmitting a first portion or a first repetition of the uplink data message in accordance with a first set of parameters associated with the first sounding reference signal resource set and for transmitting a second portion or a second repetition of the uplink data message in accordance with a second set of parameters associated with the second sounding reference signal resource set.

2. The apparatus of claim 1, wherein the instructions to receive the control signaling are executable by the processor to cause the apparatus to:
- receive a radio resource control message that indicates an uplink switching mode for the UE, the uplink switching mode associated with a switch between a subset of communications schemes of the plurality of communications schemes and selected from one of a first uplink switching mode and a second uplink switching mode, wherein:
  - the first uplink switching mode be associated with a first subset of communications schemes comprising the spatial division multiplexing scheme and the single transmission/reception point transmission scheme; and
  - the second uplink switching mode be associated with a second subset of communications schemes comprising the frequency division multiplexing scheme, the time division multiplexing scheme, and the single transmission/reception point transmission scheme.

3. The apparatus of claim 2, wherein the instructions are further executable by the processor to cause the apparatus to:

determine a communications scheme of the plurality of communications schemes for transmitting the uplink data message based at least in part on the indicated uplink switching mode and the value of the switching indication field, wherein each value of the switching indication field indicates a respective communications scheme of the subset of communications schemes associated with the uplink switching mode.

4. The apparatus of claim 2, wherein the uplink switching mode is the first uplink switching mode, and the instructions are further executable by the processor to cause the apparatus to:

determine whether a communications scheme of the plurality of communications schemes for transmitting the uplink data message is the spatial division multiplexing scheme or the single transmission/reception point transmission scheme based at least in part on the value of the switching indication field, wherein:

a first set of values of the switching indication field indicate the single transmission/reception point transmission scheme; and a second set of values of the switching indication field indicate the spatial division multiplexing scheme.

5. The apparatus of claim 2, wherein the uplink switching mode is the second uplink switching mode, and the instructions are further executable by the processor to cause the apparatus to:

determine that a communications scheme of the plurality of communications schemes for transmitting a plurality of sets of repetitions of the uplink data message is associated with multiple transmission/reception points based at least in part on one or more first values of the switching indication field and a value of a time domain resource allocation field in the downlink control information, wherein the value of the time domain resource allocation field of the downlink control information indicates whether the communications scheme is the frequency division multiplexing scheme or the time division multiplexing scheme.

6. The apparatus of claim 1, wherein the instructions are further executable by the processor to cause the apparatus to:

determine the switching arrangement and a communications scheme of the plurality of communications schemes for transmitting the uplink data message based at least in part on the value of the switching indication field, wherein each value of a plurality of values of the switching indication field indicates a respective switching arrangement of a plurality of switching arrangements and a respective communications scheme of the plurality of communications schemes for transmitting the uplink data message.

7. The apparatus of claim 6, wherein:

the downlink control information further comprises a first resource indication field associated with a first plurality of values and a second resource indication field associated with a second plurality of values;

a first subset of values of the first plurality of values is associated with resource indications for a first sounding reference signal resource set based at least in part on the switching indication field indicating the spatial division multiplexing scheme; and a second subset of values of the second plurality of values is associated with resource indications for a second sounding reference signal resource set based at least in part on the switching indication field indicating the spatial division multiplexing scheme.

8. The apparatus of claim 6, wherein:

the downlink control information further comprises a first resource indication field associated with a first plurality of values and a second resource indication field associated with a second plurality of values;

a first subset of values of the first plurality of values is associated with resource indications for a first sounding reference signal resource set based at least in part on the switching indication field indicating the spatial division multiplexing scheme; and a second subset of values of the first plurality of values is associated with resource indications for a second sounding reference signal resource set based at least in part on the switching indication field indicating the spatial division multiplexing scheme.

9. The apparatus of claim 1, wherein the instructions to receive the control signaling are executable by the processor to cause the apparatus to:

receive a radio resource control message that indicates two or more sounding reference signal resource sets for the UE, wherein the radio resource control message indicates a communications scheme of the plurality of communications schemes for transmission of the uplink data message, and wherein transmitting the uplink data message is based at least in part on the communications scheme indicated via the radio resource control message.

10. The apparatus of claim 9, wherein the instructions are further executable by the processor to cause the apparatus to:

determine the communications scheme based at least in part on the radio resource control message and a frequency band on which the uplink data message is transmitted, wherein the radio resource control message indicates a respective communications scheme of the plurality of communications schemes for each frequency band of a plurality of frequency bands.

11. The apparatus of claim 9, wherein the instructions are further executable by the processor to cause the apparatus to:

determine the communications scheme based at least in part on the radio resource control message and a configuration of the downlink control information, wherein the radio resource control message indicates a respective communications scheme of the plurality of communications schemes for each type of the downlink control information of a plurality of types.

12. The apparatus of claim 1, wherein the instructions to receive the control signaling are executable by the processor to cause the apparatus to:

receive a medium access control-control element that indicates a communications scheme of the plurality of communications schemes for transmission of the uplink data message, wherein transmitting the uplink data message is based at least in part on the communications scheme indicated via the medium access control-control element.

13. The apparatus of claim 12, wherein the instructions are further executable by the processor to cause the apparatus to:

receive a radio resource control message that indicates two sounding reference signal resource sets for the UE, wherein the medium access control-control element disables a first sounding reference signal resource set of the two sounding reference signal resource sets, and wherein a presence of a switching indication field in the downlink control information is based at least in part on disabling the first sounding reference signal resource set.

14. An apparatus for wireless communication at a base station, comprising:

a processor;

memory coupled with the processor; and instructions stored in the memory and executable by the processor to cause the apparatus to:

transmit, to a user equipment (UE), control signaling that indicates a configuration of a plurality of communications schemes for uplink communications by the UE, the plurality of communications schemes comprising a frequency division multiplexing scheme, a time division multiplexing scheme, a spatial division multiplexing scheme, and a single transmission/reception point transmission scheme;

transmit, to the UE, downlink control information that schedules an uplink data message and indicates one or more sounding reference signal resource sets associated with the uplink data message, wherein a switching arrangement between the plurality of communications schemes is indicated for the uplink data message by one or more of: the control signaling, the downlink control information, or the one or more sounding reference signal resource sets;

receive, from the UE, the uplink data message in accordance with the switching arrangement;

wherein the instructions to transmit the downlink control information are executable by the processor to cause the apparatus to:

transmit a switching indication field, wherein a value of the switching indication field indicates the switching arrangement between the plurality of communications schemes for the uplink data message;

wherein:

the one or more sounding reference signal resource sets indicated via the downlink control information comprise a first sounding reference signal resource set and a second sounding reference signal resource set associated with the uplink data message; and the switching arrangement indicates an arrangement for transmitting a first portion or a first repetition of the uplink data message in accordance with a first set of parameters associated with the first sounding reference signal resource set and for transmitting a second portion or a second repetition of the uplink data message in accordance with a second set of parameters associated with the second sounding reference signal resource set.

15. The apparatus of claim 14, wherein the instructions to transmit the control signaling are executable by the processor to cause the apparatus to:

transmit a radio resource control message that indicates an uplink switching mode for the UE, the uplink switching mode associated with a switch between a subset of communications schemes of the plurality of communications schemes and selected from one of a first uplink switching mode and a second uplink switching mode, wherein:

the first uplink switching mode be associated with a first subset of communications schemes comprising the spatial division multiplexing scheme and the single transmission/reception point transmission scheme; and the second uplink switching mode be associated with a second subset of communications schemes comprising the frequency division multiplexing scheme, the time division multiplexing scheme, and the single transmission/reception point transmission scheme.

16. The apparatus of claim 15, wherein each value of the switching indication field indicates a respective communications scheme of the subset of communications schemes associated with the indicated uplink switching mode.

17. The apparatus of claim 15, wherein:

the uplink switching mode is the first uplink switching mode;

a first set of values of the switching indication field indicates the single transmission/reception point transmission scheme; and a second set of values of the switching indication field indicates the spatial division multiplexing scheme.

18. The apparatus of claim 15, wherein:

the uplink switching mode is the second uplink switching mode;

one or more first values of the switching indication field correspond to a communications scheme of the plurality of communications schemes that is associated with multiple transmission/reception points; and a value of a time domain resource allocation field in the downlink control information indicates whether the communications scheme is the frequency division multiplexing scheme or the time division multiplexing scheme.

19. The apparatus of claim 14, wherein each value of a plurality of values of the switching indication field indicates a respective switching arrangement of a plurality of switching arrangements and a respective communications scheme of the plurality of communications schemes for transmitting the uplink data message.

20. The apparatus of claim 14, wherein the instructions to transmit the control signaling are executable by the processor to cause the apparatus to:

transmit a radio resource control message that indicates two or more sounding reference signal resource sets for the UE, wherein the radio resource control message indicates a communications scheme of the plurality of communications schemes for transmission of the uplink data message, and wherein transmitting the uplink data message is based at least in part on the communications scheme indicated via the radio resource control message.

21. The apparatus of claim 14, wherein the instructions to transmit the control signaling are executable by the processor to cause the apparatus to:

transmit a medium access control-control element that indicates a communications scheme of the plurality of communications schemes for transmission of the uplink data message, wherein transmitting the uplink data message is based at least in part on the communications scheme indicated via the medium access control-control element.

22. The apparatus of claim 21, wherein the instructions are further executable by the processor to cause the apparatus to:

transmit a radio resource control message that indicates two sounding reference signal resource sets for the UE, wherein the medium access control-control element disables a first sounding reference signal resource set of the two reference signal resource sets, and wherein a presence of a switching indication field in the downlink control information is based at least in part on disabling the first sounding reference signal resource set.

23. A method for wireless communication at a user equipment (UE), comprising:

receiving control signaling that indicates a configuration of a plurality of communications schemes for uplink communications by the UE, the plurality of communications schemes comprising a frequency division multiplexing scheme, a time division multiplexing scheme, a spatial division multiplexing scheme, and a single transmission/reception point transmission scheme;

receiving downlink control information that schedules an uplink data message and indicates one or more sounding reference signal resource sets associated with the uplink data message, wherein a switching arrangement between the plurality of communications schemes is indicated for the uplink data message by one or more of: the control signaling, the downlink control information, or the one or more sounding reference signal resource sets;

transmitting the uplink data message in accordance with the switching arrangement;

wherein the receiving the downlink control information includes:

receiving a switching indication field, wherein a value of the switching indication field indicates the switching arrangement between the plurality of communications schemes for the uplink data message;

wherein the one or more sounding reference signal resource sets indicated via the downlink control information comprise a first sounding reference signal resource set and a second sounding reference signal resource set associated with the uplink data message; and the switching arrangement indicates an arrangement for transmitting a first portion or a first repetition of the uplink data message in accordance with a first set of parameters associated with the first sounding reference signal resource set and for transmitting a second portion or a second repetition of the uplink data message in accordance with a second set of parameters associated with the second sounding reference signal resource set.

24. The method of claim 23, wherein receiving the downlink control information comprises:

receiving a switching indication field, wherein a value of the switching indication field indicates the switching arrangement between the plurality of communications schemes for the uplink data message.

25. A method for wireless communication at a base station, comprising:

transmitting, to a user equipment (UE), control signaling that indicates a configuration of a plurality of communications schemes for uplink communications by the UE, the plurality of communications schemes comprising a frequency division multiplexing scheme, a time division multiplexing scheme, a spatial division multiplexing scheme, and a single transmission/reception point transmission scheme;

transmitting, to the UE, downlink control information that schedules an uplink data message and indicates one or more sounding reference signal resource sets associated with the uplink data message, wherein a switching arrangement between the plurality of communications schemes is indicated for the uplink data message by one or more of: the control signaling, the downlink control information, or the one or more sounding reference signal resource sets;

receiving, from the UE, the uplink data message in accordance with the switching arrangement;

wherein transmitting the downlink control information comprises:

transmitting a switching indication field, wherein a value of the switching indication field indicates the switching arrangement between the plurality of communications schemes for the uplink data message;

wherein the one or more sounding reference signal resource sets indicated via the downlink control information comprise a first sounding reference signal resource set and a second sounding reference signal resource set associated with the uplink data message; and the switching arrangement indicates an arrangement for transmitting a first portion or a first repetition of the uplink data message in accordance with a first set of parameters associated with the first sounding reference signal resource set and for transmitting a second portion or a second repetition of the uplink data message in accordance with a second set of parameters associated with the second sounding reference signal resource set.

* * * * *